United States Patent
Kohn et al.

(10) Patent No.: US 10,452,045 B1
(45) Date of Patent: Oct. 22, 2019

(54) CONTROLLING ONGOING BATTERY SYSTEM USAGE WHILE REPEATEDLY REDUCING POWER DISSIPATION

(71) Applicant: Veritone Alpha, Inc., Costa Mesa, CA (US)

(72) Inventors: Wolf Kohn, Seattle, WA (US); Jordan Makansi, Seattle, WA (US); Yanfang Shen, Bellevue, WA (US)

(73) Assignee: Veritone Alpha, Inc., Costa Mesa, CA (US)

( * ) Notice: Subject to any disclaimer, the term of this patent is extended or adjusted under 35 U.S.C. 154(b) by 0 days.

(21) Appl. No.: 16/206,554

(22) Filed: Nov. 30, 2018

(51) Int. Cl.
  *G05B 17/02* (2006.01)
  *G05B 19/042* (2006.01)

(52) U.S. Cl.
  CPC .... *G05B 19/042* (2013.01); *G05B 2219/2639* (2013.01)

(58) Field of Classification Search
  CPC ................ G05B 19/042; G05B 2219/2639
  See application file for complete search history.

(56) References Cited

U.S. PATENT DOCUMENTS

| | | | |
|---|---|---|---|
| 5,727,128 | A | 3/1998 | Morrison |
| 5,963,447 | A | 10/1999 | Kohn et al. |
| 6,088,689 | A | 7/2000 | Kohn et al. |
| 2003/0069868 | A1 | 4/2003 | Vos |
| 2006/0229769 | A1 | 10/2006 | Grichnik et al. |
| 2010/0185405 | A1* | 7/2010 | Aoshima ............ B60L 3/0046 702/63 |
| 2011/0178622 | A1 | 7/2011 | Tuszynski |
| 2013/0080530 | A1 | 3/2013 | Frees et al. |
| 2013/0253942 | A1 | 9/2013 | Liu et al. |
| 2014/0250377 | A1 | 9/2014 | Bisca et al. |
| 2015/0058078 | A1 | 2/2015 | Ehrenberg et al. |
| 2015/0370228 | A1* | 12/2015 | Kohn ................ G06Q 50/06 700/31 |

(Continued)

OTHER PUBLICATIONS

Ge et al., "Hybrid Systems: Chattering Approximation to Relaxed Controls," *Lecture Notes in Computer Science vol. 1066: Hybrid Systems III*, 1996, 25 pages.

(Continued)

*Primary Examiner* — Mohammad Ali
*Assistant Examiner* — Vincent W Chang
(74) *Attorney, Agent, or Firm* — VLP Law Group LLP; James A. D. White

(57) ABSTRACT

Techniques are described for implementing automated control systems that repeatedly perform automated modifications to control system actuator components' ongoing operations to improve functionality for target battery systems, such as to reduce power dissipation while performing other battery power use activities to maximize battery life. Controlling a battery's usage may include using a DC-to-DC amplifier, and the repeated automated modifications may include modifying the state of the DC-to-DC amplifier actuator to adjust a level of resistance and/or an amount of time during which power is supplied. The repeated automated modifications may be performed to repeatedly reduce the distance between the current battery performance and an idealized version of the battery performance (e.g., a version with no power dissipation).

28 Claims, 18 Drawing Sheets

(56) References Cited

U.S. PATENT DOCUMENTS

| | | | | |
|---|---|---|---|---|
| 2015/0370232 A1* | 12/2015 | Kohn | ............... | G06Q 50/06 700/29 |
| 2016/0004228 A1* | 1/2016 | Kohn | ............... | G06Q 50/06 700/29 |
| 2016/0018806 A1* | 1/2016 | Kohn | ............... | G06Q 50/06 700/295 |
| 2017/0103483 A1* | 4/2017 | Drees | ............... | H02J 3/14 |
| 2017/0271984 A1* | 9/2017 | Kohn | ............... | H02M 3/156 |
| 2017/0285111 A1* | 10/2017 | Fife | ............... | G05B 13/021 |
| 2017/0315523 A1* | 11/2017 | Cross | ............... | G05B 13/048 |
| 2017/0329289 A1* | 11/2017 | Kohn | ............... | G05B 17/02 |

OTHER PUBLICATIONS

Kohn et al., "Multiple Agent Hybrid Control: Carrier Manifolds and Chattering Approximations to Optimal Control," 33$^{rd}$ Conference on Decision and Control Lake Buena Vista, FL, Dec. 1994, 7 pages.

Kohn et al., "A Hybrid Systems Approach to Computer-Aided Control Engineering," *IEEE Control Systems* 15(2), 1995, 30 pages.

Kohn et al., "Hybrid Systems as Finsler Manifolds: Finite State Control as Approximation to Connections," *Lecture Notes in Computer Science vol. 999: Hybrid Systems II*, 1995, 28 pages.

Kohn et al., "Viability in Hybrid Systems," *Theoretical Computer Science 138*, 1995, 28 pages.

Kohn et al., "Digital to Hybrid Program Transformations," IEEE International Symposium on Intelligent Control, Dearborn, MI, Sep. 15-18, 1996, 6 pages.

Kohn et al., "Hybrid Dynamic Programming," *Lecture Notes in Computer Science vol. 1201: Hybrid and Real-Time Systems*, 1997, 7 pages.

Kohn et al., "Implementing Sensor Fusion Using a Cost-Based Approach," American Control Conference, Albuquerque, NM, Jun. 1997, 5 pages.

Kohn et al., "Control Synthesis in Hybrid Systems with Finsler Dynamics," *Houston Journal of Mathematics* 28(2), 2002, 23 pages.

Kohn et al., "A Micro-Grid Distributed Intelligent Control and Management System," *IEEE Transactions on Smart Grid* 6(6), Nov. 2015, 11 pages.

Uddin, K., "The effects of high frequency current ripple on electric vehicle battery performance," Applied Energy 178 (2016), 13 pages.

\* cited by examiner

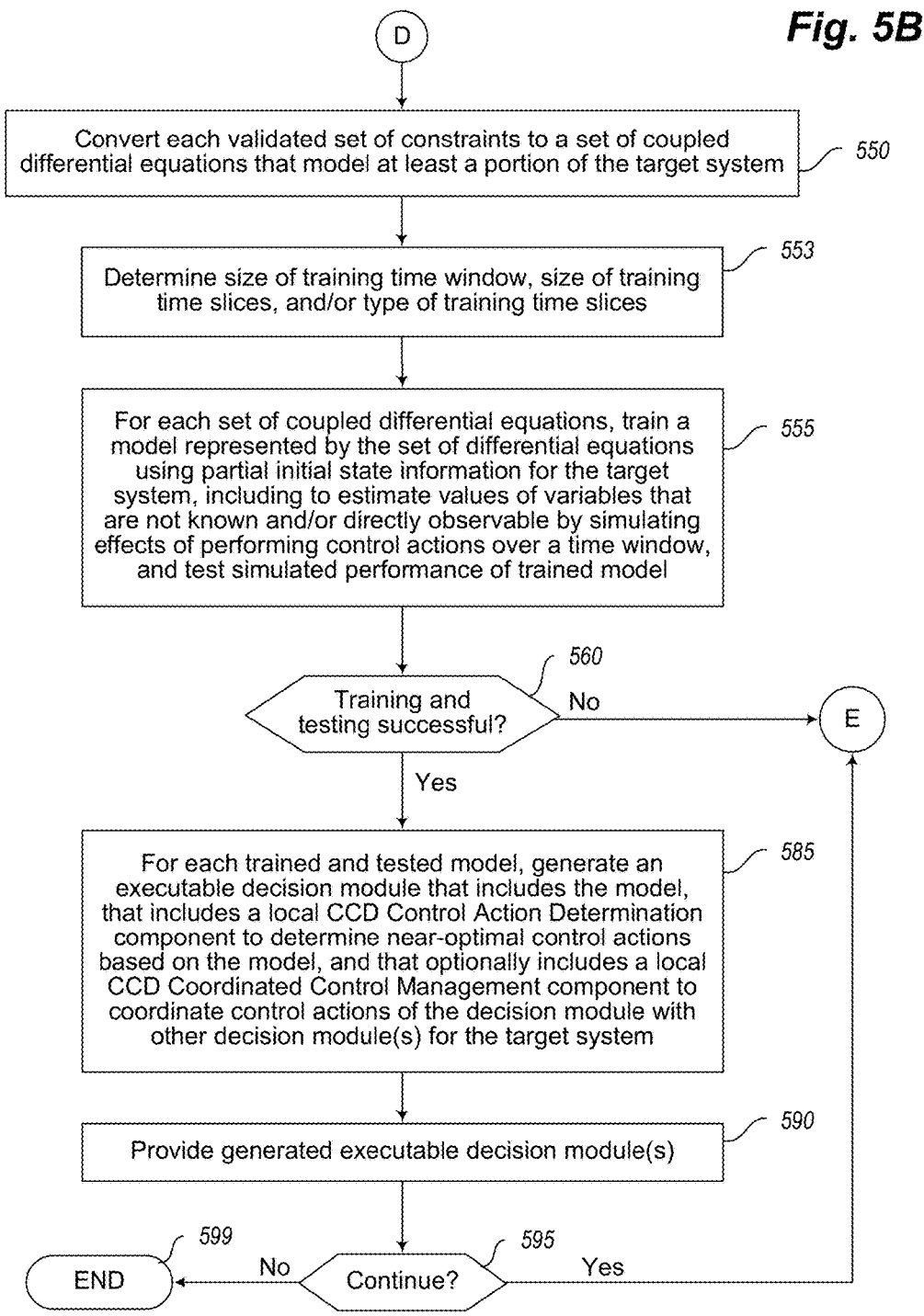

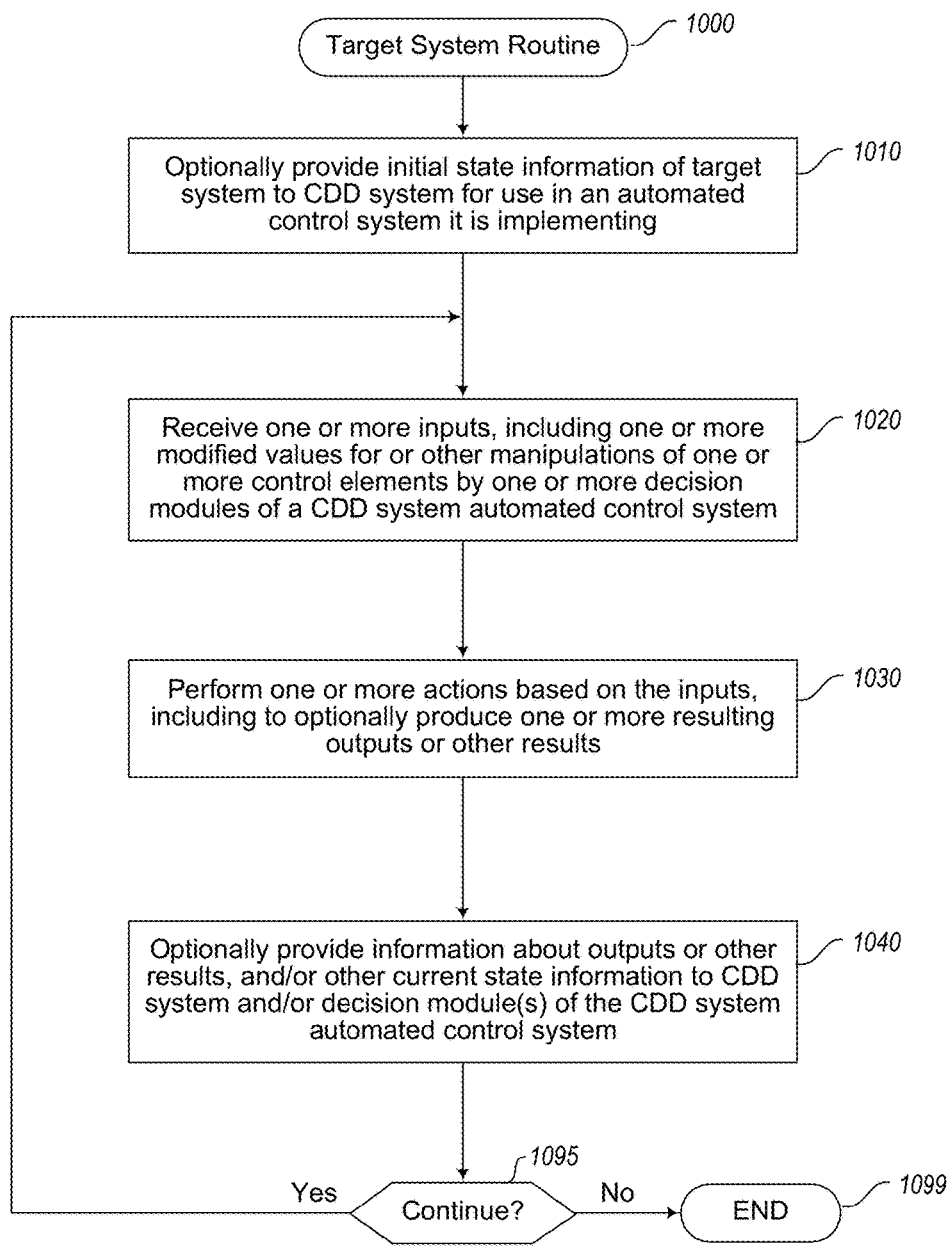

CONTROLLING ONGOING BATTERY SYSTEM USAGE WHILE REPEATEDLY REDUCING POWER DISSIPATION

TECHNICAL FIELD

The following disclosure relates generally to techniques for an automated control system to control usage of a battery system while repeatedly and automatically modifying the control system's operations to improve its control functionality, such as to improve the control system's operations to reduce power dissipation while performing other battery power use activities to maximize battery life when supplying requested electrical power.

BACKGROUND

Attempts have been made to implement automated control systems for various types of physical systems having inputs or other control elements that the control system can manipulate in an attempt to provide desired output or other behavior of the physical systems—one example of such automated control is to manage operations of a battery that is discharging electrical power to support a load and/or is charging using electrical power from a source, while uncertainty exists about an internal temperature and/or chemical state of the battery, and potentially with ongoing changes in load, source and/or internal state of the battery. Such automated control systems have used various types of architectures and underlying computing technologies to attempt to implement such functionality.

However, various difficulties exist with existing automated control systems for battery systems, including with respect to managing uncertainty in a current state of a system being controlled and in how different types of inputs will affect operation of the automated control systems.

BRIEF DESCRIPTION OF THE DRAWINGS

FIGS. 5A-5B illustrate a flow diagram of an example embodiment of a CDD Decision Module Construction routine.

FIG. 10 illustrates a flow diagram of an example embodiment of a routine for a target system being controlled.

DETAILED DESCRIPTION

Figure 1A:
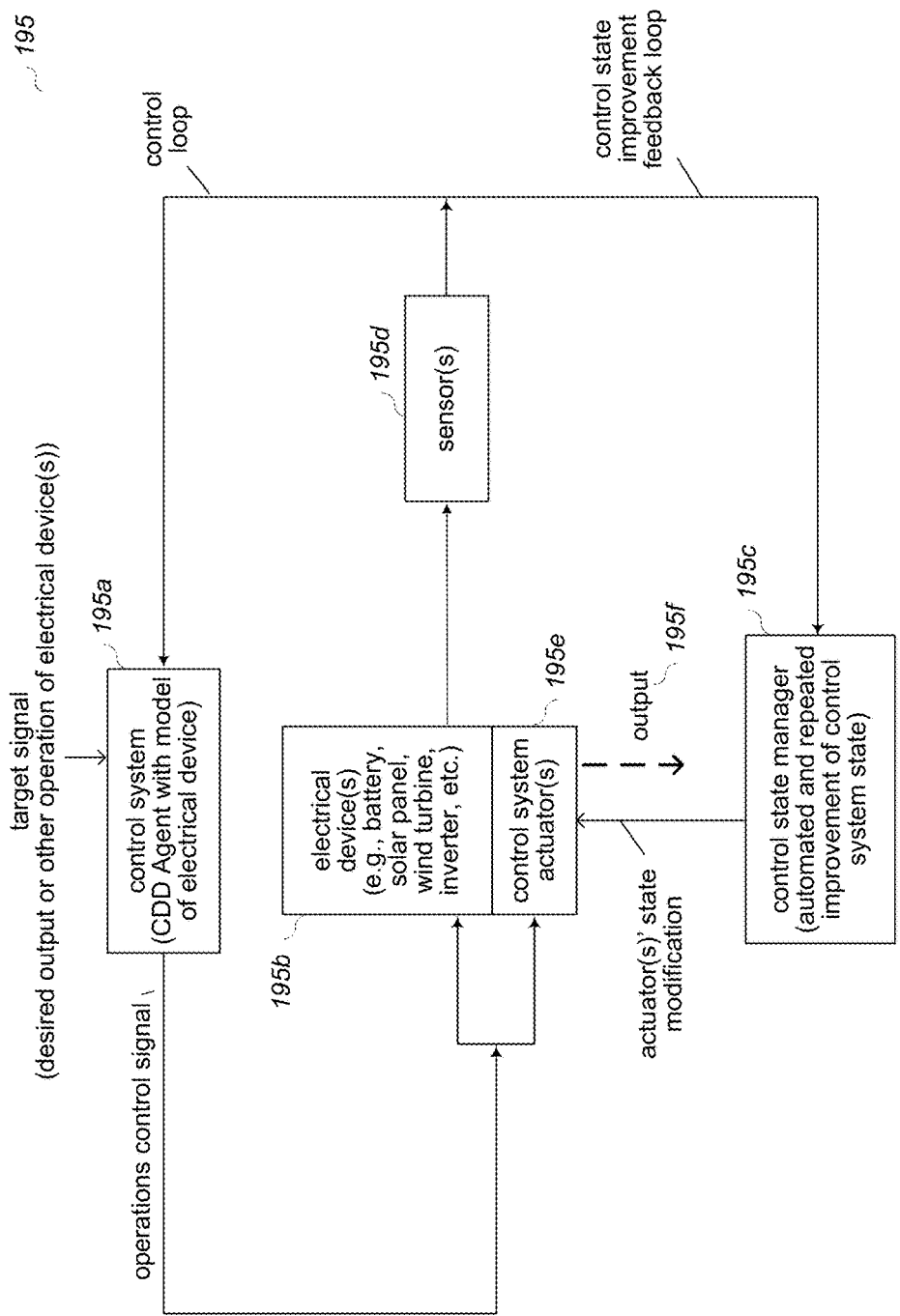
FIG. 1A includes a diagram illustrating use of a control state manager component to repeatedly and automatically modify the control system's usage of an electrical device of a target system to improve its functionality.

Techniques are described for implementing an automated control system to control or otherwise manipulate at least some operations of one or more batteries in one or more target physical systems. In at least some embodiments, the described techniques include, while the control system is controlling usage of one or more batteries (e.g., determining whether and how much power to supply at each of a series of time points, and implementing the determined power amounts via one or more actuator components), repeatedly performing automated modifications to the control system's ongoing operations to improve its control functionality, such as to improve the control system's operations to reduce power dissipation while performing other battery power use activities (e.g., to maximize battery life). For example, in at least some embodiments, controlling a battery's usage may include using a DC-to-DC amplifier (e.g., a field-effect transistor, or FET, amplifier) actuator that is connected to the battery and controls an amount of electrical current and/or voltage being output from the battery (e.g., in a real-time manner and to optimize long-term operation of the battery)—if so, the repeated automated modifications to the control system's operations may, in at least some such embodiments, include modifying one or more state attributes of the DC-to-DC amplifier actuator to reduce power dissipation in light of other characteristics of the system, such as to adjust a level of resistance to affect an amount of power supplied and/or to adjust an amount of time during which power is supplied.

In at least some embodiments, the repeated automated modifications to the state of one or more control system actuator components are performed to repeatedly reduce the distance between the current battery performance and an idealized version of the battery performance (e.g., a version with no power dissipation), so that the ongoing usage of the battery is continually improved via feedback received from the ongoing battery usage. For example, an initial state of the control system actuator components may be thought of as providing an initial domain of possible battery operations, with particular control actions by the control system and the resulting output from the battery corresponding to movement within that initial domain and having an initial level of power dissipation. In such a situation, an automated modification to the state of one or more control system actuator components may be based at least in part on battery operations feedback received from the target system during battery operations in that initial domain (e.g., using sensor readings, such as temperature, voltage, current, etc.), and may involve propagating the battery operations to an improved domain of possible battery operations having a lower level of power dissipation. Such automated modifications to the state of one or more control system actuator components may be repeatedly performed based on ongoing battery operations feedback to further reduce the distance to the idealized version of the battery performance and to correspondingly reduce the power dissipation, including to dynamically adapt to various changes that may occur in the target system over time (e.g., to changing battery performance over time due to changes in internal battery chemistry, which may change current power dissipation associated with a current domain of battery operations). Additional details are described below related to the described techniques for repeatedly performing automated modifications to the control system's ongoing operations to improve functionality, and some or all of the described techniques are performed in at least some embodiments by automated operations of one or more control state manager components, optionally as part of or in conjunction with one or more CDD (Collaborative Distributed Decision) systems controlling specific target systems that include one or more batteries.

In addition, the described techniques may in at least some embodiments generate and use a model of a target system that is under control by encoding the dynamics of the target system (e.g., from sensory data and actions of the target system) in a function of the state of the target system referred to as a data Hamiltonian model—in particular, some characteristics of the target system under control may not be completely known (e.g., internal state of the battery), with the data Hamiltonian encoding the currently known information. Such a data Hamiltonian may be implemented as a function that captures the flow and interdependence of a data domain, and may have three types of variables (e.g., state variables, flow variables, and decision or control variables) and one or more associated goals (e.g., to maximize battery life while satisfying as many requests for power from the battery as possible), with behavior of the data Hamiltonian controlled at least in part by binary and other rules that specify control actions to perform in light of current state information (e.g., absolute rules that characterize the unchanging physics of a physical target system being controlled and have binary true/false values; hard rules that characterize the desired behavior and goals and have binary true/false values; soft rules that characterize empirical knowledge of system operation, such as heuristic strategies, economic dispatch, and response to anomalies and learning strategies, and have variable, probabilistic truth values in a range [0,1], as well as associated confidence values; etc.). The control system may use the model and current state information to determine control actions to currently perform, such as in a manner to satisfy defined constraints and other goals of the control system in light of its current state, while attempting to satisfy the requested output or other desired operation of the target system if possible. Additional details are included below regarding the generation and use of such target system models.

The described techniques involving the use of control state manager techniques may provide a variety of benefits and advantages. In particular, many traditional control system approaches involving batteries have been ineffective for controlling complex systems in which internal state information cannot be determined, while the use of the described control state manager techniques overcome such problems based at least in part by repeatedly improving the operation of the control system via feedback from ongoing operations used to reduce the difference between current and ideal operations. Such traditional control system approaches typically involve the system designers beginning with requirements for battery system behavior, using the requirements to develop a static model of the system, and attempting to optimize the run-time battery system operations in light of defined criteria. Conversely, in at least some embodiments, the described control state manager techniques do not need to use such criteria, nor to develop such a resulting static model, nor to do such optimization—instead, an idealized behavior of a battery system is expressed and used to create an idealized behavioral model (e.g., expressed as an idealized data Hamiltonian system model), and the information used from a control system state improvement feedback loop during run-time operation is used to improve the functionality of the control system (e.g., continuously) by repeatedly reducing the difference between a domain of current system operations and a domain of idealized system operations. In this manner, as the differences are reduced, the effects of the control actions determined by the automated control system more accurately control the target system to approach the idealized behavior.

FIG. 1A includes an example diagram 195 illustrating how a control state manager component may be used to improve functionality of a control system that is controlling a target system using an electrical device 195b—the electrical device may be a battery in at least some embodiments, as discussed in greater detail elsewhere herein (including with respect to the examples of FIGS. 2A-2D), although in other situations the electrical device may be part of or otherwise have other forms (e.g., a solar panel, wind turbine, inverter, fuel cell, solid waste generator, motor, computing device, other active loads, etc.).

In this example, a control system 195a performs a control loop to control ongoing operation of the electrical device 195b of the target system, such as to drive the target system to a desired dynamic behavior. In particular, the control system may include a CDD agent (as discussed in greater detail below with respect to FIGS. 1B-1C, as well as elsewhere herein), and a model of the target system that was previously generated based in part on data obtained from actual operation of the target system over time (such as to identify some or all inputs supplied to the target system; resulting outputs from the target system, such as sensor data measured regarding operations of the target system from sensors 195d, etc.)—the system model is a representation of the target system and its operations, and in this example is in the form of a total data Hamiltonian function $H_T$, as discussed in greater detail below. As part of the operation of the control system 195a, it receives a target signal that represents a request for a desired output or other desired operation of the electrical device 195b of the target system, and uses information from its overall system model to determine an operations control signal (e.g., an energy supply control signal if the control system determines to satisfy the request, optionally with an amount of energy to supply) to send to the electrical device that satisfies defined constraints and other goals of the control system in light of its current state, while attempting to satisfy the desired output or other desired operation of the target signal if possible. The electrical device receives the control signal, and performs a corresponding output 195f as appropriate, with that output and/or other characteristics of the electrical device being measured at least in part by the one or more sensors 195d (e.g., a suite of multiple passive sensors). The sensors 195d may further supply their measured readings to the control system 195a, such as to update corresponding state information in the system model, with the control system 195a continuing to control operation of the electrical device 195*b* for a next target signal (e.g., in a continuous or substantially continuous manner, and such as based on a system model that is updated in a continuous or substantially continuous manner based at least in part on readings from the sensors 195*d*).

In addition to the control loop used to control the operations of the electrical device 195*b*, FIG. 1A further illustrates a control state manager component 195*c* that participates in a control state improvement feedback loop to repeatedly (e.g., continuously) improve functionality of the control system, by adjusting attributes or other state information of one or more control system actuators that regulate operation of the electrical device, such as to affect how and whether operations of the control system actuator(s) are performed. In the example of FIG. 1A, the control system includes one or more control system actuators 195*e* that optionally receive the operations control signal from the control system and modify activities of the control system actuator(s) to dynamically regulate the behavior of the electrical device, although in other embodiments the control system actuator(s) may control to provide a defined type of regulation until corresponding attributes are modified by the control state manager component. As previously noted, the control system actuator(s) may include, for example, a DC-to-DC amplifier that is connected to the electrical device and controls an amount of electrical current and/or voltage being output from the electrical device, such as by providing a configurable amount of resistance—if so, the adjustments by the control state manager component 195*c* to the attributes or other state information of the control system actuator(s) 195*e* may include, for example, changing a level of resistance and/or an amount of time that a resistance level is used. In particular, the control state manager component receives feedback from the sensors 195*d* corresponding to current operation of the electrical device 195*b* as regulated by the control system actuator(s) 195*e*, uses the feedback as part of determining a current domain of electrical device operations (e.g., corresponding to a current amount of power dissipation that occurs from the electrical device operations), propagates current values for state, momentum and control values for the electrical device operations over a defined time window toward an idealized domain of electrical device operations (e.g., corresponding to no power dissipation from electrical device operations), and uses a weighted average of the propagated values to determine modifications and other adjustments to make to the state attributes of the control system actuator(s) to improve the functionality of the control system (e.g., to reduce the power dissipation from the electrical device operations). Additional details are included below regarding the operations of the control state manager component.

With respect to such an overall system model of a target system that includes an electrical device, the target system may, for example, include one or more batteries used to store and provide electrical power (e.g., for a local load, for an electrical grid that supports various loads in various locations, etc.), and the automated operations to control the target system may include using characteristics of at least one such battery in the target system to perform automated control of DC (direct current) power that is provided from and/or stored by that battery. In such embodiments, the automated operations of one or more CDD agents may include generating an overall system model of battery performance by receiving information about inputs to, outputs from, control signal instructions provided to and other attributes related to the one or more batteries (e.g., electrical current and/or voltage being output for use, electrical current and/or voltage being input for storage, temperature readings external to the one or more batteries as part of their surrounding environment, etc.), and using such information as part of modeling current operational characteristics of the one or more batteries—given such modeled information, the CDD agent(s) that control the one or more batteries may then use such information to make decisions on current and/or future control actions in a manner that reflects actual behavior of the target system.

However, before further discussion of the control state manager component and its functionality, a more general description of the control of target systems using such representations and other models is provided.

Figure 1B:
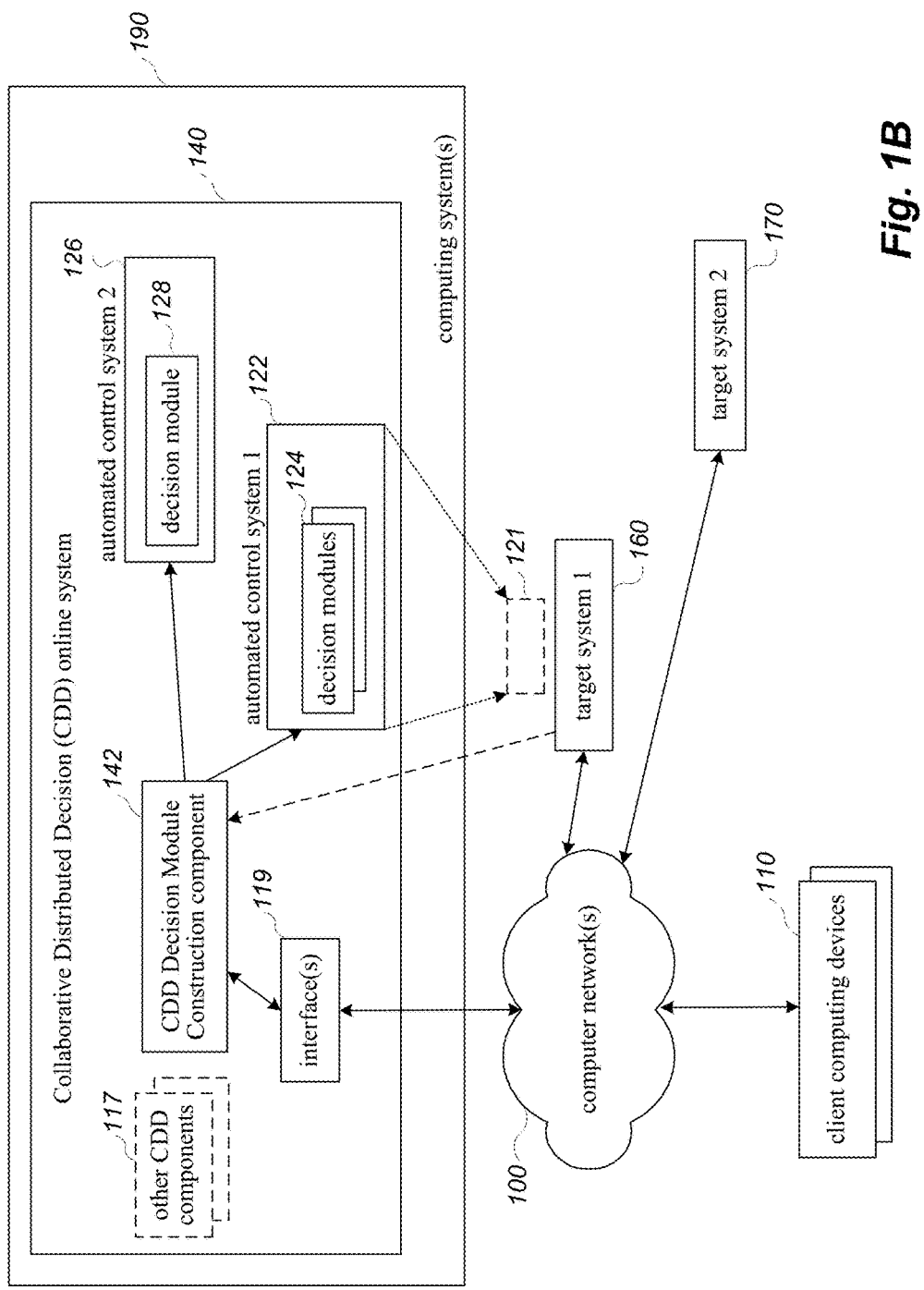
FIG. 1B is a network diagram illustrating an example environment in which a system for performing cooperative distributed control of target systems may be configured and initiated.

In particular, FIG. 1B is a network diagram illustrating an example environment in which a system for performing cooperative distributed control of one or more target systems may be configured and initiated. In particular, an embodiment of a CDD system 140 is executing on one or more computing systems 190, including in the illustrated embodiment to operate in an online manner and provide a graphical user interface (GUI) (not shown) and/or other interfaces 119 to enable one or more remote users of client computing devices 110 to interact over one or more intervening computer networks 100 with the CDD system 140 to configure and create one or more decision modules to include as part of an automated control system to use with each of one or more target systems to be controlled. While not illustrated in FIG. 1B, the CDD system 140 may include and use one or more control state manager components as discussed herein, such as to include one or more such control state manager components in one or both of the automated control systems 1 and 2.

In particular, target system 1 160 and target system 2 170 are example target systems illustrated in this example, although it will be appreciated that only one target system or numerous target systems may be available in particular embodiments and situations, and that each such target system may include a variety of mechanical, electronic, chemical, biological, and/or other types of components to implement operations of the target system in a manner specific to the target system. In this example, the one or more users (not shown) may interact with the CDD system 140 to generate an example automated control system 122 for target system 1, with the automated control system including multiple decision modules (or "agents") 124 in this example that will cooperatively interact to control portions of the target system 1 160 when later deployed and implemented. The interactions of the users with the CDD system 140 to create the automated control system 122 may involve a variety of interactions over time, including in some cases independent actions of different groups of users. In addition, as part of the process of creating and/or training or testing automated control system 122, it may perform one or more interactions with the target system 1 as illustrated, such as to obtain partial initial state information, although some or all training activities may in at least some embodiments include simulating effects of control actions in the target system 1 without actually implementing those control actions at that time. In some embodiments and situations, such initial user interactions may be used to generate an initial rule-based overall system model of a target system that is based at least in part on binary rules.

After the automated control system 122 is created, the automated control system may be deployed and implemented to begin performing operations involving controlling the target system 1 160, such as by optionally executing the automated control system 122 on the one or more computing systems 190 of the CDD system 140, so as to interact over the computer networks 100 with the target system 1. In other embodiments and situations, the automated control system 122 may instead be deployed by executing local copies of some or all of the automated control system 122 (e.g., one or more of the multiple decision modules 124) in a manner local to the target system 1, as illustrated with respect to a deployed copy 121 of some or all of automated control system 1, such as on one or more computing systems (not shown) that are part of or otherwise associated with the target system 1. Each such decision module may, for example, perform activities similar to those of control system 195a of FIG. 1A, such as with respect to a respective electrical device being controlled by that decision module. In addition, in embodiments and situations in which initial user interactions are used to generate an initial rule-based system model of a target system using binary rules, the initially deployed automated control system 122 may be based on such an initial rule-based system model, and data from the operation of the target system under control of that initially deployed automated control system 122 may be gathered and used to include information about current characteristics of the target system in a revised model of the target system, and/or the functionality of the control system may be improved over time using a control state improvement feedback loop under control of a control state manager component as discussed elsewhere herein.

In a similar manner to that discussed with respect to automated control system 122, one or more users (whether the same users, overlapping users, or completely unrelated users to those that were involved in creating the automated control system 122) may similarly interact over the computer network 100 with the CDD system 140 to create a separate automated control system 126 for use in controlling some or all of the target system 2 170. In this example, the automated control system 126 for target system 2 includes only a single decision module (or "agent") 128 that will perform all of the control actions for the automated control system 126, such as in a manner similar to that illustrated for control system 195a of FIG. 1A. The automated control system 126 may similarly be deployed and implemented for target system 2 in a manner similar to that discussed with respect to automated control system 122, such as to execute locally on the one or more computing systems 190 and/or on one or more computing systems (not shown) that are part of or otherwise associated with the target system 2, although a deployed copy of automated control system 2 is not illustrated in this example. It will be further appreciated that the automated control systems 122 and/or 126 may further include other components and/or functionality that are separate from the particular decision modules 124 and 128, respectively, although such other components and/or functionality are not illustrated in FIG. 1B.

The network 100 may, for example, be a publicly accessible network of linked networks, possibly operated by various distinct parties, such as the Internet, with the CDD system 140 available to any users or only certain users over the network 100. In other embodiments, the network 100 may be a private network, such as, for example, a corporate or university network that is wholly or partially inaccessible to non-privileged users. In still other embodiments, the network 100 may include one or more private networks with access to and/or from the Internet. Thus, while the CDD system 140 in the illustrated embodiment is implemented in an online manner to support various users over the one or more computer networks 100, in other embodiments a copy of the CDD system 140 may instead be implemented in other manners, such as to support a single user or a group of related users (e.g., a company or other organization), such as if the one or more computer networks 100 are instead an internal computer network of the company or other organization, and with such a copy of the CDD system optionally not being available to other users external to the company or other organizations. In addition, the CDD system 140, each of its components (including component 142 and optional other components 117, such as one or more CDD Control Action Determination components and/or one or more CDD Coordinated Control Management components and/or one or more CDD control state manager components), each of the decision modules, and/or each of the automated control systems may include software instructions that execute on one or more computing systems (not shown) by one or more processors (not shown), such as to configure those processors and computing systems to operate as specialized machines with respect to performing their programmed functionality.

As noted above, various types of data may be obtained and used as part of modeling operational characteristics of a target system in a general overall model, including information about prior input data to the target system and resulting behavior of the target system. In some embodiments and situations, such data may include data that is gathered in an automated manner from one or more types of hardware sensors, and in some embodiments and situations, such data may include information about actions of human users or otherwise information about such humans. The term "sensor" and "sensor data" as used herein generally refers to such data regardless of source or type, including data from hardware sensors, unless otherwise indicated with respect to a particular situation. In addition, the improvements to control system functionality that are performed by a control state manager component may in at least some embodiments be performed to complete or repair or otherwise address conflicts in state information for one or more parts of the target system, such as from lack of sufficient internal state structure information or other information, and to enable learning of or other improvements to results of performing control actions.

Figure 1C:
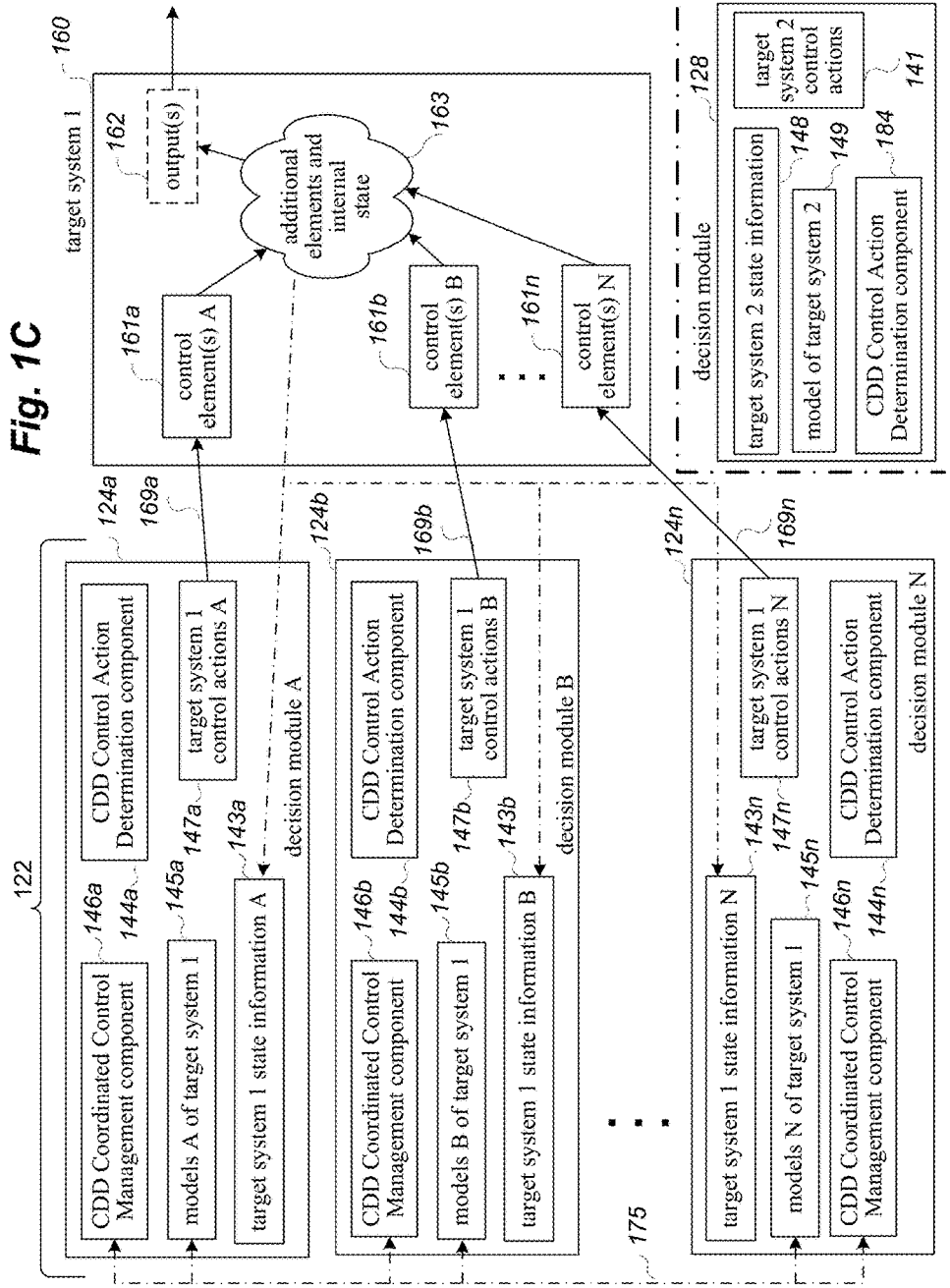
FIG. 1C is a network diagram illustrating an example environment in which a system for performing cooperative distributed control of target systems may be implemented.

FIG. 1C is a network diagram illustrating an example environment in which a system for performing cooperative distributed control of target systems may be implemented, and in particular continues the examples discussed with respect to FIG. 1B. In the example environment of FIG. 1C, target system 1 160 is again illustrated, with the automated control system 122 (whether an initial or revised version) now being deployed and implemented to use in actively controlling the target system 1 160. In the example of FIG. 1C, the decision modules 124 are represented as individual decision modules 124a, 124b, etc., to 124n, and may be executing locally to the target system 1 160 and/or in a remote manner over one or more intervening computer networks (not shown). In the illustrated example, each of the decision modules 124 includes a local copy of a CDD Control Action Determination component 144, such as with component 144a supporting its local decision module 124a, component 144b supporting its local decision module 124b, and component 144n supporting its local decision module 124n. Similarly, the actions of the various decision modules 124 are coordinated and synchronized in a peer-to-peer manner in the illustrated embodiment, with each of the decision modules 124 including a copy of a CDD Coordinated Control Management component 146 to perform such synchronization, with component 146a supporting its local decision module 124a, component 146b supporting its local decision module 124b, and component 146n supporting its local decision module 124n. One or more of the decision modules 124 may further include a local copy of a CDD control state manager component, such as to use feedback to learn improved functionality for at least some of the target system 1 (e.g., for a respective subset of the target system 1 that is controlled by that decision module), although such CDD control state manager components are not illustrated in this example.

As the decision modules 124 and automated control system 122 execute, various interactions 175 between the decision modules 124 are performed, such as to share information about current models and other state of the decision modules to enable cooperation and coordination between various decision modules, such as for a particular decision module to operate in a partially synchronized consensus manner with respect to one or more other decision modules (and in some situations in a fully synchronized manner in which the consensus actions of all of the decision modules 124 converge). During operation of the decision modules 124 and automated control system 122, various state information 143 may be obtained by the automated control system 122 from the target system 160, such as initial state information and changing state information over time (e.g., from passive and/or active sensors, not shown), and including outputs or other results in the target system 1 from control actions performed by the decision modules 124.

The target system 1 in this example includes various control elements 161 that the automated control system 122 may manipulate, and in this example each decision module 124 may have a separate group of one or more control elements 161 that it manipulates (such that decision module A 124a performs interactions 169a to perform control actions A 147a on control elements A 161a, decision module B 124b performs interactions 169b to perform control actions B 147b on control elements B 161b, and decision module N 124n performs interactions 169n to perform control actions N 147n on control elements N 161n). Such control actions affect the internal state 163 of other elements of the target system 1, including optionally to cause or influence one or more outputs 162. As operation of the target system 1 is ongoing, at least some of the internal state information 163 is provided to some or all of the decision modules to influence their ongoing control actions, with each of the decision modules 124a-124n possibly having a distinct set of state information 143a-143n, respectively, in this example.

As discussed in greater detail elsewhere, each decision module 124 may use such state information 143 and a local sub-model 145x of an overall system model for the target system to determine particular control actions 147 to next perform, such as for each of multiple time periods, although in other embodiments and situations, a particular automated control system may perform interactions with a particular target system for only one time period or only for some time periods. For example, the local CDD Control Action Determination component 144 for a decision module 124 may determine a near-optimal local solution for that decision module's local model 145, and with the local CDD Coordinated Control Management component 146 determining a synchronized consensus solution to reflect other of the decision modules 124, including to update the decision module's local sub-model 145 based on such local and/or synchronized solutions that are determined. Thus, during execution of the automated control system 122, the automated control system performs various interactions with the target system 160, including to request state information, and to provide instructions to modify values of or otherwise manipulate control elements 161 of the target system 160. For example, for each of multiple time periods, decision module 124a may perform one or more interactions 169a with one or more control elements 161a of the target system, while decision module 124b may similarly perform one or more interactions 169b with one or more separate control elements B 161b, and decision module 124n may perform one or more interactions 169n with one or more control elements N 161n of the target system 160. In other embodiments and situations, at least some control elements may not perform control actions during each time period. One or more control state manager components may further perform activities during such control of the target system 160, such as to determine and subsequently use information to improve functionality of the target system (e.g., to modify or otherwise adjust attributes or other state information of control system actuators that regulate activities of the target system or particular parts of it, although such control state manager activities are not illustrated in the example of FIG. 1C.

In addition, while example target system 2 170 of FIG. 1B is not illustrated in FIG. 1C, further details are illustrated for decision module 128 of automated control system 126 for reference purposes, although such a decision module 128 would not typically be implemented together with the decision modules 124 controlling target system 1. In particular, the deployed copy of automated control system 126 includes only the single executing decision module 128 in this example, although in other embodiments the automated control system 126 may include other components and functionality. In addition, since only a single decision module 128 is implemented for the automated control system 126, the decision module 128 includes a local CDD Control Action Determination component 184, any may optionally further include a local CDD control state manager component (not shown), but does not in the illustrated embodiment include any local CDD Coordinated Control Management component, since there are not other decision modules with which to synchronize and interact.

While not illustrated in FIGS. 1B and 1C, the distributed nature of operations of automated control systems such as those of 122 allow partially decoupled operations of the various decision modules, include to allow modifications to the group of decision modules 124 to be modified over time while the automated control system 122 is in use, such as to add new decision modules 124 and/or to remove existing decision modules 124. In a similar manner, changes may be made to particular decision modules 124 and/or 128, such as to change rules or other restrictions specific to a particular decision module and/or to change goals specific to a particular decision module over time, with a new corresponding model being generated and deployed within such a decision module, including in some embodiments and situations while the corresponding automated control system continues to control operations of a corresponding target system. In addition, improvements to functionality of particular decision modules may reflect operations of one or more control state manager components to adjust state information for one or more control system actuators that regulate one or more respective control elements of the target system at one or more times. In addition, while each automated control system is described as controlling a single target system in the examples of FIGS. 1B and 1C, in other embodiments and situations, other configurations may be used, such as for a single automated control system to control multiple target systems (e.g., multiple inter-related target systems, multiple target systems of the same type, etc.), and/or for multiple automated control systems to operate together to control a single target system, such as by each operating independently to control different portions of that target control system. It will be appreciated that other configurations may similarly be used in other embodiments and situations.

For illustrative purposes, some embodiments are described below in which specific types of data is gathered and used in particular manners to perform specific types of control actions for specific types of target systems, including via particular types of adjustments to particular types of control system actuator(s) to improve particular types of functionality. However, it will be understood that such described techniques may be used in other manners in other embodiments, including with other types of target systems, and that the invention is thus not limited to the exemplary details provided.

As noted above, in at least some embodiments, the model of a target system to be controlled is encoded as a data Hamiltonian model that is a function of three types of variables (state variables, momentum variables and control variables), and is composed of three additive elements (the physical model, the constrained model and the learned model). The physical and constrained models are determined respectively by the physical principles characterizing the system and operational requirements. In particular, the three types of variables used in the function for the data Hamiltonian model include a vector defining the state of the battery, a vector defining the momentum of the battery, and a vector of action variables that control the battery. The additive elements that compose the data Hamiltonian model include at least Hamiltonians $H_O$ and $H_C$, where $H_O$ is the physical Hamiltonian of the battery, and $H_C$ is the constrained Hamiltonian representing the known operational and requirement constraints, with the total Hamiltonian model in the following form: $H_T=H_O+H_C$. $H_O$ and $H_C$ are determined from stored operational rules and historical data of the battery. The total Hamiltonian model $H_T$ has the same properties of the Hamiltonian of classic mechanics, but adapted to electrical devices. In addition to the total Hamiltonian model $H_T$ that characterizes the dynamic target system, a control system implemented by the described techniques may in some embodiments use a specified desired behavior Hamiltonian $H_D$, which reflects the desired behavior of the system under control, and affects the dynamics of the control signal produced by the control system.

The total Hamiltonian model $H_T$ encodes the evolution of the battery system under control, with the evolution represented in the form of the extended Hamilton Jacobi equations, as follows:

$$\frac{dq(t)}{dt} = \frac{\partial H_T}{\partial p(t)}$$

$$\frac{dp(t)}{dt} = -\frac{\partial H_T}{\partial q(t)}$$

$$\frac{du(t)}{dt} = -\Gamma * \frac{\partial}{\partial u}\left(\frac{d(H_T - H_D)^2}{dt}\right)$$

where q(t) is the state vector of the battery being learned, p(t) is their momentum, and u(t) is the control action vector. The first two equations are classic evolution equations of the dynamics of the dynamic target system, and the last equation describes control of the battery on the DC side to satisfy constraints and approximate the desired behavior represented by $H_D$. The parameter $\Gamma$ is an empirical parameter to ensure stability of the control system.

Turning now to FIGS. 2A-2D, these figures illustrate examples of a control state manager component performing techniques to improve functionality of a control system that is controlling a battery, by repeatedly adjusting state of one or more control system actuators in order to reduce the distance between the current battery performance and an idealized version of the battery performance.

Figure 2A:
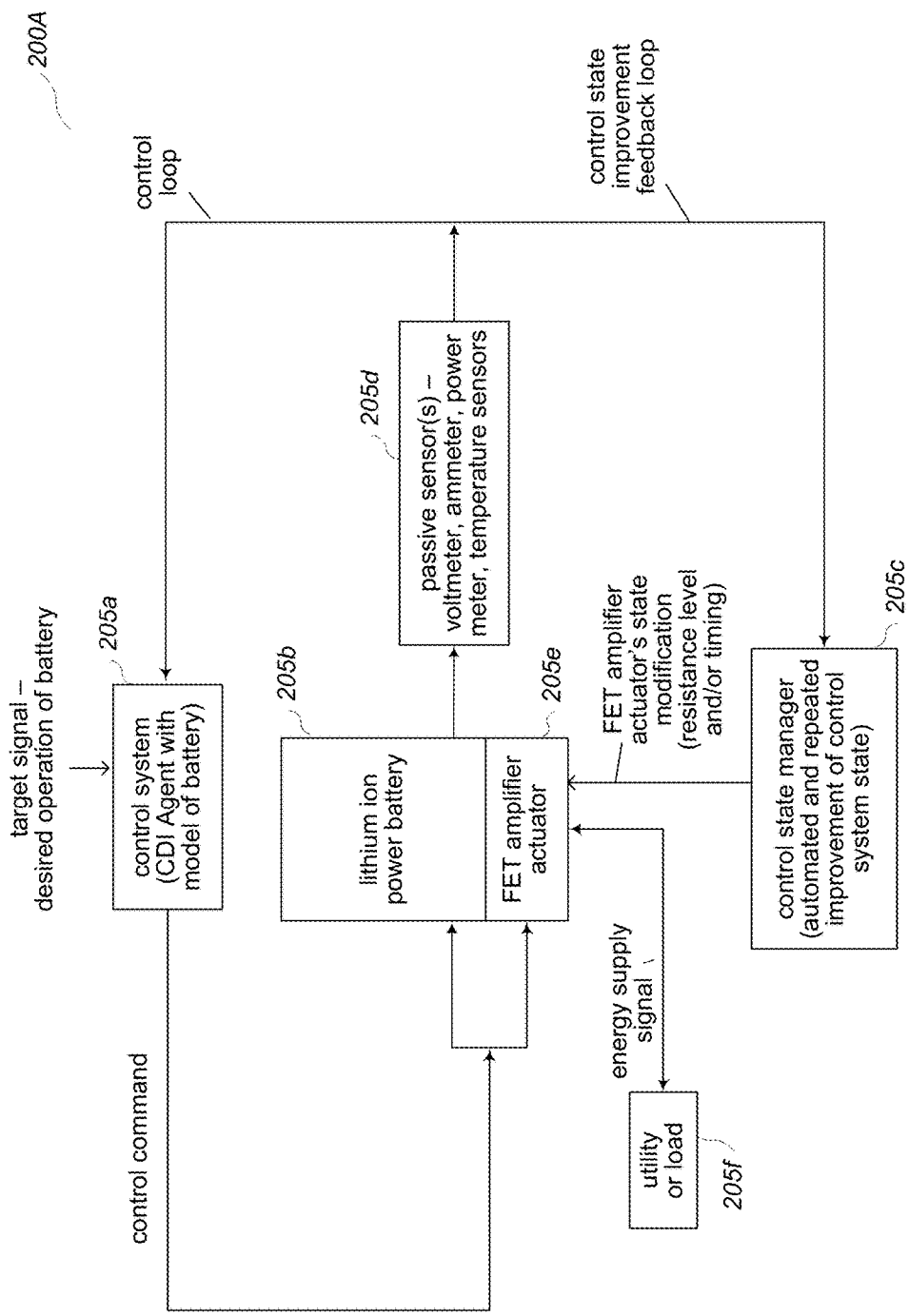
FIGS. 2A-2D illustrate examples of techniques of a control state manager component to repeatedly and automatically modify the control system's usage of a battery via modifying one or more actuators that affect battery operations.

FIG. 2A has similarities to FIG. 1A, but further illustrates the use of the control state manager component to improve control system functionality in controlling use of a lithium ion battery system. For example, in at least some embodiments involving a physical target system that includes one or more batteries used to store and provide electrical power, the automated operations to control the target system may include using characteristics of each battery's state to perform automated control of DC (direct current) power that is provided from the battery—in some such embodiments, such control may include using a DC-to-DC amplifier (e.g., a field-effect transistor, or FET, amplifier) connected to the battery to control an amount of electrical current and/or voltage being output from the battery (e.g., in a real-time manner and to optimize long-term operation of the battery), such as FET amplifier actuator 205e of FIG. 2A. Such a DC-to-DC amplifier may, for example, be part of a buck converter (or step-down converter) that steps down voltage while stepping up current from its input (supply) to its output (load) and/or be part of a boost converter (or step-up converter) that steps up voltage while stepping down current from its input (supply) to its output (load), referred to generally at times herein as a "boost/buck controller" or "buck/boost controller". A system that includes one or more batteries to be controlled may further include additional components in some embodiments and situations, such as one or more electrical sources and/or one or more electrical loads, with one non-exclusive example of such a type of system being a micro-grid with one or more home or business electrical power systems that may optionally include electrical generation sources (e.g., solar panels, wind turbines, etc.) as well as electrical load from the house or business.

As part of controlling use of a lithium ion battery system in FIG. 2A, various illustrated components interact to control operations of the battery according to one or more defined goals in light of defined constraints, rules and other information, as discussed elsewhere herein. In some embodiments, the automated activities to control the battery may be performed in a real-time manner and/or to optimize long-term operation of the battery (e.g., the life of the battery), while satisfying as many external requests for power (e.g., from a utility or other load 205f to which the battery can supply power) as is possible (e.g., at least a defined percentage or quantity of such requests)—for example, the control system 205a may attempt to fully or partially satisfy a request from the utility for power in a real-time manner if the request can be satisfied in a way that also satisfies other constraints on the battery performance given the current state of the battery and the defined goal(s), such as to enable the battery to operate in a desired non-saturation range or level (e.g., with respect to an internal temperature of the battery and/or internal chemistry of the battery). In addition, the control commands sent from the control system 205a to battery 205b may have various forms in various embodiments, such as to specify an amount of power to be generated as DC output of the battery, and/or for the battery to receive electrical power from one or more sources (not shown) to be stored for later use (e.g., at different time periods, or otherwise at different times). The specified power amount to be generated may include information indicating, for example, to increase or decrease the power being output by a specified amount, or to not change the power output. The output of the battery may serve to provide power to one or more loads 205f (e.g., an electrical grid associated with the utility), and in at least some embodiments may be connected to an inverter/rectifier component (not shown) to convert the power output of the battery to AC power to support corresponding loads—such an inverter may, for example, control power being provided from the battery by regulating voltage and/or frequency of the AC power. Similarly, input of the battery may serve to receive power from one or more sources (not shown), and in at least some embodiments may be connected to an inverter/rectifier component (not shown) to convert AC power input from the sources to DC power for the battery—such a rectifier may, for example, control power being provided to the battery by regulating voltage and/or frequency of the AC power.

In the illustrated example of FIG. 2A, a control system 205a is using two loops (a control loop and a control state improvement feedback loop) to control operation of a lithium ion power battery 205b. The control loop has the functionality to drive the battery system to a desired dynamic behavior, which in this example depends on two pieces of information, with a target signal telling the control system 205a the current desired battery output or other battery operation, and the control system using a current total Hamiltonian model that characterizes the battery system being controlled. The command signal generated by the control system represents actions for the battery to perform to satisfy the operational constraints (e.g., to protect the battery and extend battery life) and desired dispatch considerations (e.g., as dictated by a utility or other load 205f requesting power from the battery). Thus, the target signal to the control system 205a represents a desired power delivery of the battery (or receipt by the battery) and information about longevity targets, and the control system uses dynamics information from the current status of the battery, such as given by voltage and current sensors, to determine control commands provided to the battery (e.g., whether to supply or receive power, how much power to supply, etc.). To maximize the useful lifetime, the control system also uses information about the model changes of the battery as a function of level of charge, demand, temperature, etc., as well as optionally information about the ions and electrochemical activity within the battery if available. The energy supply signal between the battery/actuator and utility/load is either an output power signal generated by the battery and sent to the utility or load 205f, or an input power signal for charging the battery from the utility or load, as regulated by the FET amplifier actuator 205e. In addition, the passive sensor suite 205d provides feedback information about the current system operation to the control system and to the control state manager component 205c.

The control state improvement feedback loop, which includes a control state manager component 205c that is operating to improve functionality of the control system, also uses feedback information from the sensors 205d regarding the current status of the battery system to improve operations of the control system's FET amplifier actuator 205e. In particular, the control system uses the actuator in this example to actively control the impedance that the battery system "sees". The battery output (charging or discharging) is optimized for factors such as load satisfaction and/or longevity, with economic factors also optionally used. The impedance actuator 205e may be directly controlled by the control system and in series with the battery, such that the impedance is decreased when more power is desired from the battery, and is increased when less power is desired. In at least some embodiments, the impedance is implemented electronically with switches that may be used to increase the dissipation. The improvements provided by the control state improvement feedback loop are used in this example embodiment to adjust the impedance (or resistance) to approach an optimal level given a current state of the battery 205b, and thus to maximize useful lifetime of the battery by improving efficiency of control of the DC side of the battery and reducing energy waste.

With respect to an initial model of the battery that is used by the control system 205a, it may in some embodiments be a generic battery model that is applicable to any type of battery, while in other embodiments an initial battery model may be used that is specific to a type of the battery (e.g., a type of chemical reaction used to store and/or generate electricity, such as lithium ion or nickel cadmium), while in yet other embodiments an initial battery model may be used that is designed and/or configured specifically for the particular battery in use. Thus, such an initial battery model that is initially employed in a particular system with a particular battery may be updated over time, such as to reflect improvements from tuning parameters of the model and/or improvements to the underlying structure of the model—when updating a model to a particular battery and/or system, the updating operations may in some embodiments be performed initially in a learning phase before using the automated control system to control the battery, and/or in some embodiments may be performed continuously or periodically while the automated control system is controlling the battery (e.g., to reflect changes over time in an impedance profile of the battery). Additional details are included elsewhere herein regarding such models, including their construction and use.

In addition, in some embodiments the control system may be implemented as multiple separate components (e.g., with a battery controller sub-component implemented in whole or in part in hardware and/or firmware that is attached to the battery or otherwise at a location of the battery, and with other portions of the control system (agent) implemented in part by software instructions executing on one or more computing systems remote from the battery location and optionally communicating with the battery controller over one or more intervening computer networks), while in other embodiments the control system agent may be implemented as a single component (whether at the location of the battery or remote from it). Similarly, while in some embodiments the control state manager component and control system agent may be implemented as separate components (e.g., with the control state manager component implemented in whole or in part at the location of the battery, and/or in whole or in part at a remote location), in other embodiments the control system and control state manager component may be implemented as a single component (whether at the location of the battery or remote from it). In addition, while not illustrated with respect to FIG. 2A, multiple batteries (e.g., tens, hundreds, thousands, millions, etc.) may each have an associated control agent that controls actions of that battery in some embodiments, and with the various batteries acting together in a coordinated manner to supply aggregate power to the utility or to other entities. In such embodiments, the utility or other external entity may send synchronization and monitoring signals for use by the various systems including the batteries, and the multiple control agents associated with the various batteries may interact to exchange information and maintain at least partial coordination between the operations of the batteries.

Some further aspects of performing automated operations to control such a target system with one or more batteries and/or other types are target systems are included in U.S. patent application Ser. No. 15/096,091, filed Apr. 11, 2016 and entitled "Using Battery DC Characteristics To Control Power Output;" and in U.S. patent application Ser. No. 15/410,647, filed Jan. 19, 2017 and entitled "Using Sensor Data To Assist In Controlling A Target System By Modeling The Functionality Of The Target System," which claims the priority benefit of U.S. Provisional Patent Application No. 62/336,418, filed May 13, 2016 and entitled "Using Sensor Data To Assist In Controlling A Target System By Modeling The Functionality Of The Target System;" and in U.S. patent application Ser. No. 16/103,788, filed Aug. 14, 2018 and entitled "Using Battery State Excitation To Control Battery Operations"; each of which is hereby incorporated by reference in its entirety.

In at least some embodiments, initial modeling of a state of a target system is performed using one or more data Hamiltonian functions, and the described techniques include a control state manager component using one or more types of sensor data to improve functionality of the control system during its operation. A CDD system controlling such a target system may, in at least some embodiments and situations, implement multiple CDD decision modules or sub-systems (also referred to at times herein as CDI, or Collaborative Distributed Inferencing, control agents, such that a particular embodiment of the CDD system with one or more such CDI control agents may be referred to as a CDI system) to distribute the control and management through an agent-based network with synchronization via a mean field Hamiltonian approach, such as with each agent characterized by a data Hamiltonian that defines the dynamics and interaction of one or more corresponding components in the target system, and with each such data Hamiltonian of an agent being dynamically computed from sensory data and actions. Such a data Hamiltonian (for a single target system component) and/or mean field Hamiltonian (for multiple coordinated target system components) can be thought of as a mathematical function that helps navigate a query through huge bodies of information by defining a spectrum of possible outcomes, including to model history, current situation and possible options. Non-exclusive example embodiments using such techniques are further described herein, but it will be appreciated that other embodiments may differ in one or more manners from these example embodiments.

A data Hamiltonian may be implemented as a function that captures the flow and interdependence of a data domain, and may have three types of variables (e.g., state variables, flow variables, and decision or control variables). A CDI control agent may be implemented as a control state manager engine operating in a data domain that belongs to a multi-data domain, and the CDD system may be implemented as a formal, distributed control state manager rule-based process for resolving time-based queries from a distributed agent-based domain in real-time. A CDI control agent of the CDD system may be implemented using Horn clause rules of three types, as follows: absolute rules that characterize the physics of a physical target system being controlled (or otherwise describe unchangeable rules in other types of target systems), and have truth value equal to true in any Hamiltonian realization (e.g., a value of 0 for false or 1 for true); hard rules that characterize the desired behavior and goals, and have truth value equal to true in any Hamiltonian realization (e.g., a value of 0 for false or 1 for true); and soft rules that characterize the empirical knowledge of the operation, heuristic strategies, economic dispatch, and response to anomalies and learning strategies, and have a variable, probabilistic truth value in [0,1], as well as an associated confidence value for that variable, probabilistic truth value in some embodiments. Meta-rules that are special kinds of soft rules may be used to transform sensory data and desired behavior into constraint data Hamiltonians. Soft rules can be thought of as being used to navigate queries through "gradients" (information that is neither true nor false), as a means of identifying what areas of data are pertinent to any given query. Such conversion of constraints for a CDI control agent may include the following: transform truth values $\{0,1\}$ to a $[0,1]$ interval; transform variables and parameters to continuous variables and parameters; transform absolute rules to equality constraints; transform hard rules to equality constraints; transform soft rules to inequality constraints; transform inclusion sets to functional forms; transform algorithms to differential equations; etc.

Some further aspects of implementing such techniques for modeling target systems and performing automated operations to control such target systems, including in a distributed manner using multiple agents, are included in U.S. patent application Ser. No. 14/746,738, filed Jun. 22, 2015 and entitled "Cooperative Distributed Control Of Target Systems;" in U.S. Patent Application No. 62/182,968, filed Jun. 22, 2015 and entitled "Applications Of Cooperative Distributed Control Of Target Systems;" in U.S. Patent Application No. 62/182,796, filed Jun. 22, 2015 and entitled "Gauge Systems;" and in international PCT Patent Application No. PCT/US2015/037022, filed Jun. 22, 2015 and entitled "Cooperative Distributed Control Of Target Systems," each of which is hereby incorporated by reference in its entirety.

Figure 2B:
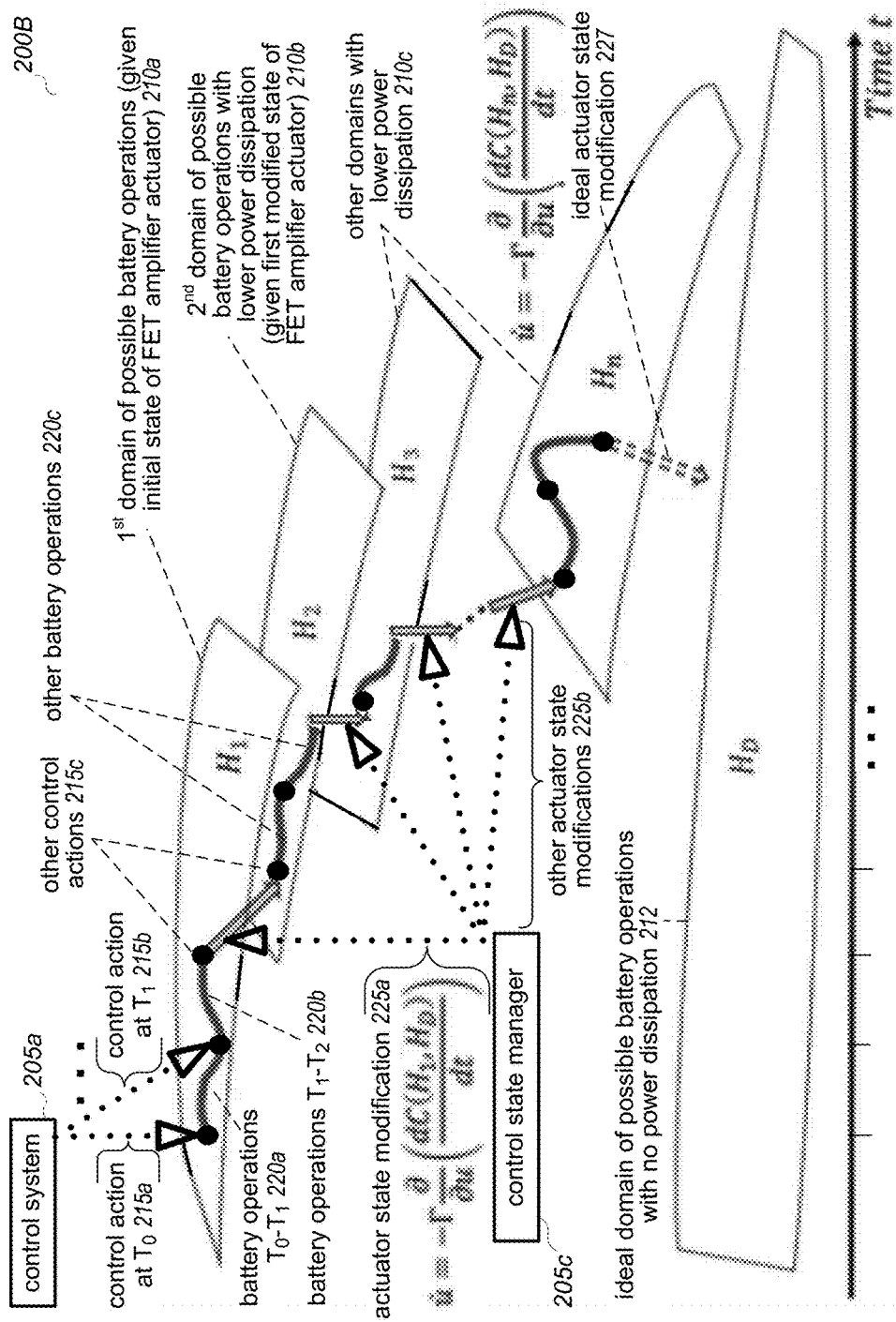

FIG. 2B continues the example of FIG. 2A, and provides additional details about the control state improvement feedback loop and corresponding operations of the control state manager component discussed with respect to FIG. 2A. FIG. 2B illustrates components that include control system 205a and control state manager component 205c of FIG. 2A—while other components of FIG. 2A are not illustrated (e.g., battery 205b, FET amplifier actuator 205e, sensors 205d, etc., such components may similarly be present. FIG. 2B further illustrates multiple domains 210 that each represents a set of possible control actions and the response trajectories of the battery 205b, with different domains corresponding to different sets of state information for control system actuator 205e (e.g., different amounts of impedance or resistance provided by the actuator, different amounts of time that one or more impedances or resistances are provided, etc.), and with the control state manager component using the described techniques to automatically propagate changes in at least state and momentum that move the battery system being controlled (including the actuator 205e) to different domains over time.

As previously noted, the battery 205b may be modeled with a Hamiltonian function that includes operational constraints, and the control state manager component 205c applies described propagation techniques to determine a domain in which the constraints are satisfied and sensor information from the battery (e.g., voltage and current) is compatible with the operational constraints. The control state manager component further performs the described techniques to improve functionality of the control system 205a by applying a descent algorithm to reduce dissipation and move to a new domain that is closer to an idealized domain having non-dissipation battery operations (also referred to at times herein as a "paradise set"). In at least some embodiments and situations, the idealized domain may never be reached, but the control state manager component nevertheless improves functionality of the control system by reducing the amount of energy that is dissipated from the battery being controlled by the control system. Thus, rules for a control system agent may be used to define constraints for a data Hamiltonian for the agent, and converted to a constraint optimization problem that a corresponding CDD system solves, with the control state manager component improving control system functionality during use in a non-optimization manner without any defined criteria to optimize by instead repeatedly reducing differences between a current and idealized domain of control actions and their responses.

Thus, the control state manager component performs automated operations in at least some embodiments to, for a constrained Hamiltonian manifold representing a domain of possible response trajectories to control actions and labeled by a control action that defines how to deform the constrained manifold, propagate the manifold (and its associated domain) so that it approaches an idealized manifold (with an associated idealized domain) defined by a desired Hamiltonian. This control action includes the commands to the battery being controlled by the control system agent, as well as the status of the device (e.g., as measured with relation to a standardized time, such as a world clock time). The control state manager component generates state and momentum trajectories and manifold deformation control actions, and in at least some embodiments provides an implementation of a programmable descent algorithm (e.g., a version of Hamilton Jacobi equations coupled with a descent control propagator, optionally addressing a variational problem and using a Riemann descent schema), attempting to drive the controlled system towards an operational region defined by the idealized behavior rules encoded in a Hamiltonian manifold (e.g., an idealized manifold defined by rules that characterize best operation in some pre-defined set of rules)—thus, for a data Hamiltonian with state, momentum and control vectors, the control state manager component may find a time sequence of "descent paths" for the control system agent to move as close as possible to the idealized domain.

As previously noted, the battery model may be encoded by a constrained Data Hamiltonian that captures the behavior and dynamic rules for an associated control system agent, such as with the Lagrangian of each control system agent is being constructed according to energy conservation, and the data Hamiltonian being derived from the Lagrangian using a Legendre transformation, and hard rules added to the data Hamiltonian according to Paul Dirac's theorem of constrained Hamiltonians. The automated techniques of the control state manager component then allow the computation of trajectories that satisfy the constraints, approximate optimality condition given by Lagrangian, and generate a control law that drives the system manifold under control close to the idealized domain, as shown in FIG. 2B. Thus, the control system 205a may perform one or more control actions 215 in the initial domain 210a, such as control actions 215a and 215b at times $T_0$ and $T_1$, respectively, resulting in corresponding battery operation trajectories 220 such as 220a and 220b, respectively. The control system manager component 205c may use the described techniques to determine and implement various modifications or other adjustments 225 to the state of the control system actuator that result in corresponding domain changes, such as modification 225a (using its indicated algorithm, as described further below) to move the battery operations from domain $H_1$ 210a to a next domain $H_2$ 210b having lower power dissipation. Other similar control actions 215c, battery operation trajectories 220c, actuator state modifications 225b and other domains 210c are similarly illustrated. As previously noted, while the operations repeatedly reduce the distance to idealized domain $H_D$ 212, in at least some embodiments and situations, a final modification 227 (using its indicated algorithm, as described further below) to reach the idealized domain may not be possible. Furthermore, even if a lower domain is reached that has lower power dissipation based on the automated operations of the control state manager component, other changes in the system being controlled (e.g., with respect to internal state of the battery, such as chemistry or temperature; with respect to an electrical load served by the battery and/or electrical source supplying the battery; etc.) may cause other changes that move the system operations back to a higher domain with higher power dissipation (not shown)—if so, the control state manager component may similarly continue to perform further actuator state modifications to again move the system operations to lower domains. In at least some embodiments, the control state manager component may be executed in real-time with feedback of passive sensory data and a specifically designed sliding window, providing an open loop feedback system (also called a predictive control system), as discussed further below.

To provide various example details of how one embodiment of the control system manager component's automated techniques may be performed, and given a particular desired behavior for determining how to propagate values to move to a lower domain (also referred to as implementing a control law) for an initial Hamiltonian H(q, p, u) and an idealized Hamiltonian $H_D(q_D, p_D)$, desired behavior of the CDI control state manager component model may be represented as minimizing the distance between H and $H_D$, i.e., $$\min \frac{1}{2}(H(q, p, u) - H_D(q_D, p_D))^2 \qquad (1)$$

where u is a control vector, q and p are state and momentum vectors regarding to the Hamiltonian H, and q and p satisfy the Hamilton Jacobi equations as follows:

$$\dot{q} = \frac{\partial H}{\partial p}$$

$$\dot{p} = -\frac{\partial H}{\partial q}$$

with $q_D$ and $p_D$ being state and momentum vectors regarding the idealized Hamiltonian $H_D$ and satisfying the further Hamilton Jacobi equations as follows:

$$\dot{q}_D = \frac{\partial H_D}{\partial p_D}$$

$$\dot{p}_D = -\frac{\partial H_D}{\partial q_D}$$

$H_D$ encodes the idealized paradise set $P_s$, which satisfy the following conditions:

as time $t \to \infty$, let $(q(t),p(t))|_{t\to\infty}$ and $u(t)|_{t\to\infty}$ be corresponding to the Hamiltonian=$\lim_{t\to\infty} H(q(t),p(t), u(t))$, if$(q(t),p(t))|_{t\to\infty} \in P_s$, then $\dot{u}(t)_{t\to\infty}=0$ (1)

if$(q_D(0),p_D(0)) \in P_s$, then for sufficiently small $t>0$, $(q_D(t),p_D(t)) \in P_s$ (2)

The automated techniques operate to find one or more control signal(s) that give a time sequence of "descent path" for propagating a constrained Hamiltonian manifold as close as possible to the paradise set. In addition, these conditions indicate that if the controlled system's state is in the paradise set, no control is necessary to generate trajectories, as only the initial condition of the state is used—however, if external effects change the paradise set, the control law would be reactivated to drive the system to the new paradise set. The particular desired behavior for determining how to propagate values to move to a lower domain (also referred to as implementing a control law) may be automatically extracted from behavior rules of the target system being controlled in some embodiments, although in other embodiments the control law may instead be manually defined by an operator of the control system and/or a CDD system that creates the control system.

A Hamiltonian model of an electrical network can be expressed with two parts, in which only one part depends on the control vector u, per Tellegen's theorem, and the control vector in the Hamiltonian has the following form:

$$H(q, p, u) = H^{(0)}(q, p) + \sum_{j=1}^{m} (H_j^{(1)}(q, p) \cdot u_j)$$

where m is the dimension of the control vector u. Desired behavior regarding such two-parts Hamiltonian can be expressed as the following:

$$\min \frac{1}{2}\left[H^{(0)}(q, p) + \sum_{j=1}^{m} (H_j^{(1)}(q, p) \cdot u_j) - H_D(q_D, p_D)\right]^2 \quad (2)$$

To derive the control state manager component, simplify the notation by using $C(H(q,p,u),H_D(q_D,p_D))$ to represent the desired behavior, i.e.

$$C(H(q, p, u), H_D), H_D(q_D, p_D)) = \frac{1}{2}\left[H^{(0)}(q, p) + \sum_{j=1}^{m} (H_j^{(1)}(q, p) \cdot u_j) - H_D(q, p)\right]^2$$

Then descend the desired behavior $C(H(q,p,u),H_D(q_D,p_D))$ as follows.
If $$\dot{u} = -\Gamma \cdot \frac{\partial}{\partial u}\left(\frac{dC|_u}{dt}\right)$$

then $$\lim_{t \to \infty} \dot{u}(t) \to 0$$

$$\lim_{t \to \infty} C(H, H_D) \to \in$$

where $$\dot{u} = \frac{du}{dt}$$

and $\Gamma$ is a positive scalar which can be viewed as step size, and $$\frac{dC|_u}{dt}$$

is the derivative over time t with a fixed value of u. The condition $\lim_{t \to \infty} C(H, H_D) \to \in$ implies that, given $$\dot{u} = -\Gamma \cdot \frac{\partial}{\partial u}\left(\frac{dC|_u}{dt}\right),$$

as time goes to infinity, the Hamiltonian manifold may not reach the paradise set, but can guarantee that it reaches a region which is $\in$ away from the paradise set.

To show how to apply the descent path given above to propagate a Hamiltonian manifold, labeled by a control action that defines how to deform the constrained manifold, so that it approaches an ideal idealized manifold defined by an idealized Hamiltonian, consider the following. Given the current implemented control $u(t_0)$, and the state and momentum at current time $t_0$ (i.e., $q(t_0)$ and $p(t_0)$), dynamics for propagating q and p from Hamilton Jacobi equations are as follows, with control vector u fixed as $u(t_0)$:

$$\dot{q}|_{u(t0)} = \frac{\partial H(q|_{u(t0)}, p|_{u(t0)}, u(t_0))}{\partial p|_{u(t0)}} \quad (3)$$

$$\dot{p}|_{u(t0)} = -\frac{\partial H(q|_{u(t0)}, p|_{u(t0)}, u(t_0))}{\partial q|_{u(t0)}} \quad (4)$$

where $q|_{u(t0)}, p|_{u(t0)}$ denote the propagated state and momentum with fixed u with the value $u(t_0)$, and $\dot{q}|_{u(t0)}, \dot{p}|_{u(t0)}$ are the corresponding changing rates of $q|_{u(t0)}, p|_{u(t0)}$. Consider the desired behavior C given by equation (2). According to the results above, in order to get $\dot{u}$, first get derivative of the desired behavior C over time t with control vector u to be fixed as $u(t_0)$, i.e.

$$\frac{dC|_{u(t_0)}}{dt} = [H(q|_{u(t_0)}, p|_{u(t_0)}, u(t)) - H_D(q_D,$$

$$p_D)] \cdot \left[\left(\frac{\partial H(q|_{u(t_0)}, p|_{u(t_0)}, u(t))}{\partial q|_{u(t_0)}} \cdot \dot{q}\bigg|_{u(t_0)} + \frac{\partial H(q|_{u(t_0)}, p|_{u(t_0)}, u(t))}{\partial p|_{u(t_0)}} \cdot \dot{p}\bigg|_{u(t_0)}\right) - \left(\frac{\partial H_D}{\partial q_D}\dot{q}_D + \frac{\partial H_D}{\partial p_D}\dot{p}_D\right)\right]$$

with $q|_{u(t0)}, p|_{u(t0)}, \dot{q}|_{u(t0)}, \dot{p}|_{u(t0)}$ provided by propagating Hamilton Jacobi equations of $H(q,p,u)$ with control vector u to be fixed as $u(t_0)$. Replacing $\dot{q}_D, \dot{p}_D$ appeared in the term $$\left(\frac{\partial H_D}{\partial q_D}\dot{q}_D + \frac{\partial H_D}{\partial p_D}\dot{p}_D\right) \text{ of } \frac{dC|_{u(t_0)}}{dt}$$

equation by Hamilton Jacobi equations of the idealized Hamiltonian $H_D(q_D, p_D)$ gives $$\frac{\partial H_D}{\partial q_D}\dot{q}_D + \frac{\partial H_D}{\partial p_D}\dot{p}_D = \frac{\partial H_D}{\partial q_D}\cdot\frac{\partial H_D}{\partial p_D} - \frac{\partial H_D}{\partial p_D}\cdot\frac{\partial H_D}{\partial q_D} = 0$$

Therefor the term $$\left(\frac{\partial H_D}{\partial q_D}\dot{q}_D + \frac{\partial H_D}{\partial p_D}\dot{p}_D\right)$$

can be removed from $$\frac{dC|_{u(t_0)}}{dt}$$

equation.

$$0 = \frac{\partial H_D}{\partial q_D}\dot{q}_D + \frac{\partial H_D}{\partial p_D}\dot{p}_D = \frac{dH_D}{dt}$$

implies $H_D$ is a constant over time, and therefore $H_D$ can be evaluated with $q_D(t_0)$ and $p_D(t_0)$. Removing the term $$\left(\frac{\partial H_D}{\partial q_D}\dot{q}_D + \frac{\partial H_D}{\partial p_D}\dot{p}_D\right)$$

from $$\frac{dC|_{u(t_0)}}{dt}$$

gives $$\frac{dC|_{u(t_0)}}{dt} = [H(q|_{u(t_0)}, p|_{u(t_0)}, u(t)) -$$

$$H_D(q_D(t_0), p_D(t_0))]\cdot\left[\left(\frac{\partial H(q|_{u(t_0)}, p|_{u(t_0)}, u(t))}{\partial q|_{u(t_0)}}\cdot\right.\right.$$

$$\left.\left.\dot{q}\bigg|_{u(t_0)} + \frac{\partial H(q|_{u(t_0)}, p|_{u(t_0)}, u(t))}{\partial p|_{u(t_0)}}\cdot\dot{p}\bigg|_{u(t_0)}\right)\right]$$

Next, take partial derivative of $$\frac{dC|_{u(t_0)}}{dt}$$

over the control vector u, let $u_j$ be the $j^{th}$ element of the u vector, and derive $$\frac{\partial}{\partial u_j}\left(\frac{dC|_{u(t_0)}}{dt}\right)$$

for j=1,2, . . . , m as follows:

$$\frac{\partial}{\partial u_j}\left(\frac{dC|_{u(t_0)}}{dt}\right) = \frac{\partial H(q|_{u(t_0)}, p|_{u(t_0)}, u(t))}{\partial u_j}\cdot\left[\frac{\partial H(q|_{u(t_0)}, p|_{u(t_0)}, u(t))}{\partial q|_{u(t_0)}}\cdot\right.$$

$$\left.\dot{q}\bigg|_{u(t_0)} + \frac{\partial H(q|_{u(t_0)}, p|_{u(t_0)}, u(t))}{\partial p|_{u(t_0)}}\cdot\dot{p}\bigg|_{u(t_0)}\right] + [H(q|_{u(t_0)}, p|_{u(t_0)},$$

$$u(t)) - H_D(q_D(t_0), p_D(t_0))]\cdot\left[\frac{\partial}{\partial u_j}\left(\frac{\partial H(q|_{u(t_0)}, p|_{u(t_0)}, u(t))}{\partial q|_{u(t_0)}}\right)\cdot\right.$$

$$\left.\dot{q}\bigg|_{u(t_0)} + \frac{\partial}{\partial u_j}\left(\frac{\partial H(q|_{u(t_0)}, p|_{u(t_0)}, u(t))}{\partial p|_{u(t_0)}}\right)\cdot\dot{p}\bigg|_{u(t_0)}\right]$$

And $$H(q|_{u(t_0)}, p|_{u(t_0)}, u(t)) =$$

$$H^{(0)}(q|_{u(t_0)}, p|_{u(t_0)}) + \sum_{k=1}^{m}(H_k^{(1)}(q|_{u(t_0)}, p|_{u(t_0)})\cdot u_k(t)$$

$$\frac{\partial H(q|_{u(t_0)}, p|_{u(t_0)}, u(t))}{\partial u_j} = H_j^{(1)}(q|_{u(t_0)}, p|_{u(t_0)})$$

$$\frac{\partial H(q|_{u(t_0)}, p|_{u(t_0)}, u(t))}{\partial q|_{u(t_0)}} =$$

$$\frac{\partial H^{(0)}(q|_{u(t_0)}, p|_{u(t_0)})}{\partial q|_{u(t_0)}} + \sum_{k=1}^{m}\left(\frac{\partial H_k^{(1)}(q|_{u(t_0)}, p|_{u(t_0)})}{\partial q|_{u(t_0)}}\cdot u_k(t)\right)$$

$$\frac{\partial H(q|_{u(t_0)}, p|_{u(t_0)}, u(t))}{\partial p|_{u(t_0)}} =$$

$$\frac{\partial H^{(0)}(q|_{u(t_0)}, p|_{u(t_0)})}{\partial p|_{u(t_0)}} + \sum_{k=1}^{m}\left(\frac{\partial H_k^{(1)}(q|_{u(t_0)}, p|_{u(t_0)})}{\partial p|_{u(t_0)}}\cdot u_k(t)\right)$$

$$\frac{\partial}{\partial u_j}\left(\frac{\partial H(q|_{u(t_0)}, p|_{u(t_0)}, u(t))}{\partial q|_{u(t_0)}}\right) = \frac{\partial H_j^{(1)}(q|_{u(t_0)}, p|_{u(t_0)})}{\partial q|_{u(t_0)}}$$

$$\frac{\partial}{\partial u_j}\left(\frac{\partial H(q|_{u(t_0)}, p|_{u(t_0)}, u(t))}{\partial p|_{u(t_0)}}\right) = \frac{\partial H_j^{(1)}(q|_{u(t_0)}, p|_{u(t_0)})}{\partial p|_{u(t_0)}}$$

results in $$\frac{\partial}{\partial u_j}\left(\frac{dC|_{u(t_0)}}{dt}\right) =$$

$$H_j^{(1)}(q|_{u(t_0)}, p|_{u(t_0)})\cdot\left[\left(\frac{\partial H^{(0)}(q|_{u(t_0)}, p|_{u(t_0)})}{\partial q|_{u(t_0)}} +\right.\right.$$

$$\sum_{k=1}^{m}\left(\frac{\partial H_k^{(1)}(q|_{u(t_0)}, p|_{u(t_0)})}{\partial q|_{u(t_0)}}\cdot u_k(t)\right)\right)\cdot\dot{q}\bigg|_{u(t_0)} + \left(\frac{\partial H^{(0)}(q|_{u(t_0)}, p|_{u(t_0)})}{\partial p|_{u(t_0)}} +\right.$$

$$\sum_{k=1}^{m}\left(\frac{\partial H_k^{(1)}(q|_{u(t_0)}, p|_{u(t_0)})}{\partial p|_{u(t_0)}}\cdot u_k(t)\right)\right)\cdot\dot{p}\bigg|_{u(t_0)}\right] + \left[H^{(0)}(q|_{u(t_0)}, p|_{u(t_0)}) +\right.$$

$$\sum_{k=1}^{m}(H_k^{(1)}(q|_{u(t_0)}, p|_{u(t_0)})\cdot u_k(t)) -$$

-continued $$H_D(q_D(t_0), p_D(t_0))\right] \cdot \left[\frac{\partial H_j^{(1)}(q|_{u(t_0)}, p|_{u(t_0)})}{\partial q|_{u(t_0)}} \cdot \right.$$

$$\left. \dot{q}\bigg|_{u(t_0)} + \frac{\partial H_j^{(1)}(q|_{u(t_0)}, p|_{u(t_0)})}{\partial p|_{u(t_0)}} \cdot \dot{p}\bigg|_{u(t_0)}\right]$$

By grouping the terms with u and the terms without u, the $$\frac{\partial}{\partial u_j}\left(\frac{dC|_{u(t_0)}}{dt}\right)$$

equation can be written as $$\frac{\partial}{\partial u_j}\left(\frac{dC|_{u(t_0)}}{dt}\right) = \alpha_j(H|_{u(t_0)}, H_D|_{t_0}) + \sum_{k=1}^{m}\beta_{jk}(H|_{u(t_0)}, H_D|_{t_0})\cdot u_k$$

where $$\alpha_j(H|_{u(t_0)}, H_D|_{t_0}) = H_j^{(1)}(q|_{u(t_0)}, p|_{u(t_0)}) \cdot$$

$$\left(\frac{\partial H^{(0)}(q|_{u(t_0)}, p|_{u(t_0)})}{\partial q|_{u(t_0)}} \cdot \dot{q}\bigg|_{u(t_0)} + \frac{\partial H^{(0)}(q|_{u(t_0)}, p|_{u(t_0)})}{\partial p|_{u(t_0)}} \cdot \dot{p}\bigg|_{u(t_0)}\right) +$$

$$(H^{(0)}(q|_{u(t_0)}, p|_{u(t_0)}) - H_D(q_D(t_0), p_D(t_0))) \cdot$$

$$\left(\frac{\partial H_j^{(1)}(q|_{u(t_0)}, p|_{u(t_0)})}{\partial q|_{u(t_0)}} \cdot \dot{q}\bigg|_{u(t_0)} + \frac{\partial H_j^{(1)}(q|_{u(t_0)}, p|_{u(t_0)})}{\partial p|_{u(t_0)}} \cdot \dot{p}\bigg|_{u(t_0)}\right)$$

$$\beta_{jk}(H|_{u(t_0)}, H_D|_{t_0}) =$$

$$H_j^{(1)}(q|_{u(t_0)}, p|_{u(t_0)}) \cdot \left[\frac{\partial H_k^{(1)}(q|_{u(t_0)}, p|_{u(t_0)})}{\partial q|_{u(t_0)}} \cdot \dot{q}\bigg|_{u(t_0)}\right.$$

$$\left. + \frac{\partial H_k^{(1)}(q|_{u(t_0)}, p|_{u(t_0)})}{\partial p|_{u(t_0)}} \cdot \dot{p}\bigg|_{u(t_0)}\right] +$$

$$H_k^{(1)}(q|_{u(t_0)}, p|_{u(t_0)}) \cdot \left[\frac{\partial H_j^{(1)}(q|_{u(t_0)}, p|_{u(t_0)})}{\partial q|_{u(t_0)}} \cdot \right.$$

$$\left. \dot{q}\bigg|_{u(t_0)} + \frac{\partial H_j^{(1)}(q|_{u(t_0)}, p|_{u(t_0)})}{\partial p|_{u(t_0)}} \cdot \dot{p}\bigg|_{u(t_0)}\right]$$

Therefore, the dynamics for propagating the control vector, i.e.

$$\dot{u} = -\Gamma \cdot \frac{\partial}{\partial u}\left(\frac{dC|_u}{dt}\right),$$

is given by $$\dot{u} = -\Gamma \cdot \left[\alpha_j(H|_{u(t0)}, H_D|_{t_0}) + \sum_{k=1}^{m}\beta_{jk}(H|_{u(t0)}, H_D|_{t_0})\cdot u_k\right] \quad (5)$$

This equation is a Reimann descent model, and equations (3), (4) and (5) can be solved numerically using a numerical propagator, for use by the control state manager component in implementing the described techniques in at least some embodiments.

In many target systems, the state is constrained by operational requirements, limitations of the domain and other reasons, which are described by hard rules in models of those target systems. The hard rules can be used construct a constraint Hamiltonian using Dirac theory, in which the Lagrangian of each CDI control system agent is constructed according to energy conservation, the data Hamiltonian is derived from the Lagrangian using the Legendre transformation such that the momentum vector p(t) appeared in the data Hamiltonian has the following relationship with the Lagrangian that is denoted by L(q(t), q̇(t), u(t)), where q(t) is state vector, q̇(t) is changing rate of q(t), and u(t) is control vector as follows:

$$P(t) = \frac{\partial L(q(t), \dot{q}(t), u(t))}{\partial \dot{q}(t)}$$

System constraints are incorporated into the Hamiltonian using state dependent multipliers, as described below. To construct a constrained Hamiltonian using hard rules, also referred to as a Total Hamiltonian and denoted by $H_T$, and given the unconstrained Hamiltonian $$H(q, p, u) = H^{(0)}(q, p) + \sum_{j=1}^{m}H_j^{(1)}(q, p)\cdot u_j$$

let $\phi_i(q,p)=0$ for i=1,2, . . . , l be hard rules associated with the state q vector and momentum p, where $\phi_i$'s are independent functions.

The total data Hamiltonian is given as $$H_T(q, p, u) = H^{(0)}(q, p) + \sum_{j=1}^{m}H_j^{(1)}(q, p)\cdot u_j + \sum_{i=1}^{l}\lambda_i\phi_i(q, p)$$

with constraint $$M\lambda + V = 0$$

where $$V = \begin{bmatrix} \{\phi_1, H^{(0)}\} + \sum_{j=1}^{m}\{\phi_1, H_j^{(1)}\}\cdot u_j \\ \{\phi_2, H^{(0)}\} + \sum_{j=1}^{m}\{\phi_2, H_j^{(1)}\}\cdot u_j \\ \vdots \\ \{\phi_l, H^{(0)}\} + \sum_{j=1}^{m}\{\phi_l, H_j^{(1)}\}\cdot u_j \end{bmatrix}$$

$$M = \begin{bmatrix} \{\phi_1, \phi_1\} & \{\phi_1, \phi_2\} & \{\phi_1, \phi_3\} & \cdots & \{\phi_1, \phi_l\} \\ \{\phi_2, \phi_1\} & \{\phi_2, \phi_2\} & \{\phi_2, \phi_3\} & \cdots & \{\phi_2, \phi_l\} \\ \vdots & \vdots & \vdots & \ddots & \vdots \\ \{\phi_l, \phi_1\} & \{\phi_l, \phi_2\} & \{\phi_l, \phi_3\} & \cdots & \{\phi_l, \phi_l\} \end{bmatrix}$$

$$\lambda = \begin{bmatrix} \lambda_1 \\ \lambda_2 \\ \vdots \\ \lambda_l \end{bmatrix}$$

The constraint $M\lambda + V = 0$ is derived from Poisson bracket, $$\{\phi_i, H_T\} = \{\phi_i, H^{(0)}\} + \sum_{j=1}^{m} \{\phi_i, H_j^{(1)}\} \cdot u_j + \sum_{l=1}^{l} \lambda_l \{\phi_i, \phi_l\}$$

for all i=1, ..., l, which allows the hard rules to define a feasible manifold, and is sometimes referred to as Dirac Compatibility condition. If $\phi_i$'s are independent functions then the Poisson bracket matrix M is invertible. The constrained Hamiltonian $H_T(q, p, u)$ satisfies the following Hamilton-Jacobi equations as long as the state and momentum moving along the surface defined by the hard rules $\phi_i(q,p)=0$ for i=1,2, ..., l $$\dot{q} = \frac{\partial H_T}{\partial p} = \frac{\partial H^{(0)}}{\partial p} + \sum_{j=1}^{m} \frac{\partial H_j^{(1)}}{\partial p} \cdot u_j + \sum_{i=1}^{l} \lambda_i \frac{\partial \phi_i}{\partial p}$$

$$\dot{p} = -\frac{\partial H_T}{\partial q} = -\frac{\partial H^{(0)}}{\partial q} - \sum_{j=1}^{m} \frac{\partial H_j^{(1)}}{\partial q} \cdot u_j - \sum_{i=1}^{l} \lambda_i \frac{\partial \phi_i}{\partial q}$$

The dynamics of control vector u is still derived by $$\dot{u} = -\Gamma \cdot \frac{\partial}{\partial u}\left(\frac{dC|_u}{t}\right),$$

but here the idealized behavior function C is constructed from the constrained Hamiltonian $H_T(q, p, u)$ as well as the idealized Hamiltonian $H_D(q_D, p_D)$.

In at least some embodiments, the propagating of state, control and momentum values is performed in the following manner. Let $t_0$ to be current world clock time, and let the time interval $[t_0, t_0+\Delta_T]$ be a defined window of future time for propagating state q, momentum p, and the control u, by the control state manager component. Let (2*K) be the total number of time points to be sampled over the time interval, and define the bucket time $\delta_t$ such that $\delta_t = \Delta_T/(2*K)$, which corresponds to the sampling period of the propagated results. In such embodiments, steps for propagating state q, momentum p, and control u over the time interval $[t_0, t_0+\Delta_T]$ are as follows:

Given $q(t_0)$, $p(t_0)$, $u(t_0)$, $q_D(t_0)$ and $p_D(t_0)$, evaluate $H_D|t_0 = H_D(q_D(t_0), p_D(t_0))$, and set current time $t_c = t_0$ At time $t_c$, given $p(t_c)$, $q(t_c)$ and $u(t_c)$, compute $\lambda$ from equation—$M\lambda=V$, where M, V are defined as above.

Propagate q(t) and p(t) over time interval $[t_c, t_c+\delta_t]$ by integrating the dynamics $$\dot{q} = \frac{\partial H_T}{\partial p}$$

and $$\dot{p} = -\frac{\partial H_T}{\partial q}$$

with u to be fixed as $u(t_c)$, with $\lambda$ given by step 2, and with initial condition $q(t_c)$ and $p(t_c)$.

Propagate u(t) over time interval $[t_c, t_c+\delta_t]$ by integrating the dynamics $$\dot{u} = -\Gamma \cdot \frac{\partial}{\partial u}\left(\frac{dC|_u}{dt}\right)$$

with q(t), p(t), $\dot{q}(t)$, and $\dot{p}(t)$ given by step 3 and $\lambda$ given by step 2.

Move the time $t_c$ forward by one bucket time, i.e. $t_c \leftarrow t_c + \delta_t$
If $t_c \geq t_0 + \Delta_T$, stop; otherwise, set $$p(t_c) = \frac{\partial L(q(t), \dot{q}(t), u(t))}{\partial \dot{q}(t)}\bigg|_{t_c},$$

return to step 2.

For example, with respect to the battery 205b and actuator 205e, the propagated state information may provide a vector of state values indicating the desired state of the battery, which the actuator uses to guide the operation of the battery to correspond to, as close as possible, satisfying the load demand while maximizing longevity and tuning up the status of battery charge.

Figure 2C:
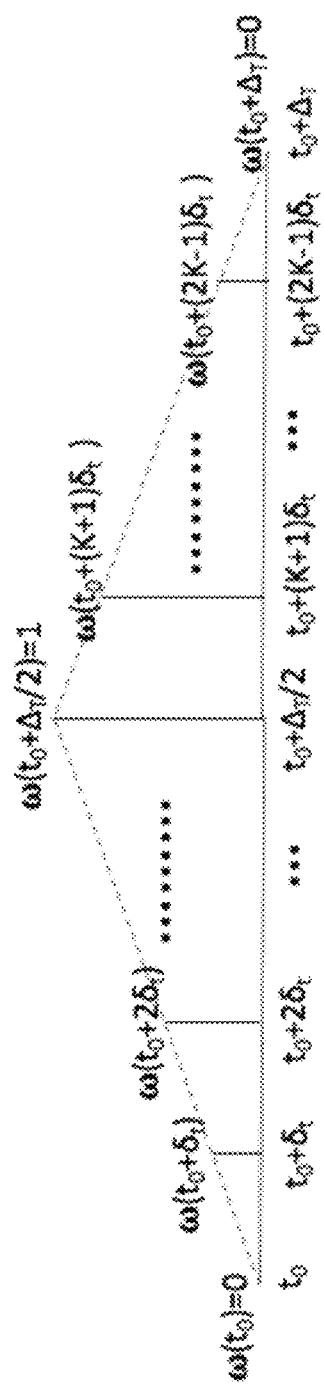
Figure 2D:
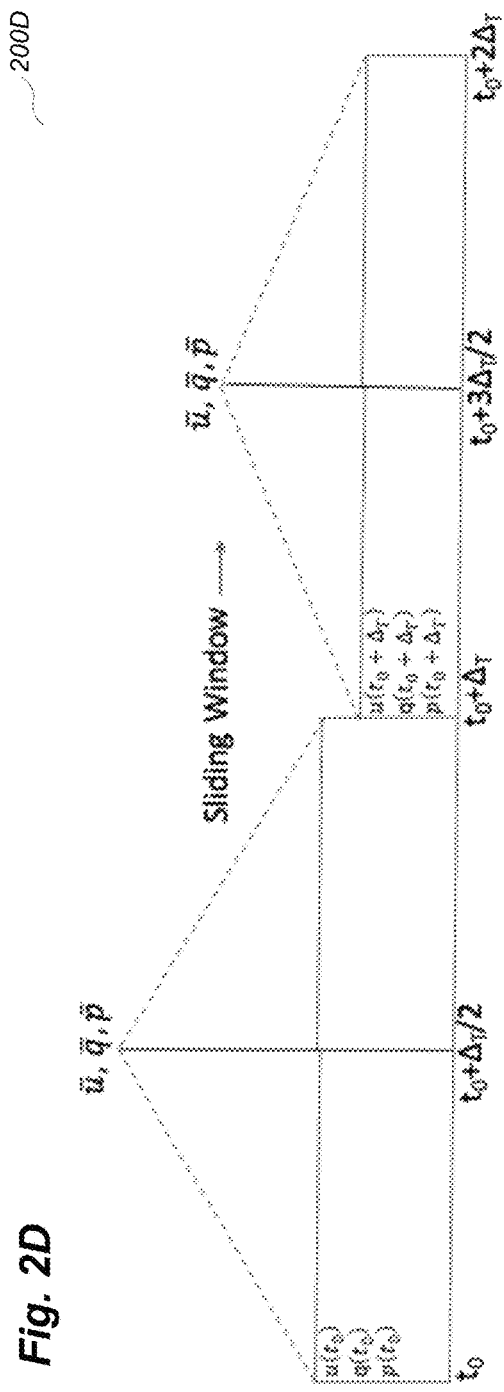

FIGS. 2C-2D continue the examples of FIGS. 2A-2B, and provide further details regarding examples of a control state manager component propagating current values for state, momentum and control for a current domain of control action responses over a defined time window toward an idealized domain. In at least some embodiments, the state, momentum and control propagated as described above are sampled and filtered by a triangle window filter to reduce aliasing effect of sampled signals, and approximate a Gaussian filter.

Let the time interval $[t_0, t_0+\Delta_T]$ be the window of future time for propagating the control u, state q and momentum p by the control state manager component, and let (2*K) be the total number of time points to be sampled over the time interval. Define the bucket time $\delta_t$ such that $\delta_t = \Delta_T/(2*K)$, which corresponds to the sampling period of the propagated results. Let $\omega(\tau)$ be the weight at sample time $\tau$. For the triangle window filter, the weight is computed as follows:

$$\omega(t_0 + k \cdot \delta_t) \begin{cases} \frac{k}{K}, & \text{if } k = 0, 1, \ldots, K \\ 2 - \frac{k}{K}, & \text{if } k = K+1, \ldots, 2 \cdot K \end{cases}$$

Information 200C of FIG. 2C graphically shows the relations between the bucket time and the weights of the triangle window filter.

Given the sampled propagation of control u, state q and momentum p over the time interval $[t_0, t_0+\Delta_T]$, and given the triangle window filter, the weighted average of the control, state and momentum are computed as follows $$\bar{u} = \frac{\sum_{k=1}^{2 \cdot K} \omega(t_0 + k \cdot \delta_t) \cdot u(t_0 + k \cdot \delta_t)}{\sum_{k=1}^{2 \cdot K} \omega(t_0 + k \cdot \delta_t)}$$

$$\bar{p} = \frac{\sum_{k=1}^{2 \cdot K} \omega(t_0 + k \cdot \delta_t) \cdot p(t_0 + k \cdot \delta_t)}{\sum_{k=1}^{2 \cdot K} \omega(t_0 + k \cdot \delta_t)}$$

$$\overline{q} = \frac{\sum_{k=1}^{2 \cdot K} \omega(t_0 + k \cdot \delta_t) \cdot q(t_0 + k \cdot \delta_t)}{\sum_{k=1}^{2 \cdot K} \omega(t_0 + k \cdot \delta_t)}$$

In at least some embodiments, the control state manager component is continuously executed in real-time, and the triangle window filter is applied with a sliding window concept, as shown in FIG. 2D. At current time $t_0$, given the initial conditions of state q, momentum p and control u, values for q, p and u are propagated over the future time window $[t_0, t_0+\Delta_T]$, and the propagated signals are sampled according to the sampling period defined by the bucket time. The triangle window filter is applied over the future time window $[t_0, t_0+\Delta_T]$ and the weighted average values $\overline{u}$, $\overline{p}$, and $\overline{q}$ are computed. These average values computed at current time $t_0$ provide the actions which will be implemented over the time interval $[t_0+\Delta_T/2, t_0+3\Delta_T/2]$, which means the implementation of the actions is half window delayed. The reason for delay is due to causality. Once the time reaches $t_0+\Delta_T/2$, the actions computed at time $t_0$ will start to be implemented for the length of a time window, until the middle of the next time window (i.e., until $t_0+3\Delta_T/2$). Meanwhile, when the time reaches the end of the window beginning at time $t_0$ (i.e., reaches $t_0+\Delta_T$), the window slides from $[t_0, t_0+\Delta_T]$ to $[t_0+\Delta_T, t_0+2\Delta T]$, and the procedure for generating the actions over the new window repeats. Notice that the sliding window parameter $\Delta T$ determines how far the q, p and u values can be propagated, and is preferably chosen so that the error due to the delay of implementing the actions is less than $O(\Delta_T/2)$ and satisfies the Hurwitz stability condition (e.g., satisfies $$\frac{1}{\lambda_{max}} > \frac{\Delta_T}{2},$$

where $1/\lambda_{max}$ is the smallest time constant), while being large enough that the control u approaches zero (i.e., $u \to \epsilon$ as $t \to \infty$).

The propagation of state q, momentum p and control u uses initial conditions. Given the historical estimated state q and the control actions, as well as the observations measured by passive sensors, the initial condition of state vector q is estimated in at least some embodiments by a nonlinear Kalman Bucy filter. The propagated control vector at the end of previous window is used in at least some embodiments to provide the initial condition for control vector, and the initial condition of momentum vector is computed in at least some embodiments from the historical estimated state and the control using Dirac conditions. The nonlinear Kalman Bucy filter is not used in limited situations in which all of the states are observable and the measurement of the error is sufficiently small (e.g., below a defined threshold). However, if some states that are not observable, or the uncertainty of the measurement is not sufficiently small, then the Kalman filter may be used. For a battery, or an electrical network, the state will be observed directly, so a non-linear Kalman Filter may not be used.

To summarize details of the examples below, an overall procedure of the control state manager component working together with the triangle window filter the sliding window can be described as follows:

(1) at current time $t_0$, get the estimated state at time $t_0$ (i.e. $\hat{q}(t_0)$) from the output of nonlinear Kalman Bucy filter (or directly observer if all states are observable and the measurement of the error is sufficiently small); set initial condition of the control vector $u(t_0)$ to be the current applied control;

(2) set $q(t_0)=\hat{q}(t_0)$, $q_D(t_0)=\hat{q}(t_0)$; compute initial condition of momentum $p(t_0)$ and idealized momentum $p_D(t_0)$ according to Dirac conditions;

(3) given the time window $[t_0, t_0+\Delta_T]$ and the integer K, setup bucket time $\delta_t=\Delta_T/(2*K)$;

(4) given the initial conditions $q(t_0)$, $p(t_0)$, $u(t_0)$, $q_D(t_0)$ and $p_D(t_0)$, propagate q, p and u over the window by applying the procedure of propagating state, momentum and control described above, sample the propagated results $p(\tau)$, $q(\tau)$ and $u(\tau)$ at each sampling time $\tau=t_0+k*\delta_t$ for $k=1,2, \ldots, 2*K$, and save for future usage;

(5) compute weighted average values $\overline{u}$, $\overline{q}$, and $\overline{p}$ according to equations discussed above;

(6) wait until time $t_0+\Delta_T/2$, and output $\overline{u}$, $\overline{q}$, and $\overline{p}$ as the actions for the future time interval $[t_0+\Delta_T/2, t_0+3\Delta_T/2]$; save for possible use with mean field; and (7) slide the time window to $[t_0+\Delta_T, t_0+2\Delta_T]$; wait until time $t_0+2\Delta_T$ and update current time variable accordingly; and return to (1).

It will be appreciated that the examples of FIGS. 2A-2D are provided for illustrative purposes and are simplified for the sake of brevity, and the inventive techniques may be used in a wide variety of other situations, including in other environments and with other types of automated control action determination techniques, some of which are discussed below. As one non-exclusive example, the control system may be performing an automated analysis of data generated by and/or received by a target system, such as in an attempt to identify anomalies with a sufficiently low degree of uncertainty (e.g., to analyze mammograph images to detect anomalies in comparison to other known-good mammograph images lacking non-normal tissue; such as to identify non-normal tissue; to analyze other types of images for differences from known-good samples; to analyze computer network traffic for differences for example network traffic that lacks problems, such as to determine problems with excess latency, excess bandwidth usage, etc.; to analyze computer system files and/or downloads and/or memory and/or storage for differences from known-good samples, such as to detect malware; etc.)—if so, the control system manager component may modify the control system to reduce differences with an idealized domain having no anomalies and no uncertainty, such as to modify a control system actuator that identifies anomalies and/or assesses uncertainty in such results, that regulates a portion of the target system generating and/or receiving the data being analyzed, etc. As another non-exclusive example, the target system may include a motor and the control system may control when and how the motor is used (e.g., to move an electrical vehicle or other type of powered vehicle, adjust valves or openings in physical systems, etc.)—if so, the control system manager component may modify the control system to reduce differences with an idealized domain having no excess torque or otherwise wasted use of the motor, such as to modify a control system actuator that regulates the output of the motor (e.g., a transmission or gear system), etc. As another non-exclusive example, the target system may include one or more super-capacitor electrical devices and the control system may control when and/or how and/or how much power is supplied to and/or from the super-capacitor(s) (e.g., to supplement batteries in use, such as batteries being used to power trains or subways or automobiles or bicycles or airplanes or drones or other vehicles, by using dynamic braking to store power and by reducing the power load on the batteries at time of vehicle acceleration or other times of high power demand, etc.)—if so, the control system manager component may modify the control system to reduce differences with an idealized domain having no power dissipation and/or no excess use of the batteries beyond a defined threshold, such as to modify a control system actuator that regulates the input to and/or output of the super-capacitor(s). As another non-exclusive example, the control system may be controlling a target system having an electrical device that performs computing functionality (e.g., a computer device or system) and generates data (e.g., network communications, data to be stored, etc.), such as in an attempt to regulate network traffic that is sent (e.g., to prevent problems of one or more defined types, such as with network latency, bandwidth usage, dropped packets, etc.) or to regulate usage of storage space and capabilities (e.g., to prevent storage bottlenecks, excess device usage, etc.)—if so, the control system manager component may modify the control system to reduce differences with an idealized domain having network traffic or other generated data that is within a defined range and/or has no problems of any of one or more defined types, such as to modify a control system actuator that regulates an amount and/or timing of network traffic sent and/or data stored, etc.

Figure 3:
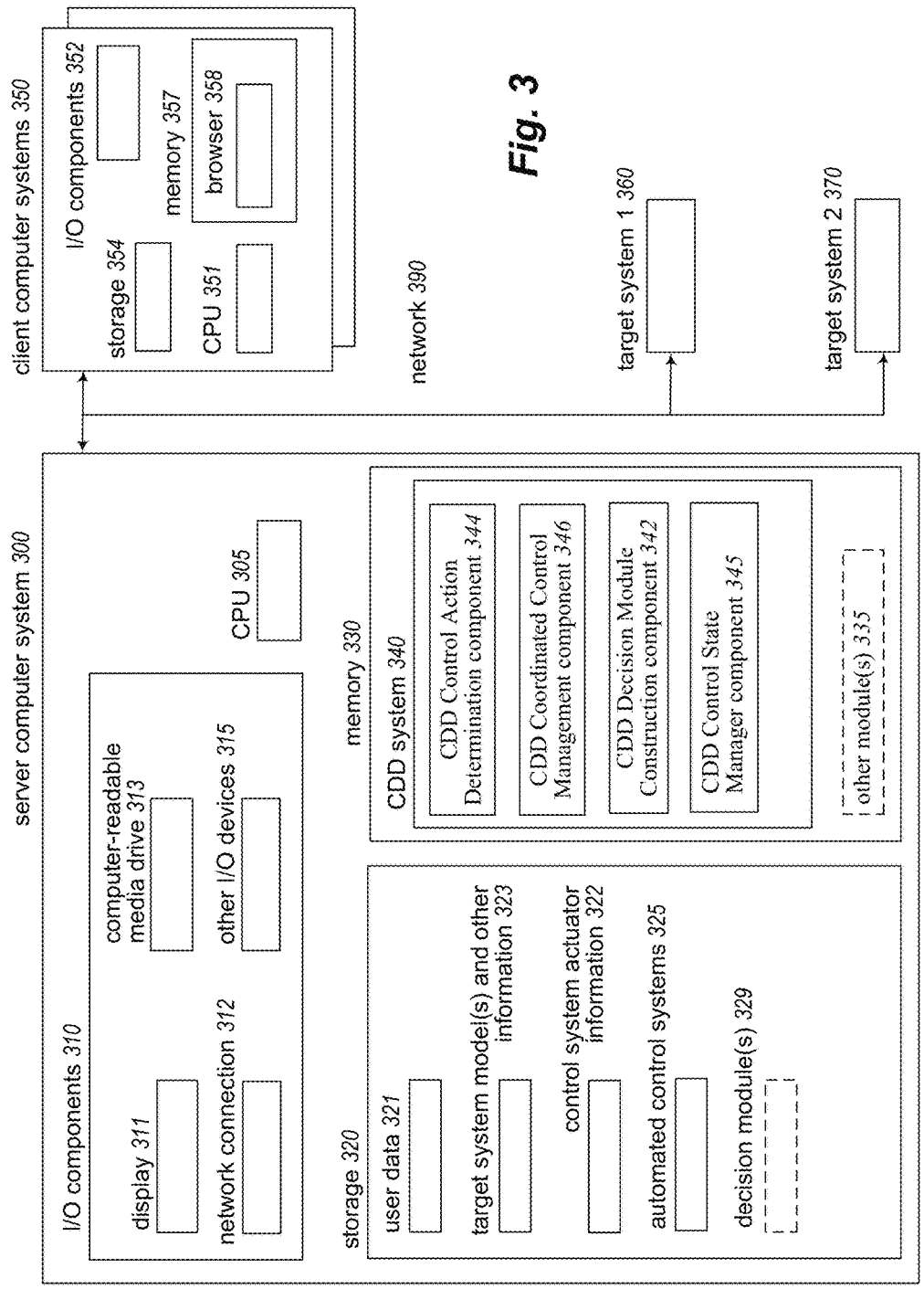
FIG. 3 is a block diagram illustrating example computing systems suitable for executing an embodiment of a system for performing cooperative distributed control of target systems in configured manners, including one or more control state manager components to repeatedly and automatically modify control components used in one or more target systems.

FIG. 3 is a block diagram illustrating example computing systems suitable for performing techniques for implementing automated control systems to control or otherwise manipulate at least some operations of specified physical systems or other target systems, including having one or more control state manager components for use in repeatedly and automatically modifying control components used in the target systems, as discussed in greater detail elsewhere herein. In particular, FIG. 3 illustrates a server computing system 300 suitable for providing at least some functionality of a CDD system including a control state manager component and other components, various client computer systems 350 that may be used by customers or other users of the CDD system 340, and one or more target systems to be controlled (in this example, target system 1 360 and target system 2 370, which are accessible to the CDD system 340 and its control state manager components 345 over one or more computer networks 390, although in other embodiments the control state manager components and/or other CDD components may execute local to a target system that they are controlling). In other embodiments, multiple computing systems may be used for the execution of a CDD system (e.g., to have one or more computing systems executing the CDD Decision Module Construction component for initial configuration and setup before run-time control occurs, and one or more other computing systems performing run-time control by executing one or more copies of the CDD Control Action Determination component 344 and/or the CDD Coordinated Control Management component 346 and/or the CDD Control State Manager component 345; to have one or more computing systems executing a Control State Manager component that are separate from one or more other computing systems executing some or all other components of a CDD system with which the control state manager component interacts; to have different computing systems executing different Control State Manager components; etc.).

In the illustrated embodiment, the Control State Manager component 345 is executing in memory 330 as part of the CDD system 340, and in some embodiments the component includes various software instructions that when executed program one or more of the hardware CPU processors 305 to provide an embodiment of a control state manager component as described elsewhere herein. During operation, in at least some embodiments, the Control State Manager component may obtain various input data (not shown) regarding a target system (e.g., from one or more sensors), and modify one or more target system state models (e.g., models 323 stored on storage 320) that are in use by one or more other CDD system components to control the target system, such as by determining adjustments to control system actuator state information 322 in use by one or more control system actuators regulating batteries or other elements of the target system, as well as exchange various information with other executing components, as discussed in greater detail elsewhere herein.

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computer systems 350 may each have components similar to those of server computing system 300, including one or more hardware CPUs 351, I/O components 352, storage 354, and memory 357, although some details are not illustrated for the computing systems 350 for the sake of brevity. The target systems 360 and 370 may also each include one or more computing systems (not shown) having components that are similar to some or all of the components illustrated with respect to server computing system 300, including to optionally locally execute one or more CDD components, but such computing systems and components are also not illustrated in this example for the sake of brevity.

The CDD system 340 is executing in memory 330 and includes components 342-346, and in some embodiments the system and/or components each includes various software instructions that when executed program one or more of the CPU processors 305 to provide an embodiment of a CDD system as described elsewhere herein. The CDD system 340 may interact with computing systems 350 over the network 390 (e.g., via the Internet and/or the World Wide Web, via a private cellular network, etc.), as well as the target systems 360 and 370 in this example. In this example embodiment, the CDD system includes functionality related to generating and deploying decision modules in configured manners for customers or other users, as discussed in greater detail elsewhere herein, as well as generating or deploying control state manager components 345 at runtime $t_0$ improve functionality of an operating control system. The other computing systems 350 may also be executing various software as part of interactions with the CDD system 340 and/or its components. For example, client computing systems 350 may be executing software in memory 357 to interact with CDD system 340 (e.g., as part of a Web browser, a specialized client-side application program, etc.), such as to interact with one or more interfaces (not shown) of the CDD system 340 to configure and deploy automated control systems (e.g., stored automated control systems 325 that were previously created by the CDD system 340 for use in controlling one or more physical target systems) or other decision modules 329, as well as to perform various other types of actions, as discussed in greater detail elsewhere.

Various information related to the functionality of the CDD system 340 may be stored in storage 320, such as information 321 related to users of the CDD system (e.g., account information), and information 323 related to one or more target systems (e.g., systems that have batteries to be controlled), including models that have been generated of particular target systems (e.g., target systems 1 and 2) and are optionally in use by an associated CDD control system.

It will be appreciated that computing systems 300 and 350 and target systems 360 and 370 are merely illustrative and are not intended to limit the scope of the present invention. The computing systems may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CDD system 340 and its components may in some embodiments be distributed in additional components. Similarly, in some embodiments some of the functionality of the CDD system 340 and/or CDD components 342-346 may not be provided and/or other additional functionality may be available.

As part of implementing an automated control system for a particular target system, an embodiment of a Collaborative Distributed Decision (CDD) system may use the described techniques to perform various automated activities involved in constructing and implementing the automated control system, including generating one or more CDI agents (also referred to as a CDD decision module or system, or a portion of such module or system) for use as some or all of an automated control system in controlling particular target systems.

In particular, the CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules (also referred to at times as "decision elements" and/or "agents") to use in performing the control of the target system. When the one or more executable decision modules are deployed and executed, the CDD system may further provide various components within or external to the decision modules being executed to manage their control of the target system, such as a Control Action Determination component of each decision module as part of a control system to optimize or otherwise enhance the control actions that the decision module generates, a Control State Manager component to improve functionality of the control system as it is controlling a target system, and/or one or more Coordinated Control Management components to coordinate the control actions of multiple decision modules that are collectively performing the control of the target system.

As noted above, a Collaborative Distributed Decision (CDD) system may in some embodiments use at least some of the described techniques to perform various automated activities involved in constructing and implementing an automated control system for a specified target system, such as to modify or otherwise manipulate inputs or other control elements of the target system that affect its operation (e.g., affect one or more outputs of the target system). An automated control system for such a target system may in some situations have a distributed architecture that provides cooperative distributed control of the target system, such as with multiple decision modules that each control a portion of the target system and that operate in a partially decoupled manner with respect to each other. If so, the various decision modules' operations for the automated control system may be at least partially synchronized, such as by each reaching a consensus with one or more other decision modules at one or more times, even if a fully synchronized convergence of all decision modules at all times is not guaranteed or achieved.

The CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules to use in performing the control of the target system. The Decision Module Construction component may thus operate as part of a configuration or setup phase that occurs before a later run-time phase in which the generated decision modules are executed to perform control of the target system, although in some embodiments and situations the Decision Module Construction component may be further used after an initial deployment to improve or extend or otherwise modify an automated control system that has one or more decision modules (e.g., while the automated control system continues to be used to control the target system), such as to implement functionality of a control state manager component to improve and update a model of a target system being controlled, or to add, remove or modify decision modules for the automated control system.

In some embodiments, some or all automated control systems that are generated and deployed may further provide various components within them for execution during the runtime operation of the automated control system, such as by including such components within decision modules in some embodiments and situations. Such components may include, for example, a Control Action Determination component of each decision module (or of some decision modules) to optimize or otherwise determine and improve the control actions that the decision module generates, and/or a Control State Manager component of each decision module (or of some decision modules) to improve functionality of the control system while it is controlling a target system. For example, such a Control Action Determination component in a decision module may in some embodiments attempt to automatically determine the decision module's control actions for a particular time to reflect a near-optimal solution with respect to or one more goals and in light of a model of the decision module for the target system that has multiple inter-related constraints and based on current state information that is modeled for the target system—if so, such a near-optimal solution may be based at least in part on a partially optimized solution that is within a threshold amount of a fully optimized solution. Such determination of one or more control actions to perform may occur for a particular time and for each of one or more decision modules, as well as be repeated over multiple times for ongoing control by at least some decision modules in some situations. In some embodiments, the model for a decision module is implemented as a Hamiltonian function that reflects a set of coupled differential equations based in part on constraints representing at least part of the target system, such as to allow the model and its Hamiltonian function implementation to be updated over multiple time periods by adding additional expressions within the evolving Hamiltonian function, as discussed in greater detail elsewhere herein.

In some embodiments, the components included within a generated and deployed automated control system for execution during the automated control system's runtime operation may further include one or more Coordinated Control Management components to coordinate the control actions of multiple decision modules that are collectively performing the control of a target system for the automated control system. For example, some or all decision modules may each include such a Coordinated Control Management component in some embodiments to attempt to synchronize that decision module's local solutions and proposed control actions with those of one or more other decision modules in the automated control system, such as by determining a consensus shared model with those other decision modules that simultaneously provides solutions from the decision module's local model and the models of the one or more other decision modules. Such inter-module synchronizations may occur repeatedly to determine one or more control actions for each decision module at a particular time, as well as to be repeated over multiple times for ongoing control. In addition, each decision module's model is implemented in some embodiments as a Hamiltonian function that reflects a set of coupled differential equations based in part on constraints representing at least part of the target system, such as to allow each decision module's model and its Hamiltonian function implementation to be combined with the models of one or more other decision modules by adding additional expressions for those other decision modules' models within the initial Hamiltonian function for the local model of the decision module, as discussed in greater detail elsewhere herein.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the Control State Manager components 345 and/or other of the CDD components 342-346, or more generally by the CDD system 340) and/or data structures, such as by execution of software instructions of the one or more software programs and/or by storage of such software instructions and/or data structures. Furthermore, in some embodiments, some or all of the systems and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
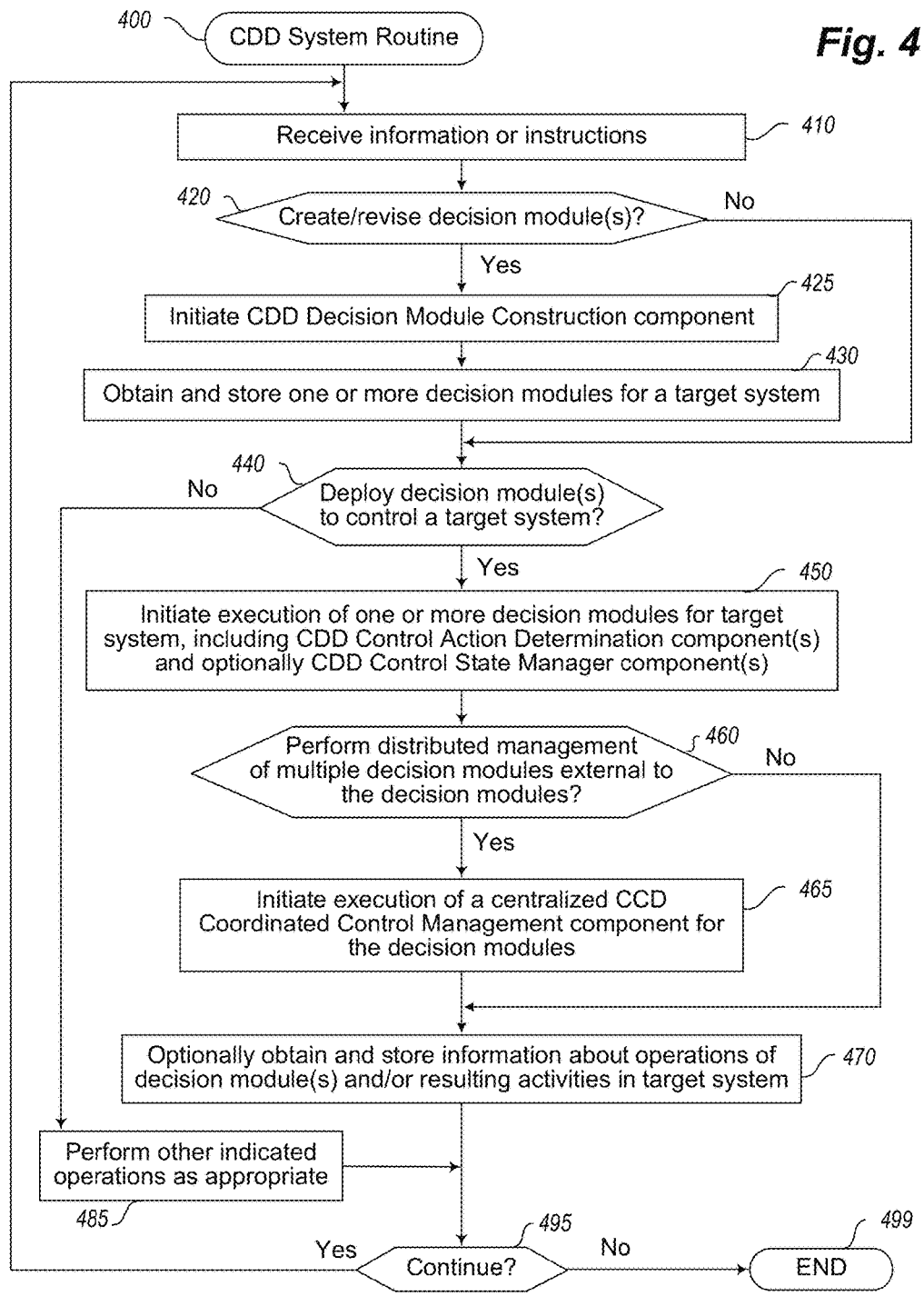
FIG. 4 illustrates a flow diagram of an example embodiment of a Collaborative Distributed Decision (CDD) System routine.

FIG. 4 is a flow diagram of an example embodiment of a Collaborative Distributed Decision (CDD) system routine 400. The routine may, for example, be provided by execution of the CDD system 340 of FIG. 3 and/or the CDD system 140 of FIG. 1B, such as to provide functionality to construct and implement automated control systems for specified target systems.

The illustrated embodiment of the routine begins at block 410, where information or instructions are received. If it is determined in block 420 that the information or instructions of block 410 include an indication to create or revise one or more decision modules for use as part of an automated control system for a particular target system, the routine continues to block 425 to initiate execution of a Decision Module Construction component, and in block 430 obtains and stores one or more resulting decision modules for the target system that are created in block 425. One example of a routine for such a Decision Module Construction component is discussed in greater detail with respect to FIGS. 5A-5B.

After block 430, or if it is instead determined in block 420 that the information or instructions received in block 410 are not to create or revise one or more decision modules, the routine continues to block 440 to determine whether the information or instructions received in block 410 indicate to deploy one or more created decision modules to control a specified target system, such as for one or more decision modules that are some or all of an automated control system for that target system. The one or more decision modules to deploy may have been created immediately prior with respect to block 425, such that the deployment occurs in a manner that is substantially simultaneous with the creation, or in other situations may include one or more decision modules that were created at a previous time and stored for later use. If it is determined to deploy one or more such decision modules for such a target system, the routine continues to block 450 to initiate the execution of those one or more decision modules for that target system, such as on one or more computing systems local to an environment of the target system, or instead on one or more remote computing systems that communicate with the target system over one or more intermediary computer networks (e.g., one or more computing systems under control of a provider of the CDD system). The execution of some or all such decision modules may further include executing an associated control state manager component to improve functionality of the decision modules and their control system during operation by adjusting state information for one or more control system actuators, with FIG. 9 providing an example of a routine for execution of a control state manager component.

After block 450, the routine continues to block 460 to determine whether to perform distributed management of multiple decision modules being deployed in a manner external to those decision modules, such as via one or more centralized Coordinated Control Management components. If so, the routine continues to block 465 to initiate execution of one or more such centralized CDD Coordinated Control Management components for use with those decision modules. After block 465, or if it is instead determined in block 460 to not perform such distributed management in an external manner (e.g., if only one decision module is executed, if multiple decision modules are executed but coordinate their operations in a distributed peer-to-peer manner via local CDD Coordinated Control Management components, etc.), the routine continues to block 470 to optionally obtain and store information about the operations of the one or more decision modules and/or resulting activities that occur in the target system, such as for later analysis and/or reporting.

If it is instead determined in block 440 that the information or instructions received in block 410 are not to deploy one or more decision modules, the routine continues instead to block 485 to perform one or more other indicated operations if appropriate. For example, such other authorized operations may include obtaining results information about the operation of a target system in other manners (e.g., by monitoring outputs or other state information for the target system), analyzing results of operations of decision modules and/or activities of corresponding target systems, generating reports or otherwise providing information to users regarding such operations and/or activities, etc. In addition, in some embodiments the analysis of activities of a particular target system over time may allow patterns to be identified in operation of the target system, such as to allow a model of that target system to be modified accordingly (whether manually or in an automated learning manner) to reflect those patterns and to respond based on them. In addition, as discussed in greater detail elsewhere, distributed operation of multiple decision modules for an automated control system in a partially decoupled manner allows various changes to be made while the automated control system is in operation, such as to add one or more new decision modules, to remove one or more existing decision modules, to modify the operation of a particular decision module (e.g., by changing rules or other information describing the target system that is part of a model for the decision module), etc. In addition, the partially decoupled nature of multiple such decision modules in an automated control system allows one or more such decision modules to operate individually at times, such as if network communication issues or other problems prevent communication between multiple decision modules that would otherwise allow their individualized control actions to be coordinated—in such situations, some or all such decision modules may continue to operate in an individualized manner, such as to provide useful ongoing control operations for a target system even if optimal or near-optimal solutions cannot be identified from coordination and synchronization between a group of multiple decision modules that collectively provide the automated control system for the target system.

After blocks 470 or 485, the routine continues to block 495 to determine whether to continue, such as until an explicit indication to terminate is received. If it is determined to continue, the routine returns to block 410, and otherwise continues to block 499 and ends.

Figure 5A:
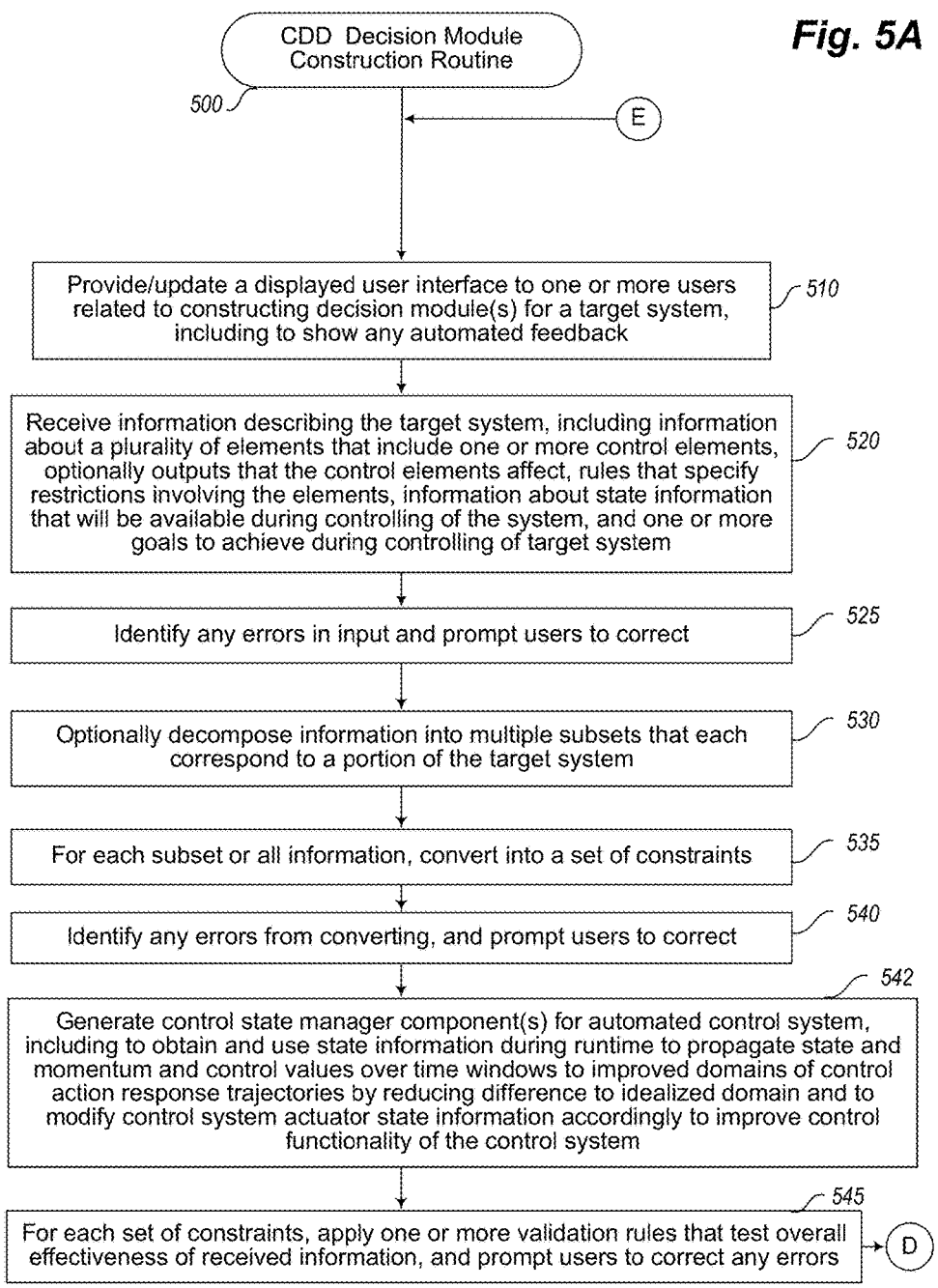

FIGS. 5A-5B illustrate a flow diagram of an example embodiment of a CDD Decision Module Construction routine 500. The routine may, for example, be provided by execution of the component 342 of FIG. 3 and/or the component 142 of FIG. 1B, such as to provide functionality to allow users to provide information describing a target system of interest, and to perform corresponding automated operations to construct one or more decision modules to use to control the target system in specified manners. While the illustrated embodiment of the routine interacts with users in particular manners, such as via a displayed GUI (graphical user interface), it will be appreciated that other embodiments of the routine may interact with users in other manners, such as via a defined API (application programming interface) that an executing program invokes on behalf of a user. In some embodiments, the routine may further be implemented as part of an integrated development environment or other software tool that is available for one or more users to use, such as by implementing an online interface that is available to a variety of remote users over a public network such as the Internet, while in other embodiments a copy of the CDD system and/or particular CDD components may be used to support a single organization or other group of one or more users, such as by being executed on computing systems under the control of the organization or group. In addition, the CDD Decision Module Construction component may in some embodiments and situations be separated into multiple sub-components, such as a rules editor component that users interact with to specify rules and other description information for a target system, and a rules compiler engine that processes the user-specified rules and other information to create one or more corresponding decision modules.

The illustrated embodiment of the routine 500 begins at block 510, where the routine provides or updates a displayed user interface to one or more users, such as via a request received at an online version of component that is implementing the routine, or instead based on the routine being executed by one or more such users on computing systems that they control. While various operations are shown in the illustrated embodiment of the routine as occurring in a serial manner for the purpose of illustration, it will be appreciated that user interactions with such a user interface may occur in an iterative manner and/or over multiple periods of time and/or user sessions, including to update a user interface previously displayed to a user in various manners (e.g., to reflect a user action, to reflect user feedback generated by operation of the routine or from another component, etc.), as discussed further below.

After block 510, the routine continues to block 520 to receive information from one or more such users describing a target system to be controlled, including information about a plurality of elements of the target system that include one or more manipulatable control elements and optionally one or more outputs that the control elements affect, information about rules that specify restrictions involving the elements, information about state information that will be available during controlling of the system (e.g., values of particular elements or other state variables, such as from passive sensors), and one or more goals to achieve during the controlling of the target system. It will be appreciated that such information may be obtained over a period of time from one or more users, including in some embodiments for a first group of one or more users to supply some information related to a target system and for one or more other second groups of users to independently provide other information about the target system, such as to reflect different areas of expertise of the different users and/or different parts of the target system.

After block 520, the routine continues to block 525 to identify any errors that have been received in the user input, and to prompt the user(s) to correct those errors, such as by updating the display in a corresponding manner as discussed with respect to block 510. While the identification of such errors is illustrated as occurring after the receiving of the information in block 520, it will be appreciated that some or all such errors may instead be identified as the users are inputting information into the user interface, such as to identify syntax errors in rules or other information that the users specify. After block 525, the illustrated embodiment of the routine continues to block 530 to optionally decompose the information about the target system into multiple subsets that each correspond to a portion of the target system, such as with each subset having one or more different control elements that are manipulatable by the automated control system being created by the routine, and optionally have overlapping or completely distinct goals and/or sets of rules and other information describing the respective portions of the target system. As discussed in greater detail elsewhere, such decomposition, if performed, may in some situations be performed manually by the users indicating different subgroups of information that they enter, and/or in an automated manner by the routine based on an analysis of the information that has been specified (e.g., based on the size of rules and other descriptive information supplied for a target system, based on inter-relationships between different rules or goals or other information, etc.). In other embodiments, no such decomposition may be performed.

After block 530, the routine continues to block 535 to, for each subset of target system description information (or for all the received information if no such subsets are identified), convert that subset (or all the information) into a set of constraints that encapsulate the restrictions, goals, and other specified information for that subset (or for all the information). In block 540, the routine then identifies any errors that occur from the converting process, and if any are identified, may prompt the user to correct those errors, such as in a manner similar to that described with respect to blocks 525 and 510. While not illustrated in this example, the routine may in some situations in blocks 525 and/or 540 return to block 510 when such errors are identified, to display corresponding feedback to the user(s) and to allow the user(s) to make corrections and re-perform following operations such as those of blocks 520-540. Errors identified in the converting process in block 540 may include, for example, errors related to inconsistent restrictions, such as if the restrictions as a group are impossible to satisfy.

After block 540, the routine continues to block 542 to generate one or more control state manager components to use at run-time with the automated control system being generated, such as one for each subset determined in block 530, one for the entire automated control system, etc. In particular, the generation of the one or more control state manager components is performed in a manner similar to that discussed with respect to FIGS. 2A-2D and elsewhere herein, including to obtain and use particular types of state, momentum and control information during runtime operations, to analyze the information to determine improvements to make to control functionality of the control system, and to implement such determined improvements in one or more control system actuators that regulate portions of the target system. Additional details related to such a control state manager component are included elsewhere herein.

After block 542, the routine continues to block 545 to, for each set of constraints (or a single constraint set if no subsets were identified in block 530), apply one or more validation rules to the set of constraints to test overall effectiveness of the corresponding information that the constraints represent, and to prompt the one or more users to correct any errors that are identified in a manner similar to that with respect to blocks 525, 540 and 510. Such validation rules may test one or more of controllability, observability, stability, and goal completeness, as well as any user-added validation rules, as discussed in greater detail elsewhere. In block 550, the routine then converts each validated set of constraints to a set of coupled differential equations that model at least a portion of the target system to which the underlying information corresponds.

After block 550, the routine continues to block 553 to perform activities related to training a model for each set of coupled differential equations, including to determine one or more of a size of a training time window to use, size of multiple training time slices within the time window, and/or a type of training time slice within the time window. In some embodiments and situations, the determination of one or more such sizes or types of information is performed by using default or pre-specified information, while in other embodiments and situations the users may specify such information, or an automated determination of such information may be performed in one or more manners (e.g., by testing different sizes and evaluating results to find sizes with the best performance). Different types of time slices may include, for example, successions of time slices that overlap or do not overlap, such that the training for a second time slice may be dependent only on results of a first time slice (if they do not overlap) or instead may be based at least in part on updating information already determined for at least some of the first time slice (if they do overlap in part or in whole). After block 553, the routine continues to block 555 to, for each set of coupled differential equations representing a model, train the model for that set of coupled differential equations using partial initial state information determined externally for the target system (e.g., from passive sensors), including to estimate values of variable that are not known and/or directly observable for the target system by simulating effects of performing control actions over the time window, such as for successive time slices throughout the time window, and to test the simulated performance of the trained model. Additional details related to training and testing are included elsewhere herein.

After block 555, the routine continues to block 560 to determine whether the training and testing was successful, and if not returns to block 510 to display corresponding feedback information to the users to allow them to correct errors that caused the lack of success. If it is instead determined in block 560 that the testing and training were successful, however, the routine continues instead to block 585 to generate an executable decision module for each trained and tested model that includes that model, as well as a local CCD Control Action Determination component that the decision module will use when executed to determine optimal or near-optimal control actions to perform for the target system based on the information included in the model and in light of the one or more goals for that decision module, and that includes or uses at least one CCD control state manager component generated in block 542. The generated executable decision module may in some embodiments and situations further include a local CCD Coordinated Control Management component to coordinate control actions of multiple decision modules that collectively will provide an automated control system for the target system, such as by synchronizing respective models of the various decision modules over time. After block 585, the routine continues to block 590 to provide the generated executable decision modules for use, including to optionally store them for later execution and/or deployment.

After block 590, the routine continues to block 595 to determine whether to continue, such as until an explicit indication to terminate is received. If it is determined to continue, the routine returns to block 510, and otherwise continues to block 599 and ends.

Figure 6A:
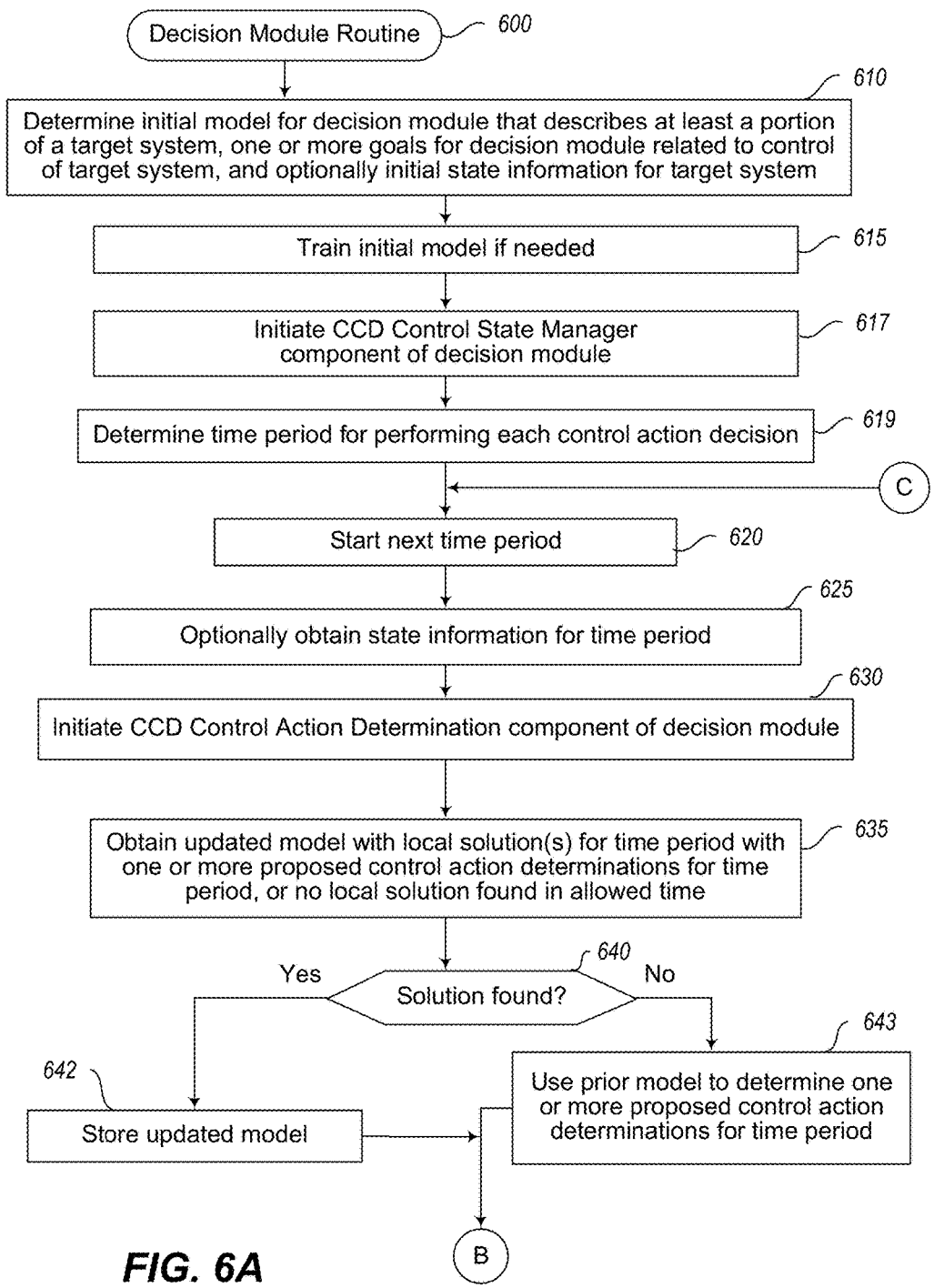
FIGS. 6A-6B illustrate a flow diagram of an example embodiment of a Decision Module routine.
Figure 6B:
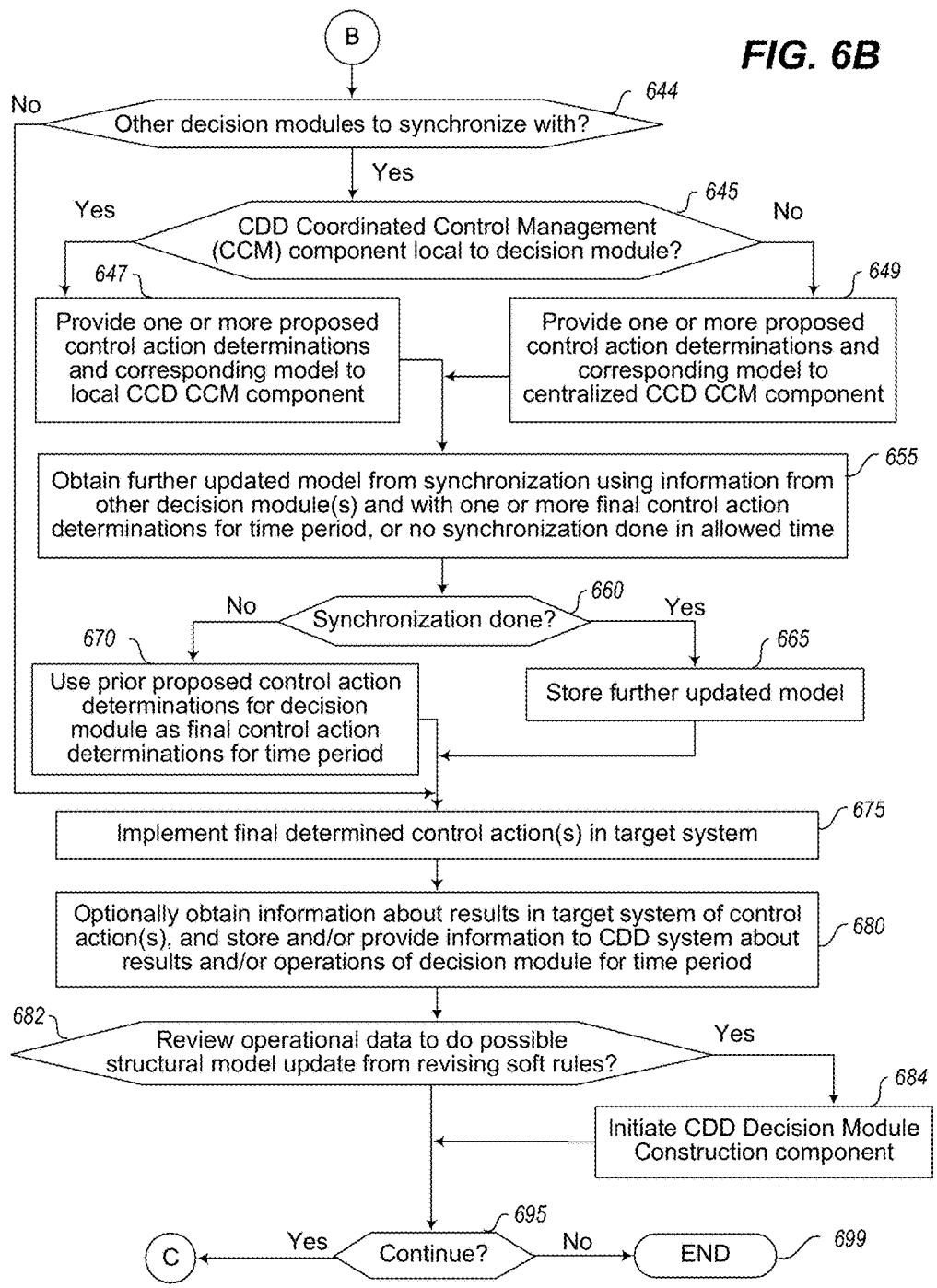

FIGS. 6A-6B illustrate a flow diagram of an example embodiment of a routine 600 corresponding to a generic representation of a decision module that is being executed. The routine may, for example, be provided by execution of a decision module 329 or as part of an automated control system 325 of FIG. 3, the automated control system 195a of FIG. 1A, the automated control system 205a of FIGS. 2A-2D, and/or a decision module 124 or 128 of FIG. 1B or 1C, such as to provide functionality for controlling at least a portion of a target system in a manner specific to information and a model encoded for the decision module, including to reflect one or more goals to be achieved by the decision module during its controlling activities. As discussed in greater detail elsewhere, in some embodiments and situations, multiple decision modules may collectively and cooperatively act to control a particular target system, such as with each decision module controlling one or more distinct control elements for the target system or otherwise representing or interacting with a portion of the target system, while in other embodiments and situations a single decision module may act alone to control a target system. The routine 600 further reflects actions performed by a particular example decision module when it is deployed in controlling a portion of a target system, although execution of at least portions of a decision module may occur at other times, such as initially to train a model for the decision module before the decision module is deployed, as discussed in greater detail with respect to the CDD Decision Module Construction routine 500 of FIGS. 5A-5B.

The illustrated embodiment of the routine 600 begins at block 610, where an initial model for the decision module is determined that describes at least a portion of a target system to be controlled, one or more goals for the decision module to attempt to achieve related to control of the target system, and optionally initial state information for the target system. The routine continues to block 615 to perform one or more actions to train the initial model if needed, as discussed in greater detail with respect to blocks 553 and 555 of FIGS. 5A-5B—in some embodiments and situations, such training for block 615 is performed only if initial training is not done by the routine 500 of FIGS. 5A-5B, while in other embodiments and situations the training of block 615 is performed to capture information about a current state of the target system at a time that the decision module begins to execute (e.g., if not immediately deployed after initial creation and training) and/or to re-train the model at times as discussed in greater detail with respect to routine 700 of FIGS. 7A-7B as initiated by block 630.

Figure 9:
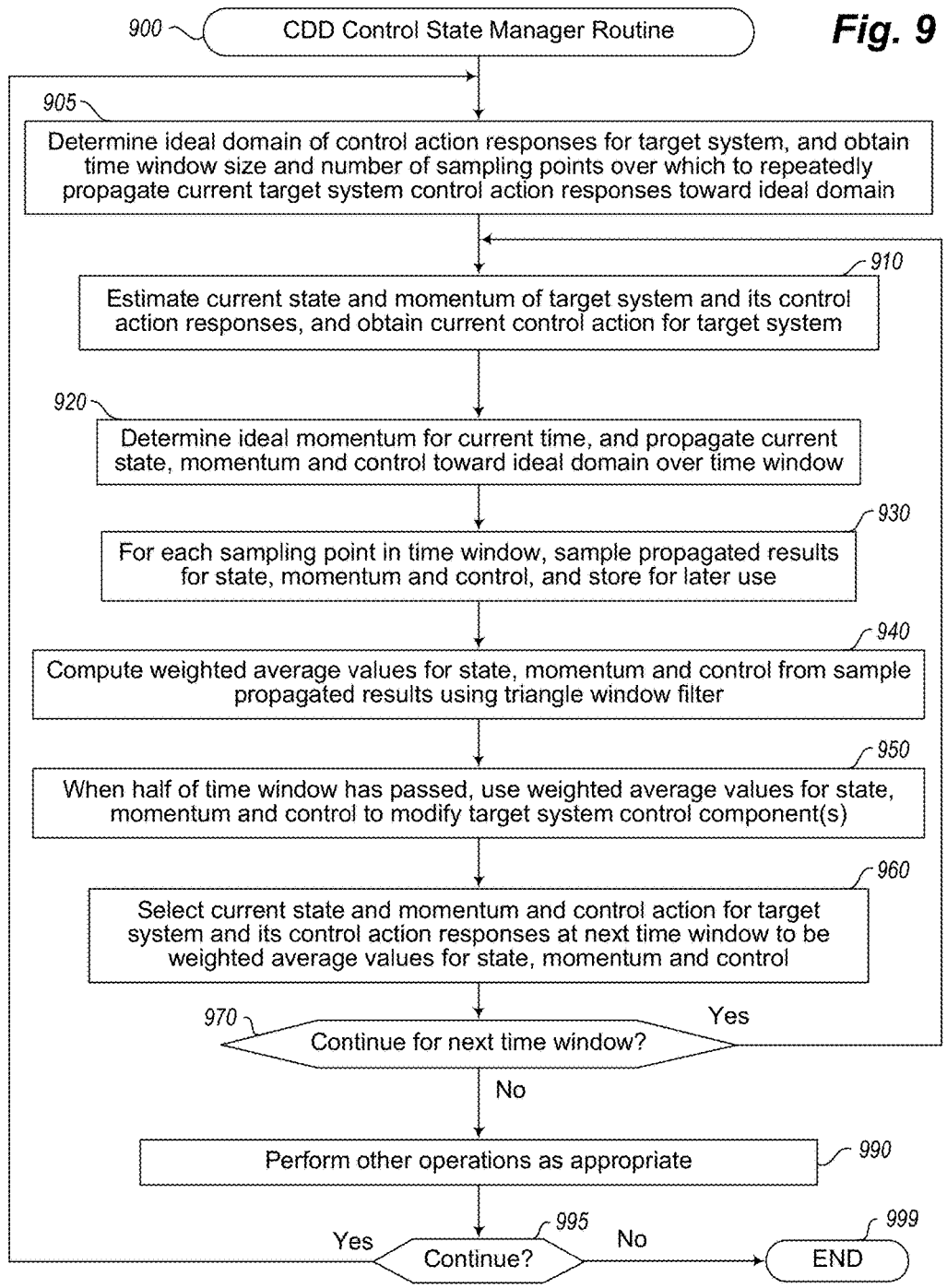
FIG. 9 illustrates a flow diagram of an example embodiment of a CDD Control State Manager routine.

After block 615, the routine continues to block 617 to initiate execution of a control state manager component that performs a control state improvement feedback loop concurrently with other control loop actions performed by the illustrated routine, including to improve control functionality of the decision module and its control system during operation of the routine 600 by modifying state information of one or more control system actuators that regulate operations of portions of the target system. One example of execution of such a control state manager component is illustrated in FIG. 9.

After block 617, the routine continues to block 619 to determine a time period to use for performing each control action decision for the decision module, such as to reflect a rate at which control element modifications in the target system are needed and/or to reflect a rate at which new incoming state information is received that may alter future manipulations of the control elements. The routine then continues to block 620 to start the next time period, beginning with a first time period moving forward from the startup of the execution of the decision module. Blocks 620-680 are then performed in a control loop for each such time period going forward until execution of the decision module is suspended or terminated, although in other embodiments a particular decision module may execute for only a single time period each time that it is executed.

In block 625, the routine optionally obtains state information for the time period, such as current state information that has been received from the target system (e.g., via one or more passive sensors) or one or more related external sources since the last time period began, and/or by actively retrieving current values of one or more elements of the target system or corresponding variables as needed. In block 630, the routine then initiates execution of a local CCD Control Action Determination component of the decision module, with one example of such a routine discussed in greater detail with respect to routine 700 of FIGS. 7A-7B. In block 635, the results of the execution of the component in block 630 are received, including to either obtain an updated model for the decision module with a local solution for the current time period and decision module that includes one or more proposed control action determinations that the decision module may perform for the current time period, or to receive an indication that no local solution was found for the decision module in the allowed time for the execution of the component in block 630. It is then determined in block 640 whether a solution was found, and if so continues to block 642 to store the updated model for the decision module, and otherwise continues to block 643 to use the prior model for the decision module to determine one or more control action determinations that are proposed for the current time period based on a previous model (e.g., that does not reflect recent changes in state information and/or recent changes in activities of other decision modules, if any), as discussed in greater detail with respect to routine 700 of FIGS. 7A-7B.

After blocks 642 or 643, the routine continues to block 644 to determine if other decision modules are collectively controlling portions of the current target system, such as part of the same automated control system as the local decision module, and if so continues to block 645. Otherwise, the routine selects the local proposed control actions of the decision module as a final determined control action to perform, and continues to block 675 to implement those control actions for the current time period.

If there are other operating decision modules, the routine in block 645 determines if the local decision module includes a local copy of a CDD Coordinated Control Management (CCM) component for use in synchronizing the proposed control action determinations for the decision module's local solutions with activities of other decision modules that are collectively controlling the same target system. If so, the routine continues to block 647 to provide the one or more proposed control action determinations of the decision module and the corresponding current local model for the decision module to the local CDD CCM component, and otherwise continues to block 649 to provide the one or more proposed control action determinations for the decision module and the corresponding local model of the decision module to one or more centralized CDD CCM components.

After blocks 647 or 649, the routine continues to block 655 to obtain results of the actions of the CDD CCM component(s) in blocks 647 or 649, including to either obtain a further updated model resulting from synchronization of the local model for the current decision module with information from one or more other decision modules, such that the further updated model indicates one or more final control action determinations to perform for the time period for the current decision module, or an indication that no such synchronization was completed in the allowed time. The routine continues to block 660 to determine whether the synchronization was completed, and if so continues to block 665 to store the further updated model from the synchronization, and otherwise continues to block 670 to use the prior proposed control action determinations locally to the decision module as the final control action determinations for the time period.

After blocks 665 or 670, the routine continues to block 675 to implement the one or more final determined control actions for the decision module in the target system, such as by interacting with one or more effectuators or other actuators in the target system that regulate one or more control elements of the target system (e.g., modify input and/or output values of, or otherwise manipulate them), or by otherwise providing input to the target system to cause such modifications or other manipulations to occur. In block 680, the routine optionally obtains information about the results in the target system of the control actions performed, and stores and/or provides information to the CDD system about such obtained results and/or about the activities of the decision module for the current time period. After block 680, the routine continues to block 682 to determine whether to do a possible structural model adaptation update based on learned soft rules (if any), such as periodically, based on whether or not a solution was found with respect to block 640, based on whether or not synchronization was done with respect to block 660, etc. If so, the routine continues to block 684 to initiate operations of the CDD Decision Module Construction component with respect to the control state manager component in blocks 563-583, such as to return with an updated version of the model and/or a corresponding decision module.

After block 684, or if it was determined in block 682 to not do a possible structural model adaptation update based on learned soft rules, the routine continues to block 695 to determine whether to continue, such as until an indication to terminate or suspend is received (e.g., to reflect an end to current operation of the target system or an end of use of the decision module to control at least a portion of the target system). If it is determined to continue, the routine returns to block 620 to start the next time period, and otherwise continues to block 699 and ends.

Figure 7A:
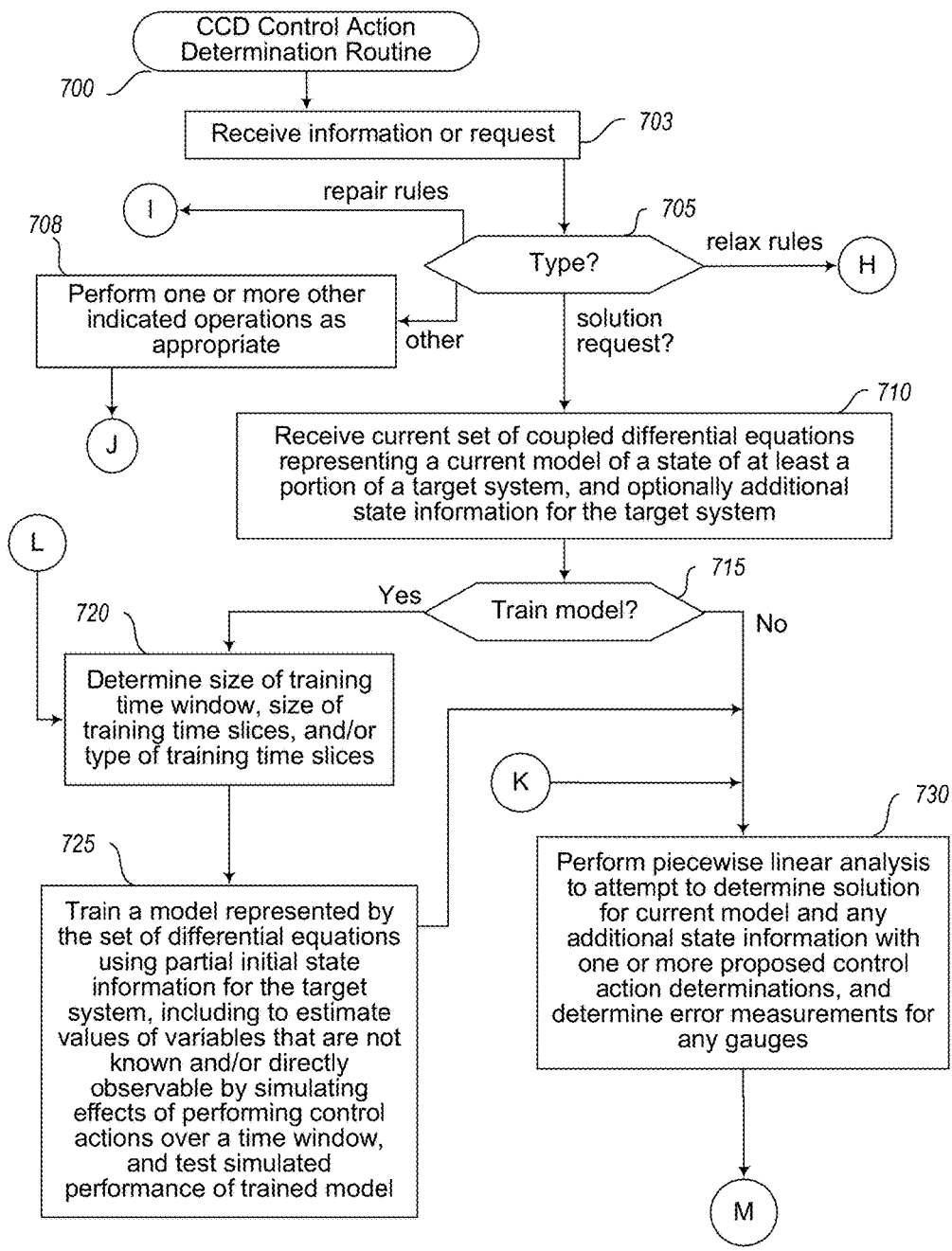
FIGS. 7A-7B illustrate a flow diagram of an example embodiment of a CDD Control Action Determination routine.
Figure 7B:
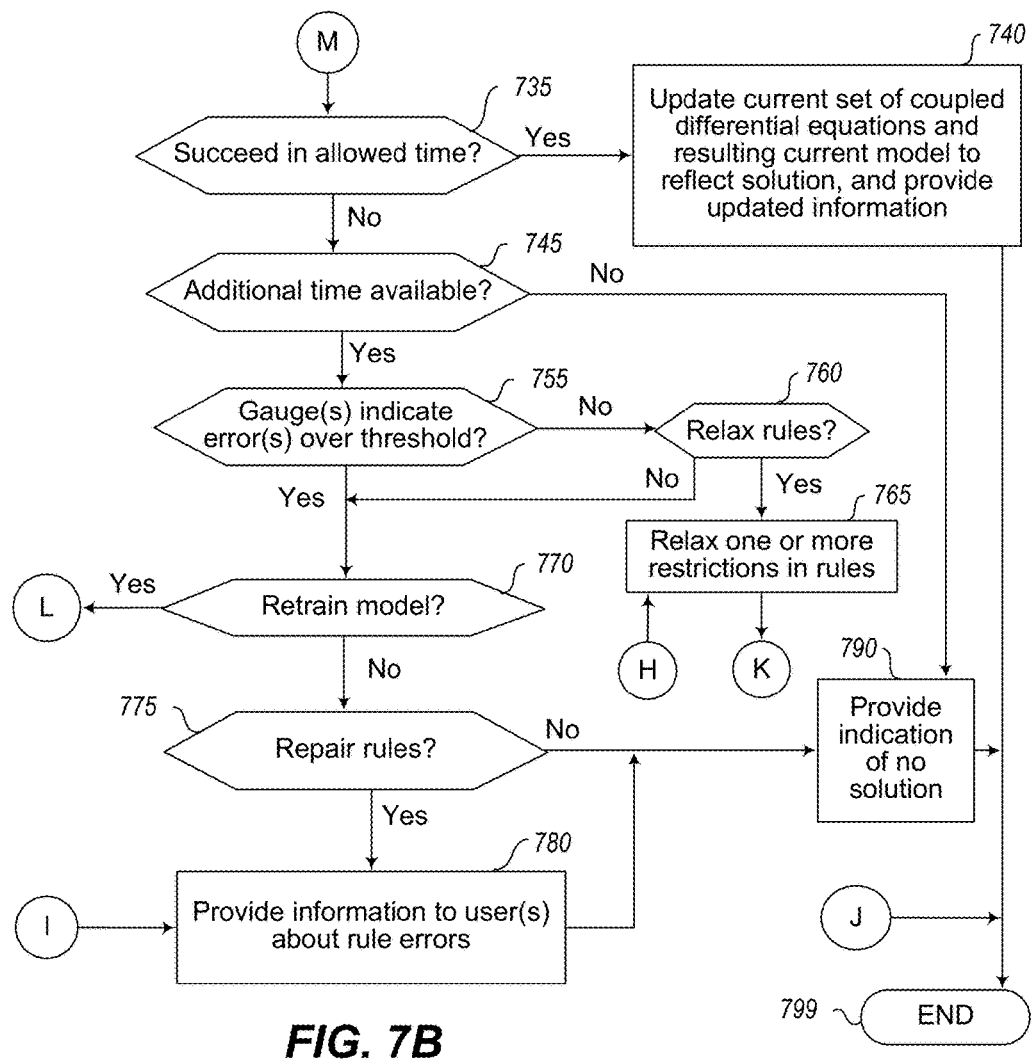

FIGS. 7A-7B are a flow diagram of an example embodiment of a CDD Control Action Determination routine 700. The routine may, for example, be provided by execution of component 344 of FIG. 3 and/or components 144*a-n* or 184 of FIG. 1C, such as to determine control actions for a decision module to propose and/or implement for a target system during a particular time period, including in some embodiments to perform an optimization to determine near-optimal actions (e.g., within a threshold of an optimal solution) to perform with respect to one or more goals if possible. While the illustrated embodiment of the routine is performed in a manner local to a particular decision module, such that some or all decision modules may each implement a local version of such a routine, in other embodiments the routine may be implemented in a centralized manner by one or more components with which one or more decision modules interact over one or more networks, such as with a particular decision module indicated to be used at a particular time rather than acting on behalf of the local decision module.

The illustrated embodiment of the routine 700 begins at block 703, where information or a request is received. The routine continues to block 705 to determine a type of the information or request, and to proceed accordingly. In particular, if a request is received in block 703 to attempt to determine a solution for a current time period given a current model of the local decision module, the routine continues to block 710 to begin to perform such activities, as discussed in greater detail with respect to block 710-790. If it is instead determined in block 705 that a request to relax one or more rules or other restrictions for the current model of the local decision module is received, such as discussed in greater detail with respect to blocks 760 and 765, the routine continues to block 765. If it is determined in block 705 that a request is received to repair one or more rules or other restrictions for the current model of the local decision module, such as discussed in greater detail with respect to blocks 775 and 780, the routine continues to block 780 to obtain user input to use during the rule repair process (e.g., to interact with a CDD Decision Module Construction component, or to instead interact with one or more users in another manner), such as to allow the current model for the local decision module to later be updated and replaced based on further resulting user actions, or if operation of the target system can be suspended, to optionally wait to further perform the routine 700 until such an updated model is received.

If it is instead determined in block 705 that the information or request is of another type, the routine continues instead to block 708 to perform one or more other indicated operations as appropriate, and to then proceed to block 799. Such other indicated operations may include, for example, receiving information about current models and/or control actions proposed or performed by one or more other decision modules that are collectively controlling a target system with the local decision module (such as for use in synchronizing the model of the local decision module with such other decision modules by generating a consensus or converged shared model, as discussed in greater detail with respect to routine 800 of FIGS. 8A-8B), to receive updates to a model or underlying information for the model for use in ongoing operation of the routine 700 (e.g., from a CDD Decision Module Construction component, such as results from interactions performed in block 780; etc.), to receive current state information for the target system, such as for use as discussed in routine 600 of FIGS. 6A-6B, etc.

If it determined in block 705 that a request for a solution was received in block 703 for a current time period and based on a current model of the local decision module, the routine continues to block 710 to receive a current set of coupled differential equations that represent the current model for the local decision module of at least a portion of the target system, optionally along with additional state information for the target system for the current time. The routine then continues to block 715 to determine whether to train or re-train the model, such as if the routine is called for a first time upon initial execution of a corresponding decision module or if error measurements from ongoing operations indicate a need for re-training, as discussed in greater detail with respect to blocks 755, 770 and 730. If it is determined to train or re-train the model, the routine continues to block 720 to determine one or more of the size of a training time window, size of training time slices within the time window, and/or type of training time slices within the training time window, such as in a manner similar to that previously discussed with respect to block 553 of routine 500 of FIGS. 5A-5B. After block 720, the routine continues to block 725 to use partial initial state information for the target system to train the model, including to estimate values of state variables for the target system that are not known and/or directly observable, by simulating effects of performing control actions over the time window for each of the time slices, as discussed in greater detail with respect to block 555 of routine 500 of FIGS. 5A-5B.

After block 725, or if it is instead determined in block 715 not to train or re-train the model, the routine continues to block 730 to perform a piecewise linear analysis to attempt to determine a solution for the current model and any additional state information that was obtained in block 710, with the solution (if determined) including one or more proposed control action determinations for the local decision module to take for a current time period, as well as in some embodiments to use one or more model error gauges to make one or more error measurements with respect to the current model, as discussed in greater detail elsewhere. The routine then continues to block 735 to determine if the operations in block 730 determined a solution within an amount of time allowed for the operation of block 730 (e.g., a defined subset or fraction of the current time period), and if so continues to block 740 to update the current set of coupled differential equations and the resulting current model for the local decision module to reflect the solution, with the resulting updated information provided as an output of the routine 700.

If it is instead determined in block 735 that the operations in block 730 did not determine a solution, the routine continues to block 745 to determine if additional time is available within the current time period for further attempts to determine a solution, and if not continues to block 790 to provide output of the routine 700 indicating that no solution was determined for the current time period.

If additional time is available within the current time period, however, the routine continues to perform blocks 755-780 to perform one or more further attempts to identify the solution—it will be appreciated that one or more of the operations of blocks 755-780 may be repeatedly performed multiple times for a given time period if sufficient time is available to continue further solution determination attempts. In particular, the routine continues to block 755 if additional time is determined to be available in block 745, where it determines whether the measurements from one or more gauges indicate model error measurements that are over one or more thresholds indicating modifications to the model are needed, such as based on the model error measurements from the gauges discussed with respect to block 730. If not, the routine continues to block 760 to determine whether there are one or more rules or other restrictions in the current model that are available to be relaxed for the current time period (that are not absolute rules and have not previously attempted to be relaxed during the time period, if this is not the first pass through this portion of the routing for the current time period), and if so continues to block 765 to relax one or more such rules or other restrictions and to return to block 730 to re-attempt the piecewise linear analysis with the revised model based on those relaxed rules or other restrictions.

If it is instead determined in block 755 that the model error measurements from one or more of the gauges are sufficient to satisfy one or more corresponding thresholds, the routine continues instead to block 770 to determine whether to re-train the model based on one or more of the gauges indicating sufficient errors to do so, such as based on accumulated errors over one or more time periods of updates to the model. If so, the routine returns to block 720 to perform such re-training in blocks 720 and 725, and then continues to block 730 to re-attempt the piecewise linear analysis with the resulting re-trained model.

If it is instead determined in block 770 not to re-train the model (or if the model was re-trained already for the current time period and the resulting re-attempt in block 730 again failed to find a solution), the routine continues to block 775 to determine whether the model error measurements from one or more of the gauges indicate a subset of one or more rules or other restrictions in the model that potentially have errors that need to be repaired. If so, the routine continues to block 780 to provide information to one or more users via the CDD Decision Module Construction component, to allow the users to revise the rules or other restrictions as appropriate, although in other embodiments some or all such rule repair activities may instead be attempted or performed in an automated manner. After block 780, or if it is instead determined in block 775 not to repair any rules, the routine continues to block 790 to provide an indication that no solution was determined for the current time period. After blocks 740, 708, or 790, the routine continues to block 799 and ends. It will be appreciated that if the routine 700 was instead implemented as a centralized routine that supports one or more decision modules remote from the executing component for the routine, the routine 700 may instead return to block 703 to await further information or requests.

Figure 8A:
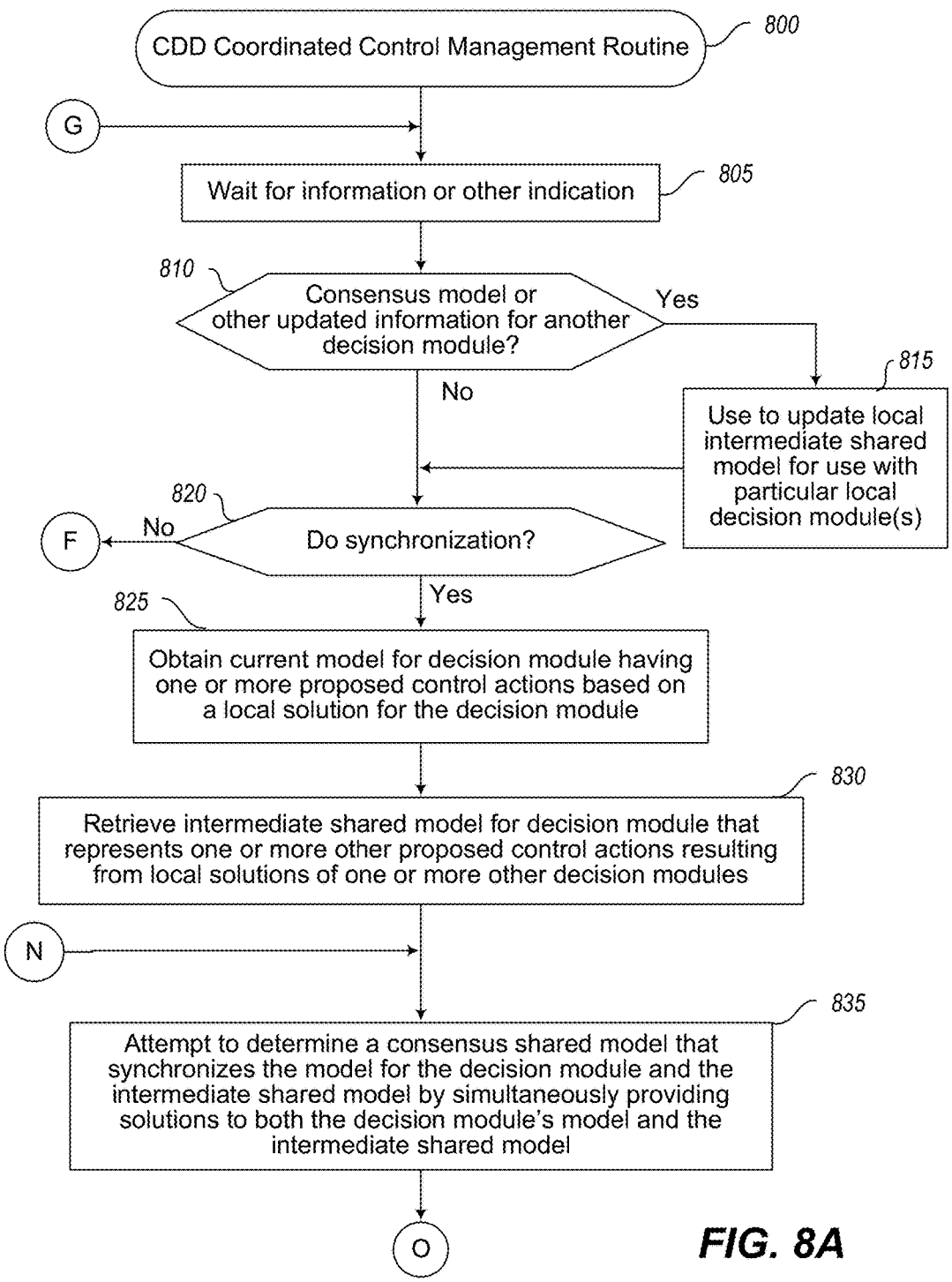
FIGS. 8A-8B illustrate a flow diagram of an example embodiment of a CDD Coordinated Control Management routine.
Figure 8B:
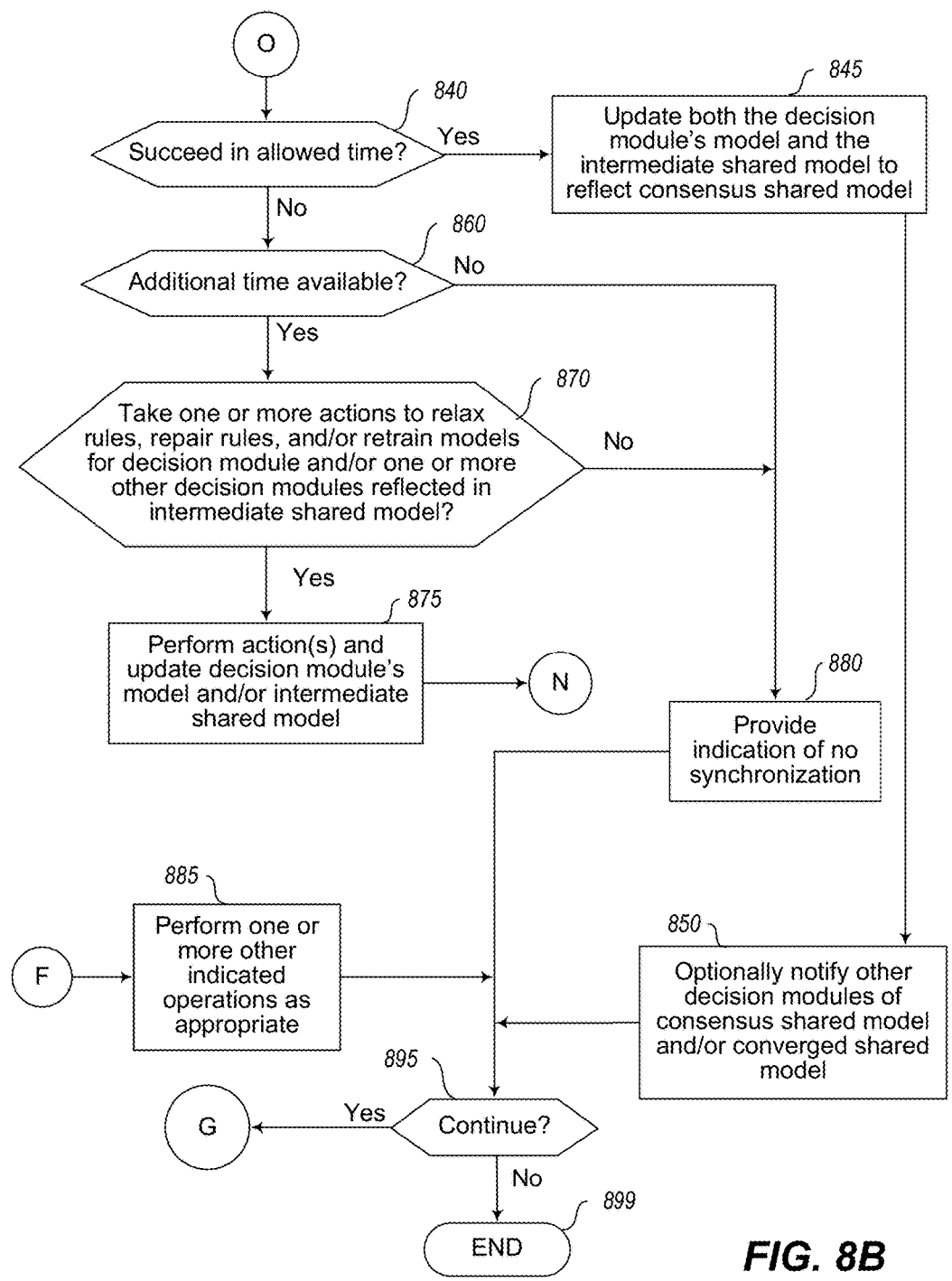

FIGS. 8A-8B are a flow diagram of an example embodiment of a CDD Coordinated Control Management routine 800. The routine may, for example, be provided by execution of the component 346 of FIG. 3 and/or the components 146a-n of FIG. 1C, such as to attempt to synchronize current models and their proposed control actions between multiple decision modules that are collectively controlling a target system. In the illustrated embodiment of the routine, the synchronization is performed in a pairwise manner between a particular local decision module's local current model and an intermediate shared model for that decision module that is based on information about the current state of one or more other decision modules, by using a Pareto game technique to determine a Pareto equilibrium if possible that is represented in a consensus shared model, although in other embodiments other types of synchronization methods may be used. In addition, in the illustrated embodiment, the routine 800 is performed in a local manner for a particular local decision module, such as by being included within that local decision module, although in other embodiments the routine 800 may be implemented in a centralized manner to support one or more decision modules that are remote from a computing system implementing the component for the routine and that communicate with those decision modules over one or more computer networks, such as with a particular decision module indicated to be used at a particular time rather than acting on behalf of the local decision module.

The illustrated embodiment of the routine 800 begins at block 805, where it waits to receive information or another indication. The routine continues to block 810 to determine if a consensus model or other updated information for another decision module has been received, such as from a copy of the routine 800 executing for that other decision module, and if so continues to block 815 to use the received information to update local intermediate shared model information for use with the local decision module on whose behalf the current copy of the routine 800 is executing, as discussed in greater detail with respect to block 830. If it is instead determined in block 810 that the information or request received in block 805 is not information related to one or more other decision modules, or after block 815, the routine continues to block 820 to determine whether to currently perform a synchronization for the current local model of the local decision module by using information about an intermediate shared model of the local decision module that includes information for one or more other decision modules, such as to do such synchronization each time that an update to the local decision module's model is received (e.g., based on operation of the routine 700 for a copy of the CDD Control Action Determination component local to that decision module) in block 805 and/or each time that information to update the local decision module's intermediate shared model is received in block 805 and used in block 815, or instead as explicitly indicated in block 805—if the synchronization is to currently be performed, the routine continues to block 825 and begins to perform blocks 820-880 related to such synchronization activities. Otherwise, the routine continues to block 885 to perform one or more other indicated operations as appropriate, such as to receive requests from the CDD system or other requestor for current information about operation of the routine 800 and/or to provide corresponding information to one or more entities (e.g., to reflect prior requests), etc.

If it is determined in block 820 that synchronization is to be currently performed, such as based on updated model-related information that is received in block 805, the routine continues to block 825 to obtain a current local model for the local decision module to use in the synchronizing, with the model including one or more proposed control actions to perform for a current time period based on a local solution for the local decision module. The routine then continues to block 830 to retrieve information for an intermediate shared model of the local decision module that represents information for one or more other decision modules (e.g., all other decision modules) that are collectively participating in controlling the target system, with that intermediate shared model similarly representing one or more other proposed control actions resulting from local solutions of those one or more other decision modules, optionally after partial or complete synchronization has been performed for those one or more other decision modules between themselves.

The routine then continues to block 835 to attempt to determine a consensus shared model that synchronizes the current model of the local decision module and the intermediate shared model by simultaneously providing solutions to both the local decision module's current model and the intermediate shared model. In some embodiments, the operations of block 835 are performed in a manner similar to that discussed with respect to blocks 710-730 of routine 700 of FIG. 7A-7B, such as if the local model and the intermediate shared model are combined to create a combination model for whom one or more solutions are to be identified. As discussed in greater detail elsewhere, in some embodiments, the local current model and intermediate shared model may each be represented by a Hamiltonian function to enable a straightforward creation of such a combined model in an additive manner for the respective Hamiltonian functions, with the operations of routines 600 and/or 700 of FIGS. 6A-6B and 7A-7B, respectively, similarly representing the models that they update and otherwise manipulate using such Hamiltonian functions.

After block 835, the routine continues to block 840 to determine whether the operations of block 835 succeeded in an allowed amount of time, such as a fraction or other portion of the current time period for which the synchronization is attempted to be performed, and if so the routine continues to block 845 to update both the local model and the intermediate shared model of the local decision module to reflect the consensus shared model. As earlier noted, if sufficient time is allowed for each decision module to repeatedly determine a consensus shared model with changing intermediate shared models representing one or more other decision modules of a collective group, the decision modules of the collective group may eventually converge on a single converged shared model, although in other embodiments and situations there may not be sufficient time for such convergence to occur, or other issues may prevent such convergence. After block 845, the routine continues to block 850 to optionally notify other decision modules of the consensus shared model determined for the local decision module (and/or of a converged shared model, if the operations of 835 were a last step in creating such a converged shared model), such as if each of the notified decision modules is implementing its own local version of the routine 800 and the provided information will be used as part of an intermediate shared model of those other decision modules that includes information from the current local decision module's newly constructed consensus shared model.

If it is instead determined in block 840 that a synchronization did not occur in the allowed time, the routine continues to perform blocks 860-875 to re-attempt the synchronization with one or more modifications, sometimes repeatedly if sufficient time is available, and in a manner similar to that discussed with respect to blocks 745-780 of routine 700 of FIGS. 7A-7B. In the illustrated example, the routine determines in block 860 if additional time is available for one or more such re-attempts at synchronization, and if not the routine continues to block 880 to provide an indication that no synchronization was performed within the allowed time. Otherwise, the routine continues to block 870 to take one or more actions to perform one or more of relaxing rules or other restrictions, repairing rules or other restrictions, and/or re-training a model, with respect to one or both of the current model of the local decision module and/or one or more other decision modules whose information is represented in the intermediate shared model of the local decision module. If it is determined in block 870 to proceed in this manner, the routine continues to block 875 to perform corresponding actions, sometimes one at a time in a manner similar to that discussed with respect to routine 700, including to cause resulting updates to the current model of the local decision module and/or to the local intermediate shared model of the local decision module, after which the routine returns to block 835 to re-attempt to synchronize the local model and the intermediate shared model of the local decision module.

If it is instead determined in block 870 that no further actions are to be performed with respect to relaxation, repair and/or re-training, the routine continues instead to block 880. After blocks 850, 880 or 885, the routine continues to block 895 to determine whether to continue, such as until an explicit indication to terminate or suspend operation of the routine 800 is received, such as to reflect an end to operation of the target system and/or an end to use of the local decision module and/or a collective group of multiple decision modules to control the target system. If it is determined to continue, the routine returns to block 805, and otherwise continues to block 899 and ends.

FIG. 9 is a flow diagram of an example embodiment of a CDD Control State Manager routine 900. The routine may, for example, be provided by execution of the component 195c of FIG. 1A, component 205c discussed with respect to FIGS. 2A-2D, component 345 of FIG. 3 and/or as otherwise discussed herein, such as to implement a control state improvement feedback loop with respect to a target system to improve control functionality of a control system for the target system (e.g., for a target system with one or more batteries or other electrical units, to reduce power dissipation). In the illustrated embodiment, the routine 900 is performed in a local manner for a particular local decision module, such as by being included within that local decision module, although in other embodiments the routine 900 may be implemented in a centralized manner to support one or more decision modules that are remote from a computing system implementing the component for the routine and that communicate with those decision modules over one or more computer networks, such as with a particular decision module indicated to be used at a particular time rather than acting on behalf of the local decision module. In addition, while the illustrated embodiment of the routine 900 may determine and implement updates to a control system's functionality (e.g., to control state actuators) concurrently with a control loop that is implementing control actions for the target system controlled by the control system, in some embodiments such updates may be performed at only certain times, such as to coordinate the updates performed by the routine 900 with other activities implemented as part of the control loop being implemented (e.g., with respect to block 675 of routine 600).

The illustrated embodiment of the routine 900 begins at block 905, where information is retrieved and determined for use in propagating state, momentum and control values for a target system being controlled toward an idealized domain of control action response trajectories. In particular, the routine in block 905 determines the idealized domain, and obtains or otherwise determines a time window size for propagation and a number of sampling points for the time window.

The routine then continues to perform a loop from block 910 to 960 for each time window to determine and implement improvements to control functionality of the control system, with the current time when the loop begins corresponding to the beginning of the time window, and with blocks 910-940 performed at or near the beginning of the time window. In block 910, the routine estimates current state and momentum of the target system and its response trajectories to control actions, and obtains or otherwise determines a current control action. In block 920, the ideal momentum is determined for the current time, and values for the current state, momentum and control actions are propagated at the current time over the future time corresponding to the time window. The routine in block 930 then determines, at the current time, the propagated values for each sample point in the time window, and stores the information for later use. In block 940, the routine then computes weighed average values for the state, momentum and control from the sample propagated values, such as by using a triangle window filter.

When time has passed until the midpoint of the time window is reached, the computed weighted average values are used in block 950 to perform corresponding modifications to one or more control state actuators, and those computed weighted average values are set in block 960 to be used in the next time window loop as its current state, momentum and control actions. In block 970, it is determined whether to perform a next time window, such as until the corresponding decision module (or control system) ceases operations or another explicit indication to terminate is received. If the next time window is to be performed, the routine returns to block 910 and begins processing for the next time window when the current time reaches the beginning of the next time window, and otherwise continues to block 990 to optionally perform any other operations as appropriate (e.g., determine whether the idealized domain has changed, such as based on analysis of information about the target system's operations from its sensors or other feedback, or instead based on a notification from the associated decision module or control system or from a human operator; store any information about propagated values, computed average values, corresponding modifications to control system actuators, etc. for later use; etc.).

After block 990, the routine continues to block 995 where the routine determines whether to continue with new information about an idealized domain (e.g., if changes to the target system cause the idealized domain to change; to perform processing for another decision module or target system with a different idealized domain; etc.). If it is determined to continue, the routine returns to block 905, and otherwise (e.g., if an explicit indication to terminate is received) continues to block 999 and ends.

FIG. 10 illustrates a flow diagram of an example embodiment of a routine 1000 performed for a representative generic target system, with respect to interactions between the target system and one or more decision modules that are controlling at least a portion of the target system. The routine may, for example, be provided by execution of a target system 360 and/or 370 of FIG. 3, an electrical device 195b of FIG. 1A, a battery 205b discussed with respect to FIGS. 2A-2D, and/or a target system 160 and/or 170 of FIGS. 1B and 1C, such as to implement operations specific to the target system. It will be appreciated that the illustrated embodiment of the routine focuses on interactions of the target system with the one or more decision modules, and that many or all such target systems will perform many other operations in a manner specific to those target systems that are not illustrated here for the purpose of brevity.

The routine begins at block 1010, where it optionally provides initial state information for the target system to a CDD system for use in an automated control system of the CDD system for the target system, such as in response to a request from the CDD system or its automated control system for the target system, or instead based on configuration specific to the target system (e.g., to be performed upon startup of the target system). After block 1010, the routine continues to block 1020 to receive one or more inputs from a collective group of one or more decision modules that implement the automated control system for the target system, including one or more modified values for or other manipulations of one or more control elements of a plurality of elements of the target system that are performed by one or more such decision modules of the automated control system. As discussed in greater detail elsewhere, the blocks 1020, 1030, 1040 may be repeatedly performed for each of multiple time periods, which may vary greatly in time depending on the target system (e.g., a microsecond, a millisecond, a hundredth of a second, a tenth of a second, a second, 2 seconds, 5 seconds, 10 seconds, 15 seconds, 30 seconds, a minute, 5 minutes, 10 minutes, 15 minutes, 30 minutes, an hour, etc.).

After block 1020, the routine continues to block 1030 to perform one or more actions in the target system based on the inputs received, including to optionally produce one or more resulting outputs or other results within the target system based on the manipulations of the control elements. In block 1040, the routine then optionally provides information about the outputs or other results within the target system and/or provides other current state information for the target system to the automated control system of the CDD system and/or to particular decision modules of the automated control system, such as to be obtained and measured or otherwise analyzed via passive sensors and/or active sensors. The routine then continues to block 1095 to determine whether to continue, such as until an explicit indication to terminate or suspend operation of the target system is received. If it is determined to continue, the routine returns to block 1020 to begin a next set of control actions for a next time period, and otherwise continues to block 1099 and ends. As discussed in greater detail elsewhere, state information that is provided to a particular decision module may include requests from external systems to the target system, which the automated control system and its decision modules may determine how to respond to in one or more manners. In addition, while the control state manager component in the illustrated embodiment makes modifications directly to control system actuators within the target system (rather than providing modification information to the target system for it to use to attempt to make such modifications, in a manner analogous to blocks 1020 and 1030), in other embodiments the routine 1000 may receive and act on such control system actuator modification requests.

It will be appreciated that the functionality provided by the routines discussed above may be provided in alternative ways in some embodiments, such as being split among more routines or consolidated into fewer routines. Similarly, illustrated routines may in some embodiments provide more or less functionality than is described, such as when other illustrated routines instead lack or include such functionality respectively, or when the amount of functionality provided is altered. Also, while various operations may be illustrated as being performed in a particular manner (e.g., in serial or parallel, synchronously or asynchronously, etc.) and/or in a particular order, those skilled in the art will appreciate that the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described for purposes of illustration, modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form (e.g., while some aspects of the invention may not be recited as being embodied in a computer-readable medium or as part of a system, other aspects may likewise be so embodied), and with any combination of claim elements in different claims that are not logically inconsistent.

What is claimed is:

1. A computer-implemented method comprising:

receiving, by one or more configured computing systems, and for a physical system having a battery electrically coupled to an actuator with a configurable amount of resistance that controls an amount of electrical power being output when the battery is supplying electricity, a model representing the physical system and based at least in part on binary rules that use operating principles of the physical system and that evaluate state information for the battery at a given time to determine whether to supply electricity from the battery at the given time, wherein the model includes a Hamiltonian function that is based on the binary rules and on historical data from previous operations of the physical system and on one or more soft rules specifying one or more conditions to be evaluated to reach one of multiple possible values other than true or false with an associated likelihood, wherein the binary rules include one or more absolute rules specifying non-modifiable restrictions that are requirements regarding the ongoing operations of the physical system, and further include one or more hard rules specifying restrictions regarding the ongoing operations of the physical system that can be modified in specified situations;

controlling, by a control system implemented on the one or more configured computing systems, ongoing operations of the physical system at a plurality of times, including obtaining state information for the battery at each of the plurality of times from multiple sensors that measure characteristics of the battery, using the model and the obtained state information to determine control actions that involve supplying electricity from the battery during at least some of the plurality of times, and performing the determined control actions during the at least some times to supply the electricity from the battery; and modifying, by a control state manager implemented on the one or more configured computing systems, and during the controlling of the ongoing operations by the control system, attributes of the actuator at each of multiple times to repeatedly reduce power dissipation, including:

determining differences between a current level of power dissipation from the electrical power being output and an ideal level of power dissipation;

identifying, based at least in part on the obtained state information for the battery for one of more times of the plurality, one or more changes in the amount of resistance of the actuator that reduce the determined differences; and adjusting the amount of resistance of the actuator based on the identified one or more changes, to modify the amount of electrical power being output when the battery is supplying electricity.

2. The computer-implemented method of claim 1 wherein the model further includes behavior rules that represent desired behavior of the battery, and wherein the method further comprises determining, by the one or more configured computing systems, the ideal level of power dissipation for the battery by analyzing the behavior rules.

3. The computer-implemented method of claim 1 wherein the determining of the differences between the current level of power dissipation from the electrical power being output for one of the multiple times and the ideal level of power dissipation includes:
   estimating, by the one or more configured computing systems and for the one time, a current state and a current momentum of the physical system; determining, by the one or more configured computing systems and for the one time, an ideal state and an ideal momentum for the physical system;
   propagating, by the one or more configured computing systems and over a defined time window, state and momentum and control values to reduce differences between the current state and the current momentum and a current control to the determined ideal state and the determined ideal momentum and a determined ideal control;
   sampling, by the one or more configured computing systems, the propagated state and momentum and control values at each of a defined quantity of sampling points within the defined time window; and
   computing, by the one or more configured computing systems, weighted average values for state and momentum and control from the sampled propagated state and momentum and control values, wherein the computed weighted average values are used as the determined differences.

4. The computer-implemented method of claim 3 wherein the adjusting of the amount of resistance of the actuator for the one time is performed at a middle of the defined time window, wherein the computed weighted average values are further used as estimated current state and momentum and control values for a next time after the one time, and wherein the defined time window is started for the next time at an end of the defined time window for the one time.

5. The computer-implemented method of claim 4 wherein the computing of the weighted average values uses a triangle window filter that gives a highest weight to propagated values sampled at the middle of the defined time window and that decreases weights for propagated values sampled at increasing distances from the middle of the defined time window.

6. The computer-implemented method of claim 4 wherein the multiple times are the plurality of times, and wherein the estimating and the determining of the ideal state and momentum and the propagating and the sampling and the computing and the adjusting at the middle of the defined time window are performed at each of the plurality of times.

7. The computer-implemented method of claim 3 wherein the determining of the differences between the current level of power dissipation from the electrical power being output and the ideal level of power dissipation further includes determining a current domain of possible responses of the physical system to control actions for the one time, and wherein the propagating of the state and momentum and control values includes propagating the determined current domain toward an ideal domain of possible responses of the physical system to control actions.

8. The computer-implemented method of claim 7 wherein the multiple times are the plurality of times, wherein the controlling of the ongoing operations of the physical system at the one time includes operating the physical system within the determined current domain of possible responses for the one time, and wherein the modifying of the attributes of the actuator at the one time includes moving operations of the physical system for a next time after the one time to a new domain of possible responses for the next time that has lower power dissipation than the current domain of possible responses for the one time.

9. The computer-implemented method of claim 1 wherein the modifying of the attributes of the actuator for at least one of the multiple times further includes adjusting an amount of time that the adjusted amount of resistance is used for outputting electrical power from the battery.

10. The computer-implemented method of claim 1 further comprising using the multiple sensors to obtain the state information at each of the plurality of times by measuring characteristics of the battery that include at least one of amperes for the electricity being supplied from the battery or volts for the electricity being supplied from the battery or an external temperature of the battery.

11. The computer-implemented method of claim 1 wherein the controlling of the ongoing operations of the physical system includes using a control loop to implement determining of control actions to perform and performing of determined control actions, and using a separate control state improvement feedback loop to perform the modifying of the attributes of the actuator at each of the multiple times to repeatedly reduce the power dissipation.

12. The computer-implemented method of claim 1 wherein the ongoing operations of the physical system further involve supplying, for at least one of the plurality of times, electrical power to the battery to be stored for later use in the supplying of electricity from the battery, and wherein the performing of the determined control actions further includes, at each of the at least one times, manipulating the actuator to cause electricity to be supplied to the battery for storage.

13. The computer-implemented method of claim 1 wherein the determining of the control actions further includes determining an amount of electrical power to output from the battery for at least one of the plurality of times based at least in part on obtained state information for the battery, and wherein the performing of the determined control actions further includes, at each of the at least one times, manipulating the actuator to cause the determined amount of electrical power to be output from the battery.

14. The computer-implemented method of claim 1 wherein the physical system includes an electrical vehicle, wherein the supplying of the electricity from the battery during the at least some times includes supplying the electricity to a motor that moves the electrical vehicle, and wherein the model is further based on at least one specified goal that includes maximizing life of the battery while supplying energy to and/or from the battery according to indicated criteria.

15. The computer-implemented method of claim 1 wherein the physical system includes an electricity generating facility that stores generated electricity in the battery, wherein the controlling of the ongoing operations further includes performing further determined control actions during at least one of the plurality of times to supply electricity to the battery, and wherein the model is further based on at least one specified goal that includes maximizing life of the battery.

16. The computer-implemented method of claim 1 wherein the physical system further includes one or more super capacitor elements that store and/or supply electricity, and wherein the controlling of the ongoing operations further includes performing further determined control actions during at least one of the plurality of times to supply electricity to and/or from the one or more super capacitor elements.

17. The computer-implemented method of claim 16 further comprising determining the further control actions based at least in part on a change in rate of supply and/or demand exceeding a defined threshold, and wherein the model is further based on at least one specified goal that includes maximizing life of the battery.

18. A non-transitory computer-readable medium having stored contents that cause one or more computing systems to perform automated operations, the automated operations comprising:
    receiving, by the one or more computing systems, a model that represents a battery and is based at least in part on binary rules evaluating state information for the battery to reach true or false values for control actions to perform for the battery, wherein the model includes a total Hamiltonian function that is based on the binary rules and on historical data from previous operations of the battery, wherein the binary rules include one or more absolute rules specifying non-modifiable restrictions that are requirements regarding ongoing operations of the battery, and further include one or more hard rules specifying restrictions regarding the ongoing operations of the battery that can be modified in specified situations, and wherein the total Hamiltonian function is further based in part on one or more soft rules specifying one or more additional conditions to be evaluated to reach one of multiple possible values other than true or false with an associated likelihood;
    controlling, by the one or more computing systems, ongoing operations of the battery at a plurality of times, including using the model and obtained state information for the battery to determine control actions that modify the ongoing operations of the battery during at least some of the plurality of times, and performing the determined control actions during the at least some times; and
    reducing, by the one or more computing systems, and at each of multiple times during the controlling of the ongoing operations, power dissipation for the battery by:
    identifying, based at least in part on obtained state information for the battery, one or more changes to cause modifications in electrical power being output from the battery that reduce one or more differences between a current level of power dissipation from the electrical power being output and an ideal level of power dissipation; and
    performing the identified one or more changes in a component that regulates the electrical power being output from the battery, to cause the modifications in the electrical power being output when the battery is subsequently supplying power.

19. The non-transitory computer-readable medium of claim 18 wherein the component that regulates the electrical power being output from the battery is an actuator with a configurable amount of resistance to control an amount of electrical power being output when the battery is supplying power, wherein the controlling of the ongoing operations is performed by a control system implemented by the one or more computing systems and includes performing determinations of whether to supply electrical power from the battery at each of the plurality of times and performing the control actions to implement the determinations, and wherein the reducing of the power dissipation for the battery is performed by a control state manager implemented by the one or more computing systems and includes adjusting the amount of resistance of the actuator based on the identified one or more changes.

20. The non-transitory computer-readable medium of claim 19 wherein the battery is part of a physical system further having one or more outputs and having one or more controls that are manipulatable to modify at least one output and having multiple sensors to measure the state information for the battery, and wherein the binary rules further use operating principles of the battery as part of evaluating the state information for determining the control actions.

21. The non-transitory computer-readable medium of claim 18 wherein the stored contents include software instructions that, when executed, further cause the one or more computing systems to generate the total Hamiltonian function based at least in part on the binary rules and on the one or more soft rules.

22. A system comprising:
    one or more hardware processors of one or more computing systems; and
    one or more memories with stored instructions that, when executed by at least one of the one or more hardware processors, cause the system to control a target system having an electrical device, by:
    receiving a model that represents the target system and is based at least in part on binary rules using operating principles of the target system to evaluate state information and select control actions to perform, wherein the model includes a total Hamiltonian function that is based on the binary rules and on historical data from previous operations of the target system, wherein the binary rules include one or more absolute rules specifying non-modifiable restrictions that are requirements regarding ongoing operations of the target system, and further include one or more hard rules specifying restrictions regarding the ongoing operations of the target system that can be modified in specified situations, and wherein the total Hamiltonian function is further based in part on one or more soft rules specifying one or more additional conditions to be evaluated to reach one of multiple possible values other than true or false with an associated likelihood;
    controlling ongoing operations of the target system that involve use of the electrical device at a plurality of times, including using the model and obtained state information for the target system to determine control actions that modify the ongoing operations during at least some of the plurality of times, and performing the determined control actions during the at least some times; and
    reducing, at each of multiple times during the controlling of the ongoing operations, misused resources of the target system by:
    identifying, based at least in part on obtained state information for the target system, one or more changes to cause modifications in operation of the electrical device that reduce one or more differences between a current level of resource usage by the target system and an ideal level of resource usage; and
    performing the identified one or more changes in a component that regulates operation of the electrical device, to cause the modifications in the operation of the electrical device.

23. The system of claim 22 wherein the electrical device is a battery and the target system has multiple sensors to measure state information for the battery, wherein the determining of the control actions includes determining whether to supply power from the battery at each of the plurality of times, wherein the reducing of the misused resources of the target system at each of the multiple times includes reducing power dissipation for the battery from a current level of power dissipation toward an ideal level of no power dissipation, wherein the component that regulates operation of the electrical device is an actuator with a configurable amount of resistance to control an amount of electrical power being output when the battery is supplying power, and wherein the performing of the identified one or more changes includes adjusting the amount of resistance of the actuator based on the identified one or more changes.

24. The system of claim 22 wherein the stored instructions include a control system that implements the controlling of the ongoing operations, and further include a control state manager that implements the reducing of the misused resources.

25. The system of claim 22, wherein the stored instructions include software instructions that, when executed, further cause the one or more computing systems to generate the total Hamiltonian function based at least in part on the binary rules and on the one or more soft rules.

26. The system of claim 22 wherein the electrical device transmits communications and the target system obtains the state information at each of the plurality of times by measuring characteristics of delivery of the communications, wherein the determining of the control actions includes determining communications to supply from the electrical device at each of the plurality of times, wherein the reducing of the misused resources of the target system at each of the multiple times includes reducing errors in the delivery of the communications from a current level of errors toward an ideal level of no errors, and wherein the performing of the identified one or more changes includes adjusting at least one of an amount of communications or a type of communications to supply from the electrical device based on the identified one or more changes.

27. The system of claim 22 wherein the electrical device is a computing device that performs analysis of supplied information to detect anomalies and the target system obtains the state information at each of the plurality of times by measuring uncertainty in ongoing results of the analysis, wherein the determining of the control actions includes determining analysis activities to perform at each of the plurality of times, wherein the reducing of the misused resources of the target system at each of the multiple times includes reducing the uncertainty and associated analysis actions from a current level of uncertainty toward an ideal level of no uncertainty, and wherein the performing of the identified one or more changes includes adjusting characteristics of further analysis activities based on the identified one or more changes.

28. The system of claim 22 wherein the electrical device is part of system that includes a motor and the target system obtains the state information at each of the plurality of times by measuring physical characteristics of operation of the motor, wherein the determining of the control actions includes determining how to use the motor at each of the plurality of times, wherein the reducing of the misused resources of the target system at each of the multiple times includes reducing an amount of motor usage from a current level of excess motor usage toward an ideal level of no excess motor usage, and wherein the performing of the identified one or more changes includes adjusting an amount of future torque supplied by the motor based on the identified one or more changes.

* * * * *